(12) United States Patent
Al Ghossein et al.

(10) Patent No.: US 10,705,301 B2
(45) Date of Patent: Jul. 7, 2020

(54) SPRING ASSIST CABLE CLAMP

(71) Applicant: Hubbell Incorporated, Shelton, CT (US)

(72) Inventors: Rabih M. Al Ghossein, Hoover, AL (US); Adrian Beau Candelaria, Alabaster, AL (US)

(73) Assignee: HUBBELL INCORPORATED, Shelton, CT (US)

( * ) Notice: Subject to any disclaimer, the term of this patent is extended or adjusted under 35 U.S.C. 154(b) by 79 days.

(21) Appl. No.: 16/167,199

(22) Filed: Oct. 22, 2018

(65) Prior Publication Data

US 2019/0121035 A1    Apr. 25, 2019

Related U.S. Application Data

(60) Provisional application No. 62/744,724, filed on Oct. 12, 2018, provisional application No. 62/635,226, (Continued)

(51) Int. Cl.
  *G02B 6/38* (2006.01)
  *G02B 6/44* (2006.01)
  *G02B 6/48* (2006.01)

(52) U.S. Cl.
  CPC ......... *G02B 6/3887* (2013.01); *G02B 6/4429* (2013.01); *G02B 6/4471* (2013.01); *G02B 6/483* (2013.01)

(58) Field of Classification Search
  CPC .... G02B 6/3887; G02B 6/4429; G02B 6/483; G02B 6/4471
  See application file for complete search history.

(56) References Cited

U.S. PATENT DOCUMENTS 1,489,835 A    4/1924   Kietz
1,603,035 A   10/1926   Evans
(Continued)

FOREIGN PATENT DOCUMENTS

JP    08308071    11/1996
JP    10042438     2/1998
JP   2001136643    5/2001

OTHER PUBLICATIONS

International Search Report and Written Opinion mailed in PCT/US18/56931 dated Dec. 27, 2018.
(Continued)

*Primary Examiner* — Ryan A Lepisto
(74) *Attorney, Agent, or Firm* — Wissing Miller LLP

(57) ABSTRACT

A cable clamp for clamping drop cable clamp assemblies to main span cables. The cable clamp has a body that includes a main span cable guide and holders for supporting one or more drop cable clamp assemblies. The body has a lower body half and an upper body half. The lower body half is movable relative to the upper body half between an open position and a clamping position. When the body is in a clamping position the lower body half and upper body half of the main span cable guide form a main span cable cradle. A stem extends through the lower body half of the main body section and is releasably secured to the upper body half of the main body section such that rotational movement of the stem is translated to movement of the lower body half relative to the upper body half. The stem has a collar and a spring is positioned on the stem between the collar and the lower body half of the intermediate body section to normally bias the body to the clamping position.

22 Claims, 48 Drawing Sheets

Related U.S. Application Data filed on Feb. 26, 2018, provisional application No. 62/575,463, filed on Oct. 22, 2017.

(56) References Cited

U.S. PATENT DOCUMENTS

| | | | |
|---|---|---|---|
| 2,107,061 A | 2/1938 | Pittman et al. | |
| 2,120,447 A | 6/1938 | Tipsord | |
| 2,151,524 A | 3/1939 | Pittman et al. | |
| 2,206,653 A | 7/1940 | Yonkers | |
| 2,397,390 A | 3/1946 | Wadsworth | |
| 2,530,299 A | 11/1950 | Hendley | |
| 2,574,796 A | 11/1951 | Moore | |
| 2,651,766 A | 9/1953 | Runde | |
| 2,811,703 A | 10/1957 | Becker | |
| 2,867,787 A | 1/1959 | Nilsson | |
| 2,958,067 A | 10/1960 | Hardy | |
| 3,036,286 A | 5/1962 | Gorc et al. | |
| 3,075,166 A | 1/1963 | Peek | |
| 3,132,914 A | 5/1964 | Wengen | |
| 3,142,525 A | 7/1964 | Roosman | |
| 3,177,459 A | 4/1965 | Toedtman | |
| 3,431,538 A | 3/1969 | Hubbard | |
| 3,614,700 A | 10/1971 | Beard et al. | |
| 3,830,427 A | 8/1974 | Polidori | |
| 3,923,363 A | 12/1975 | Kraft | |
| 4,183,686 A | 1/1980 | De France | |
| 4,293,176 A | 10/1981 | Lindlof | |
| 4,600,264 A | 7/1986 | Counsel | |
| 4,707,051 A * | 11/1987 | Hall | H01R 4/44 439/781 |
| 4,846,725 A | 7/1989 | Williams, Jr. | |
| 5,004,437 A | 4/1991 | Walter et al. | |
| 5,021,014 A | 6/1991 | Walter et al. | |
| D329,244 S | 9/1992 | Salto et al. | |
| 5,369,849 A | 12/1994 | De France | |
| 5,440,665 A | 8/1995 | Ray | |
| 5,539,961 A | 7/1996 | DeFrance | |
| 5,547,404 A | 8/1996 | Nellis, Jr. | |
| 5,692,930 A | 12/1997 | Garver et al. | |
| 5,752,680 A * | 5/1998 | Mann | H02G 7/056 24/132 R |
| 6,371,419 B1 | 4/2002 | Ohnuki | |
| 6,390,861 B1 | 5/2002 | De France | |
| 6,595,472 B1 | 7/2003 | Pisczak | |
| 6,732,981 B2 | 5/2004 | Franks et al. | |
| 7,029,316 B2 | 4/2006 | Jackson, III | |
| 7,160,142 B2 | 1/2007 | Hughes et al. | |
| 7,666,024 B2 * | 2/2010 | De France | H01R 4/4872 439/479 |
| 8,512,070 B2 | 8/2013 | De France | |
| 8,672,716 B2 | 3/2014 | De France | |
| 9,577,351 B2 * | 2/2017 | Martin | H01R 4/2408 |
| 10,095,001 B2 | 10/2018 | Sakmar | |
| 10,230,181 B2 * | 3/2019 | Krueger | H01R 4/64 |
| 2002/0142674 A1 | 10/2002 | Chadbourne et al. | |
| 2004/0035984 A1 | 2/2004 | Franks et al. | |
| 2013/0303035 A1 | 11/2013 | Neal | |
| 2016/0294074 A1 | 10/2016 | De France | |
| 2018/0031794 A1 | 2/2018 | Sakmar | |
| 2018/0031795 A1 | 2/2018 | Al Ghossein | |

OTHER PUBLICATIONS

YH292C Data Sheet Burndy Electrical (FCI USA Inc.), Dec. 28, 1990, Rev #9.*
Burndy Installation Instructions for FASTAP (TM) with Lineman Assist (TM), 2014.
Burndy Introduction Sheet for FASTAP (TM) with Lineman Assist (TM), 2014.
FARGO GH-700A Brochure, "High Performance, Range Taking, Hot Line, Tap Connectors", Jan. 1995.
Hubbell Brochure for "Overhead Primary Taps Hot Line Tap Clamps Aluminum", Dec. 2014.
Hubbell Brochure for P-Clamp 5C-1-1, Apr. 2013.

* cited by examiner

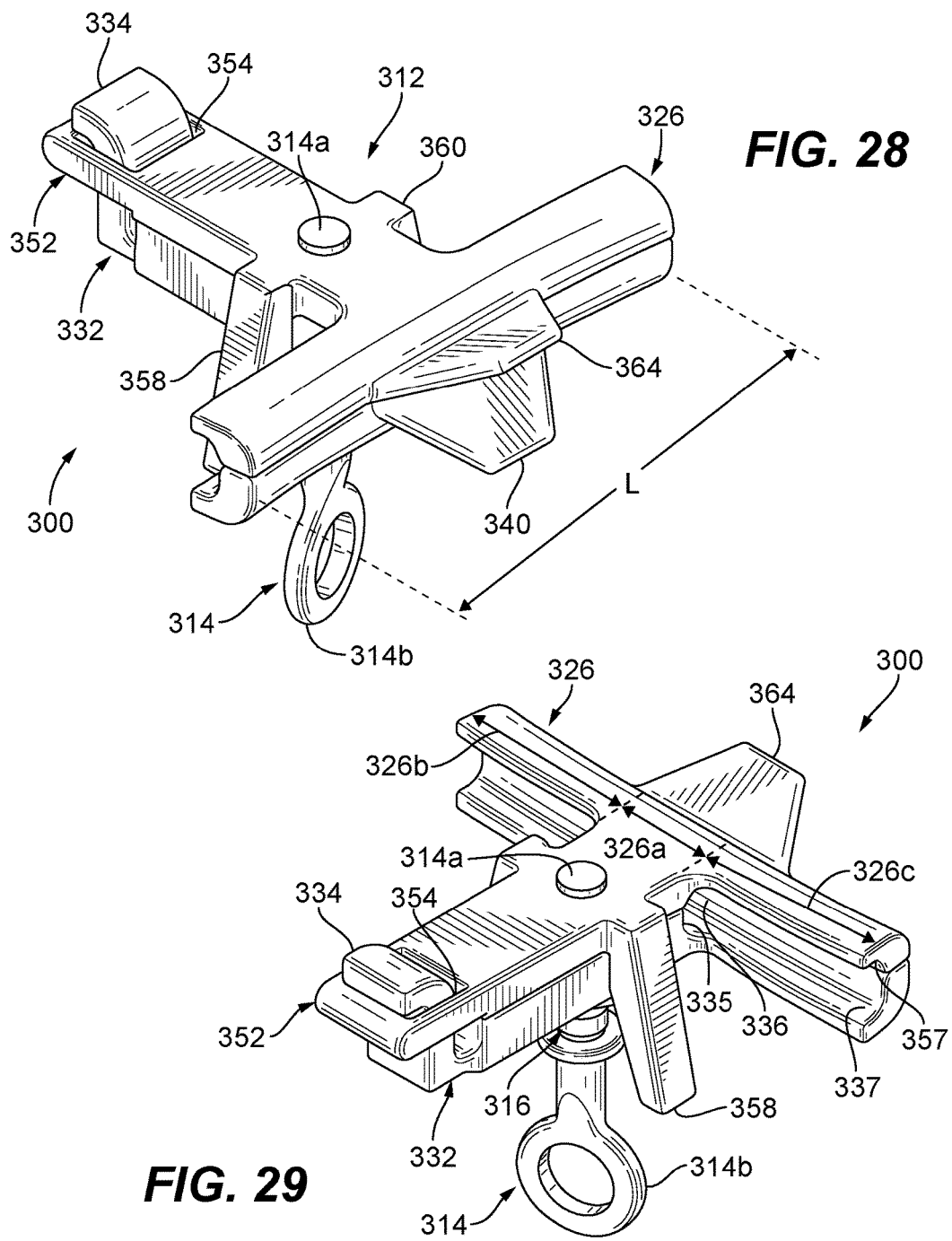

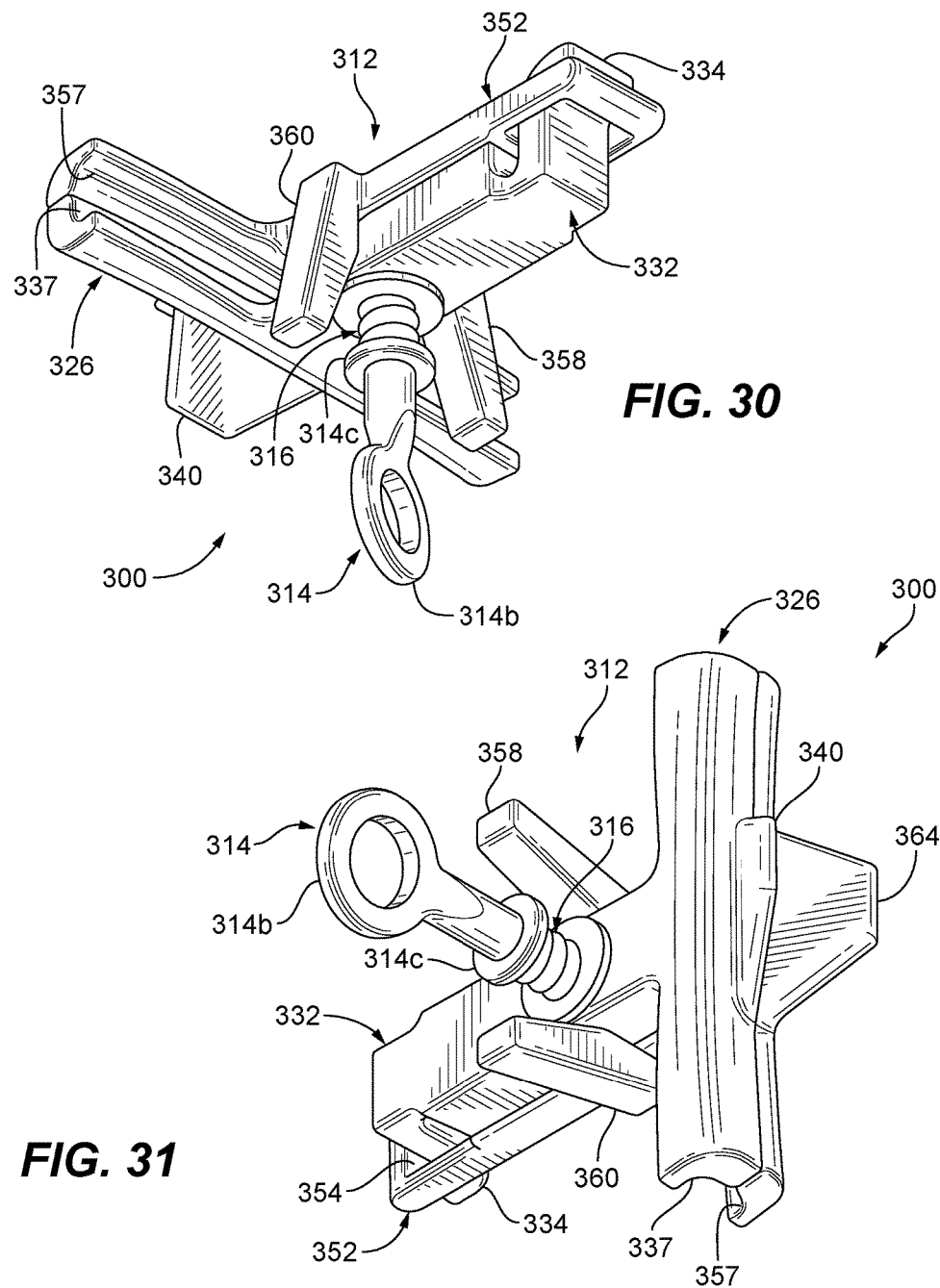

SPRING ASSIST CABLE CLAMP

CROSS REFERENCE TO RELATED APPLICATIONS

The present disclosure is based on and claims benefit from co-pending U.S. Provisional Patent Application Ser. No. 62/575,463 filed on Oct. 22, 2017 entitled "Spring Assist Cable Clamp" and from co-pending U.S. Provisional Application Ser. No. 62/635,226 filed on Feb. 26, 2018 entitled "Spring Assist Cable Clamp" and from co-pending U.S. Provisional Application Ser. No. 62/744,724 filed on Oct. 12, 2018 entitled "Spring Assist Cable Clamp" the contents of each are incorporated herein in their entirety by reference.

BACKGROUND

Field

The present disclosure relates generally to clamps for utility cabling and more particularly to cable clamps for clamping drop cables to main span cables.

Description of the Related Art

Aerial cabling, such as fiber optic cabling, is typically strung from utility pole to utility pole, or from a utility pole to a building. The cabling between utility poles is often referred to as a main span. To withstand cable sag and environmental conditions, two types of fiber optic cables are available to string from pole-to-pole or from pole-to-building: lashed fiber optic cables or self-supporting fiber optic cables. Lashed fiber optic cable uses a galvanized steel support wire to which the fiber optic cable is affixed or lashed. Self-supporting fiber optic cable typically includes a strength member in the form of a messenger section supporting the fiber optic cable and a carrier section that includes optical fibers, or optical fibers and electrical conductors. An example of self-supporting fiber optic cable is RPX cable manufactured by Corning Cable Systems.

With aerial fiber optic cabling, connections between fiber cables are typically made in close proximity to the utility pole or building. However, there are instances where drop connections are needed. Drops are cable connections between a main span cable and a drop cable at a point along the main span. Drops for fiber optic cabling are used when, for example, smaller quantities of fibers are needed to feed a terminal. The smaller quantities of fibers are in a drop cable and run to a terminal located at a utility pole or building.

Drops are achieved on lashed aerial cable using a bolted cable clamp with a hook. The cable clamp is bolted to the galvanized steel support wire that the fiber optic cable is lashed to, and then a dead-end is attached to the hook to hold the drop. In instances where a bucket truck can be used, a technician would bolt the cable clamp to the galvanized steel support wire while standing in the bucket. In instances where a bucket truck cannot be used, a technician would lean a ladder against the galvanized steel support wire in order to bolt the cable clamp to the galvanized steel support wire.

However, such bolted cable clamps are not suitable for self-supporting fiber optic cable as they do not use a galvanized steel support wire. In addition, self-supporting fiber optic cables do not allow for the support of a ladder leaning against it. As a result, in instances where a bucket truck cannot be used, the clamp has to be installed from the ground using extendable reach tools, e.g., a hot stick. Typical bolted type cable clamps are not suitable for ground-based installations. Accordingly, a cable clamp capable of clamping a drop cable to a main span cable is needed. The present disclosure provides a cable clamp that can be used with self-supporting or lashed fiber optic cables for drops where the cable clamp is to be installed from the ground.

SUMMARY

The present disclosure provides embodiments of cable clamps for clamping one or more drop cable clamp assemblies to main span cables. Each cable clamp has a body that includes a main span cable guide and holders for supporting one or more drop cable clamp assemblies. The body has a lower body half and an upper body half. The lower body half is movable relative to the upper body half between an open position and a clamping position. When the body is in a clamping position the lower body half and upper body half of the main span cable guide form a main span cable cradle. A stem extends through the lower body half of the main body section and is releasably secured to the upper body half of the main body section such that rotational movement of the stem is translated to movement of the lower body half relative to the upper body half. The stem has a collar and a spring is positioned on the stem between the collar and the lower body half of the intermediate body section to normally bias the body to the clamping position.

In one exemplary embodiment, the cable clamp has a body, a stem and a spring. The body defines a drop cable section, a main span cable section and an intermediate section between the drop cable section and the main span cable section. The body includes a lower body half and an upper body half. The lower body half includes at least one lower arm in the drop cable section, at least one hook portion extending from the at least one lower arm, an elongated aperture in the intermediate section and a lower cable guide portion in the main span cable section. The at least one lower arm has at least one channel configured to receive a portion of a drop cable clamp assembly. The upper body half includes at least one upper arm in the drop cable section, an aperture in the intermediate section and an upper cable guide portion in the main span cable section. The at least one upper arm has an opening capable of receiving the at least one hook portion. In this exemplary embodiment, the lower body half is movable relative to the upper body half, such that when the lower body half and the upper body are in a closed position the lower cable guide portion and the upper cable guide portion form a cable guide. At least a portion of the cable guide defines an opening or cradle that is capable of receiving and supporting a main span cable.

The stem has a collar and extends through the elongated aperture in the intermediate section of the lower body half and is releasably secured to the aperture in the intermediate section of the upper body half such that rotational movement of the stem is translated to movement of the lower body half relative to the upper body half. The spring is positioned on the stem between the collar and the intermediate section of the lower body half to normally bias the lower body half toward the upper body half.

In one exemplary embodiment, the cable clamp has a body, a stem and a spring. The body defines a drop cable section, a main span cable section and an intermediate section between the drop cable section and the main span cable section. The body includes a lower body half and an upper body half. The lower body half includes at least one lower arm in the drop cable section having at least one channel, at least one hook portion extending from the at least one lower arm, an elongated aperture in the intermediate section, and a lower cable guide portion in the main span cable section. The upper body half includes at least one upper arm in the drop cable section having an opening capable of receiving the at least one hook portion, an aperture in the intermediate section, at least a pair of stabilizing legs extending from the intermediate section in a direction toward the lower body half, and an upper cable guide portion in the main span cable section. The stabilizing legs and the intermediate section of the upper body half form a cradle that receives the intermediate section of the lower body half when the upper body half and the lower body half are in a closed position. The lower body half is movable relative to the upper body half, and when the lower body half and the upper body are in the closed position the lower cable guide portion and the upper cable guide portion form a cable guide.

The stem has a collar and extends through the elongated aperture in the intermediate section of the lower body half and is releasably secured to the aperture in the intermediate section of the upper body half such that rotational movement of the stem is translated to movement of the upper body half relative to the lower body half. The spring is positioned on the stem between the collar and the intermediate section of the lower body half to normally bias the lower body half toward the upper body half.

The present disclosure provides embodiments of cable clamp kits for clamping one or more drop cable clamp assemblies to main span cables. The cable clamp kits include a cable clamp and at least one drop cable clamp assembly. The cable clamp includes the exemplary cable clamps described above.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 28 is a top front perspective view of another exemplary embodiment of a cable clamp according to the present disclosure illustrating the cable clamp in a clamping position;

FIG. 29 is a top rear perspective view of the cable clamp of FIG. 28;

FIG. 30 is a bottom rear perspective view of the cable clamp of FIG. 28;

FIG. 31 is a bottom side perspective view of the cable clamp of FIG. 28;

DETAILED DESCRIPTION

Figure 1:
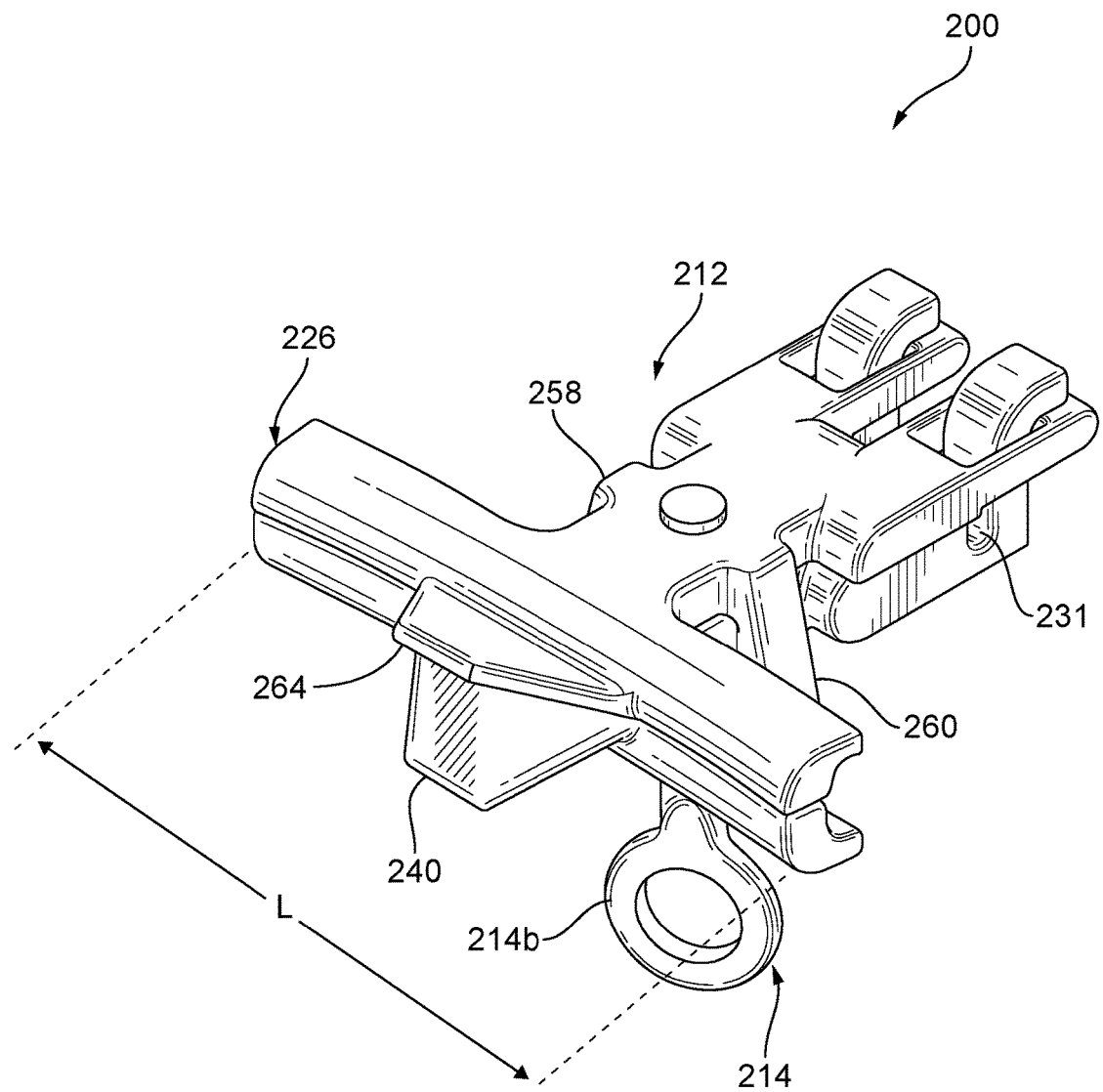
FIG. 1 is a top front perspective view of an exemplary embodiment of a cable clamp according to the present disclosure illustrating the cable clamp in a clamping position.
Figure 2:
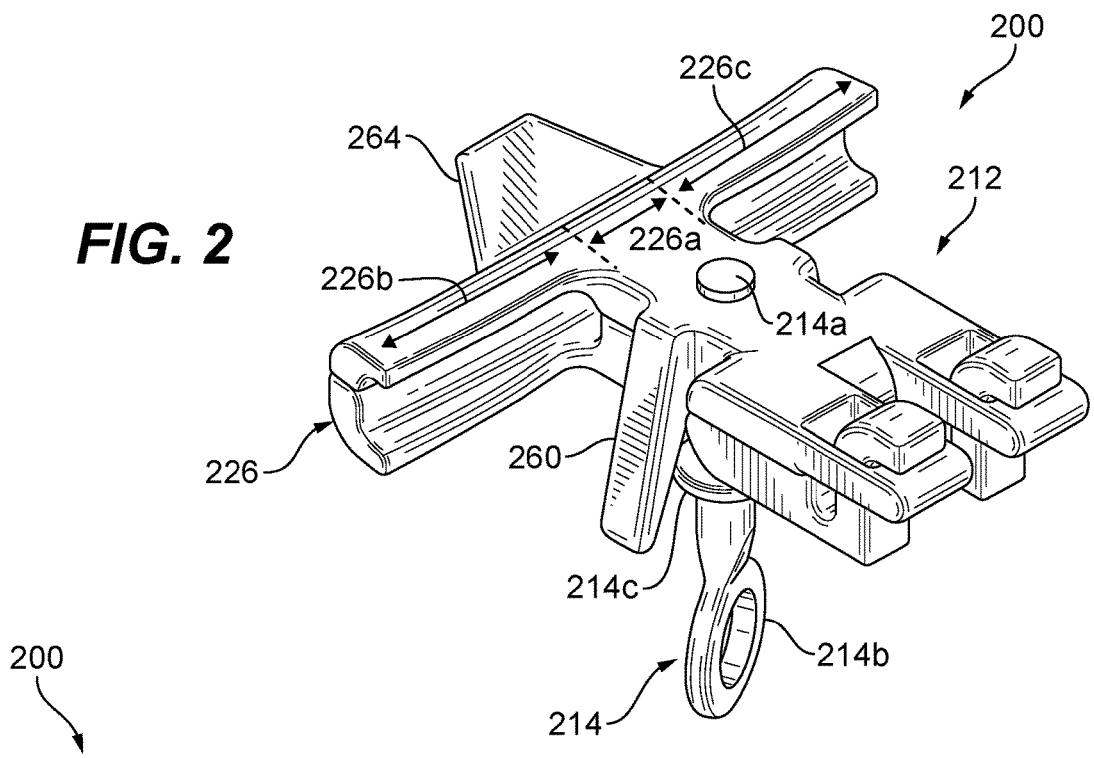
FIG. 2 is a top rear perspective view of the cable clamp of FIG. 1.
Figure 3:
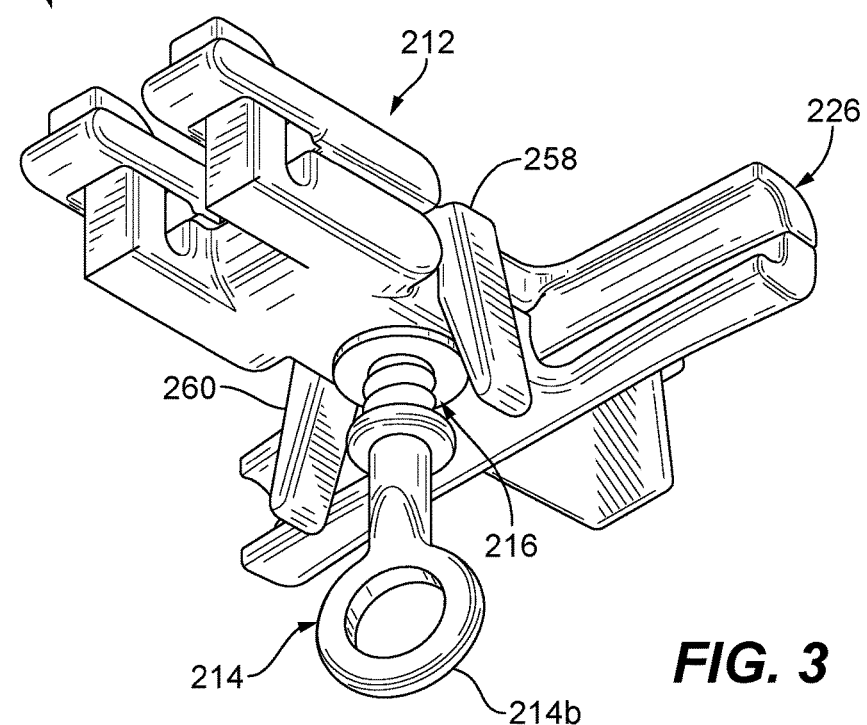
FIG. 3 is a bottom rear perspective view of the cable clamp of FIG. 1.
Figure 4:
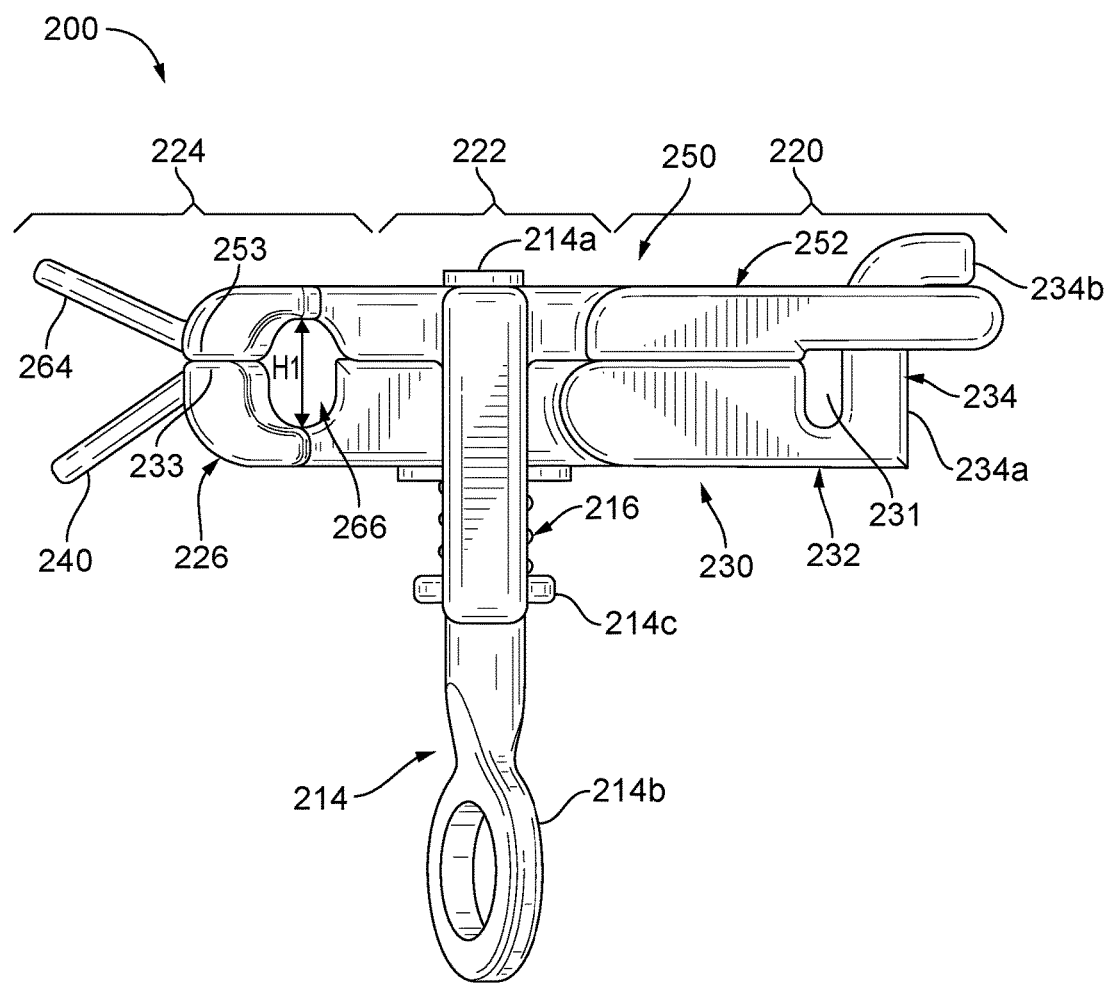
FIG. 4 is a side elevation view of the cable clamp of FIG. 1.
Figure 5:
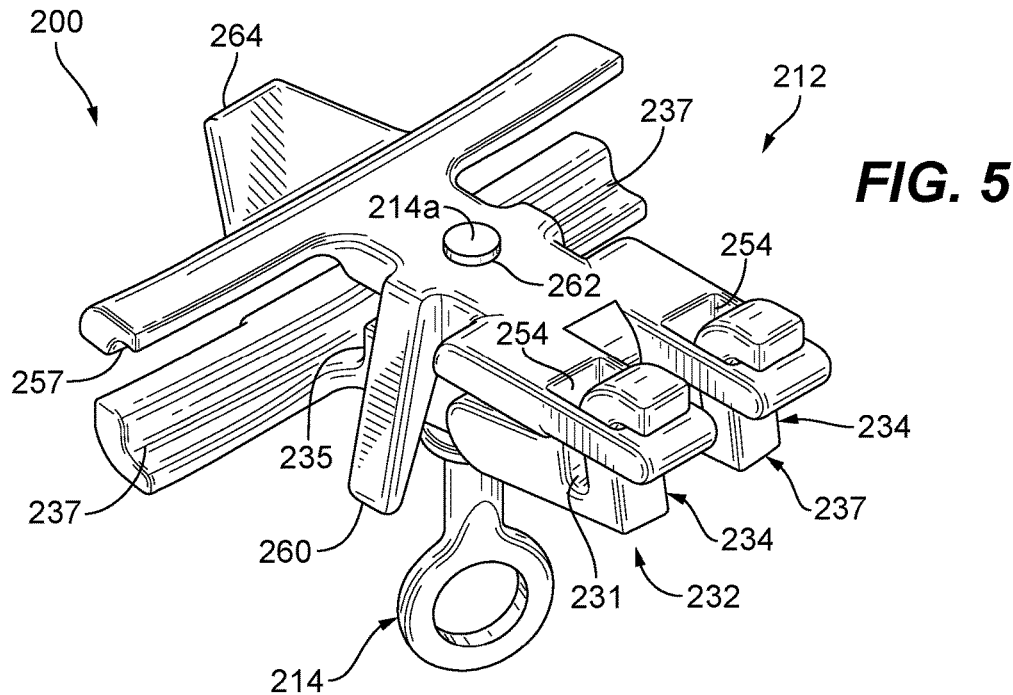
FIG. 5 is a top rear perspective view of the cable clamp of FIG. 1, illustrating the cable clamp in an open position.
Figure 6:
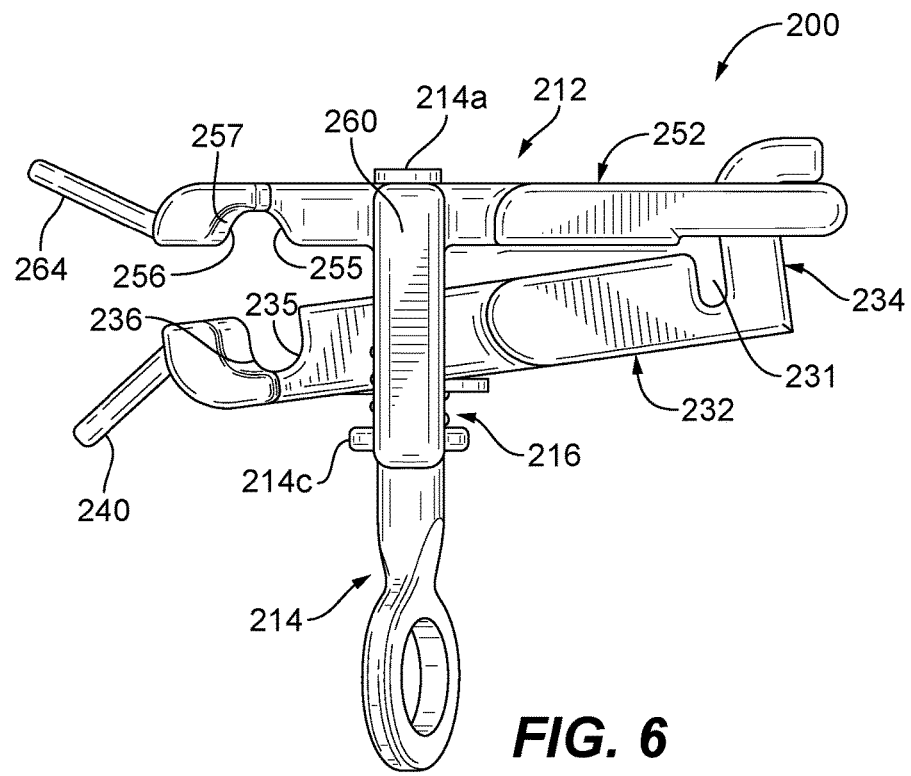
FIG. 6, is a side elevation view of the cable clamp of FIG. 5.
Figure 7:
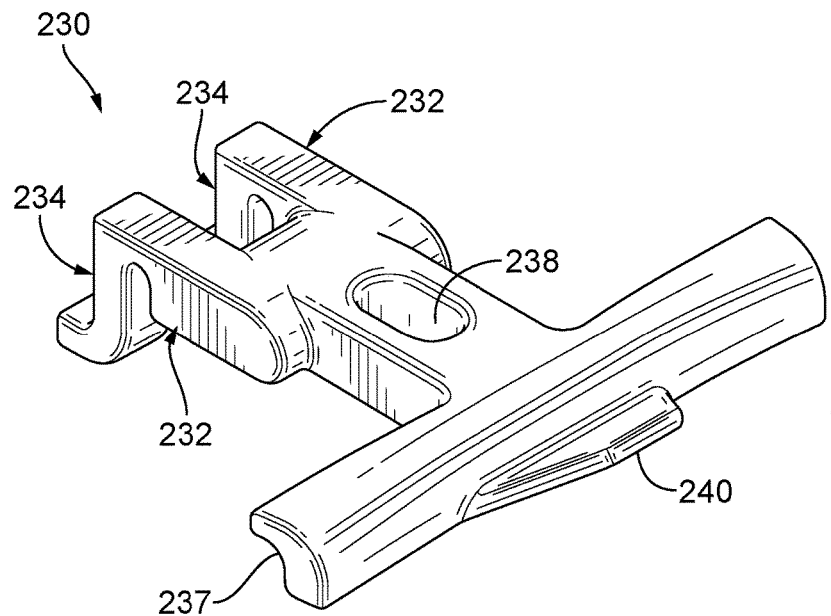
FIG. 7 is a top front perspective view of a lower body half of the cable clamp of FIG. 1.
Figure 8:
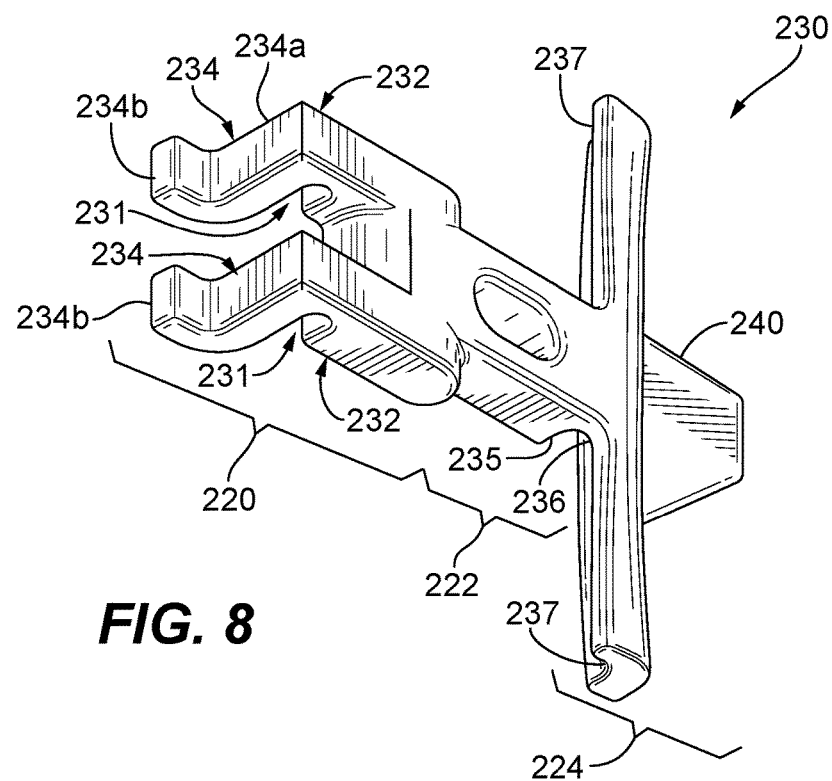
FIG. 8 is a top rear perspective view of the lower body half of FIG. 7.
Figure 9:
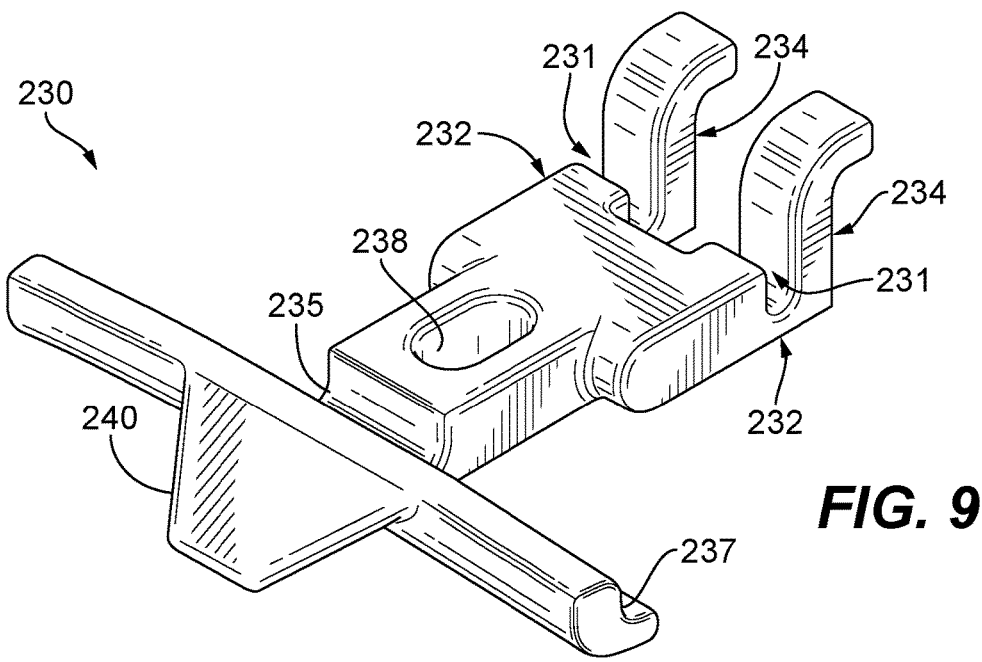
FIG. 9 is a bottom front perspective view of the lower body half of FIG. 7.
Figure 10:
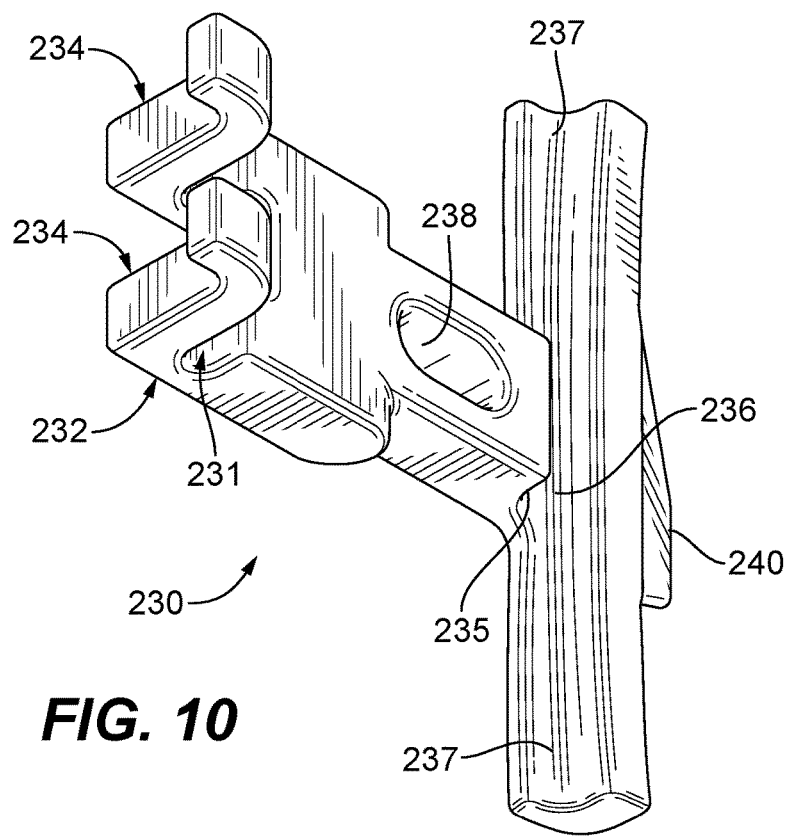
FIG. 10 is a bottom rear perspective view of the lower body half of FIG. 7.

Exemplary embodiments of the cable clamp according to the present disclosure are shown. For ease of description, the cable clamp described herein may also be referenced as the "clamp." The clamp according to the present disclosure is configured to be installed from the ground with an extendable reach tool, such as a hot stick. One or more drop cable clamp assemblies are releasably secured to a drop cable section of the clamp, and then a main span cable is snapped onto a main span cable guide in a main span cable section of the clamp.

Referring now to the figures, in particular FIGS. 1-6, an exemplary embodiment of the clamp according to the present disclosure is shown. The clamp 200 includes a body 212, a stem 214 and a spring 216. The body 212 has a lower body half 230 and an upper body half 250, seen in FIG. 4. For general reference purposes the body 212 is split into three sections: a drop cable section 220, an intermediate section 222 and a main span cable section 224. The stem 214 is preferably an eyestem that has a threaded end 214a, an eye 214b for coupling with an extendable reach tool, for example, a hot stick, and a collar 214c for supporting the spring 216. The body 212, stem 214 and spring 216 may be made of a metallic material, such as aluminum, cast aluminum, galvanized steel or stainless steel, or a combination of metallic materials. In another exemplary embodiment, the body 212, stem 214 and spring 216 may be made of a non-metallic material, such as a rigid plastic or composite materials e.g., carbon fiber.

Figure 11:
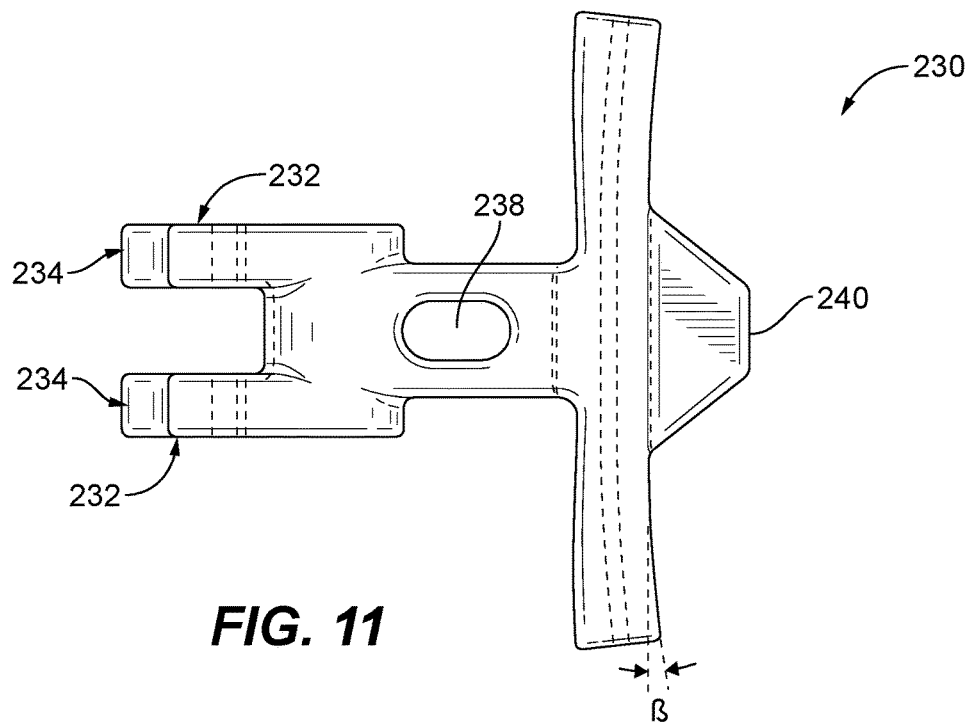
FIG. 11 is a top plan view of the lower body half of FIG. 7.
Figure 12:
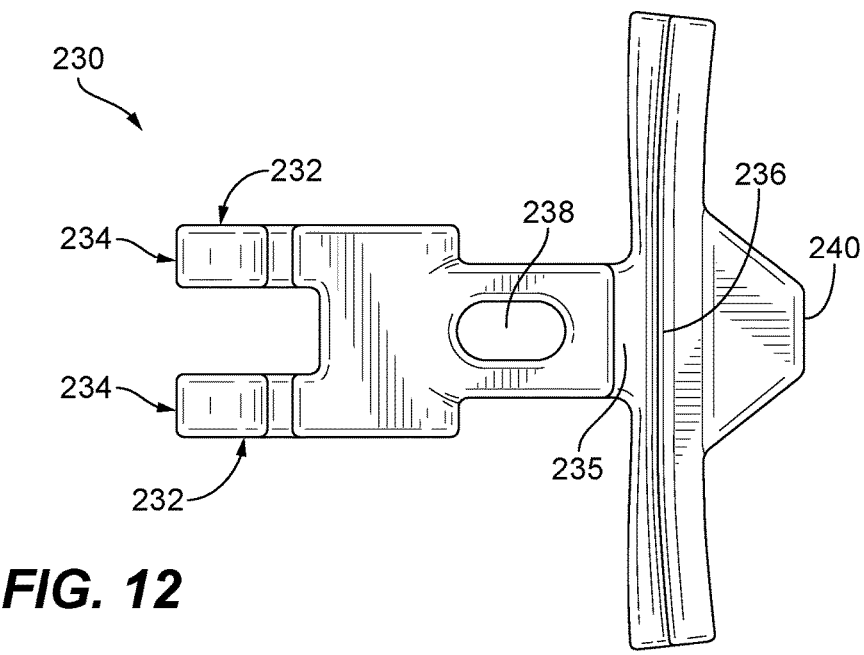
FIG. 12 is a bottom plan view of the lower body half of FIG. 7.
Figure 13:
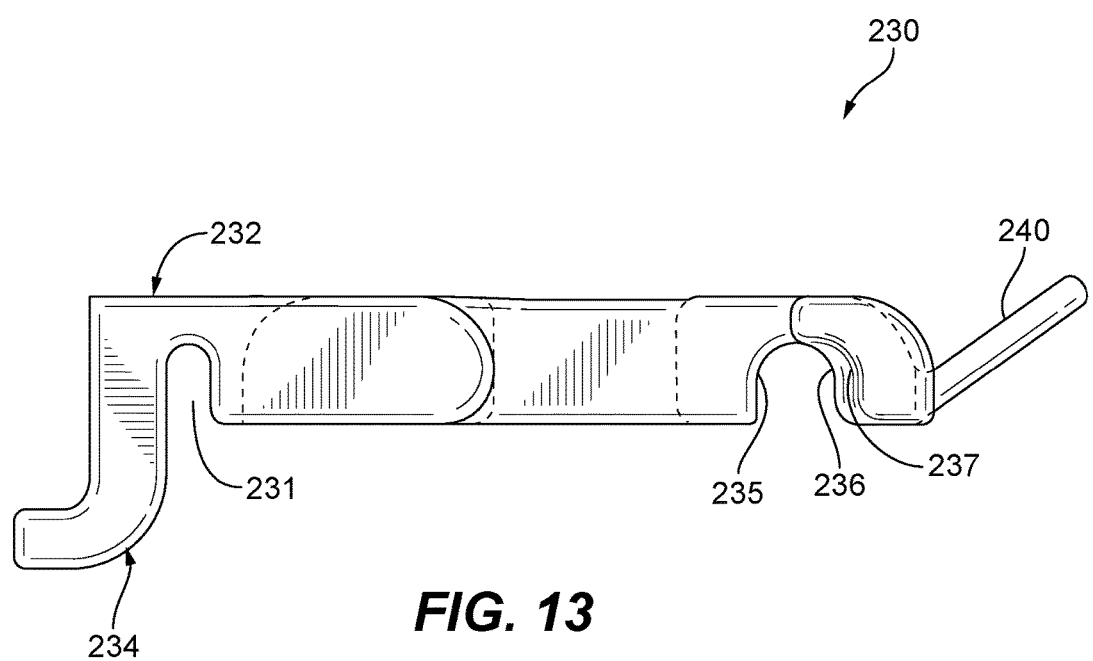
FIG. 13 is a side elevation view of the lower body half of FIG. 7.
Figure 14:
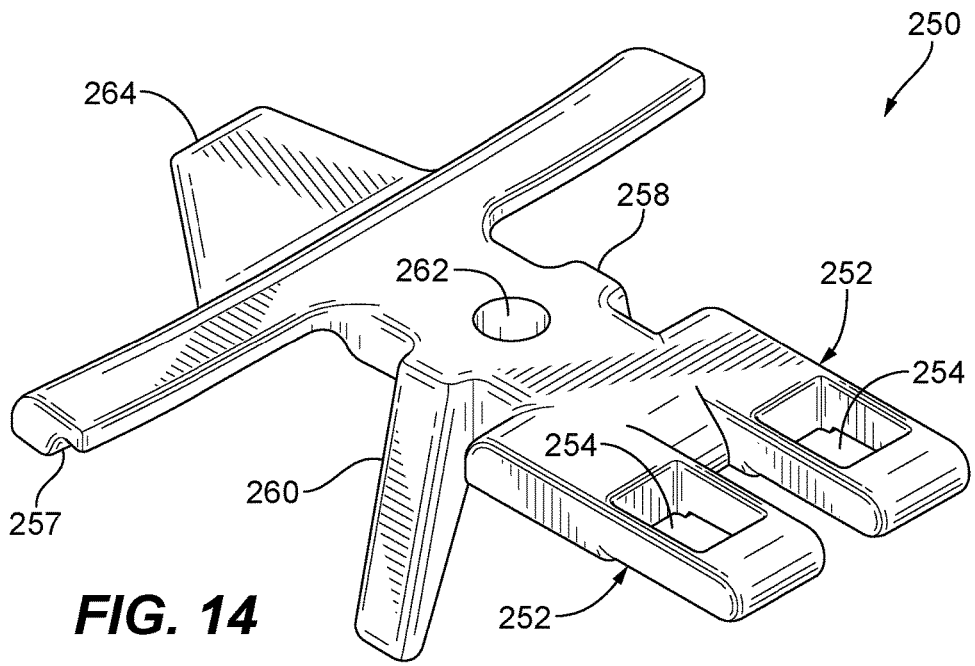
FIG. 14 is a top rear perspective view of an upper body half of the cable clamp of FIG. 1.
Figure 15:
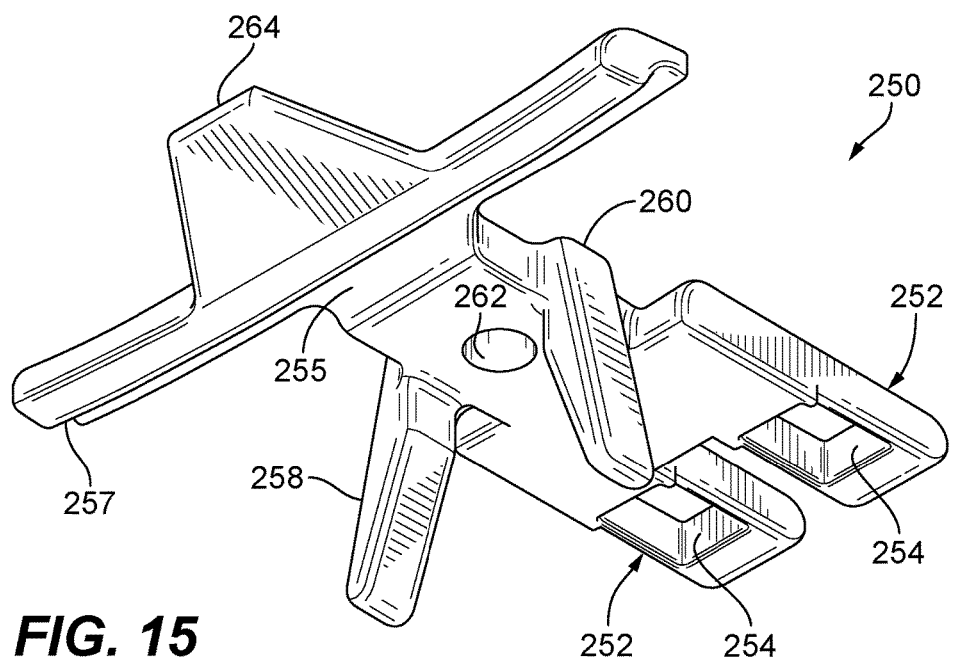
FIG. 15 is front bottom perspective view of the upper body half of the cable clamp of FIG. 14.
Figure 16:
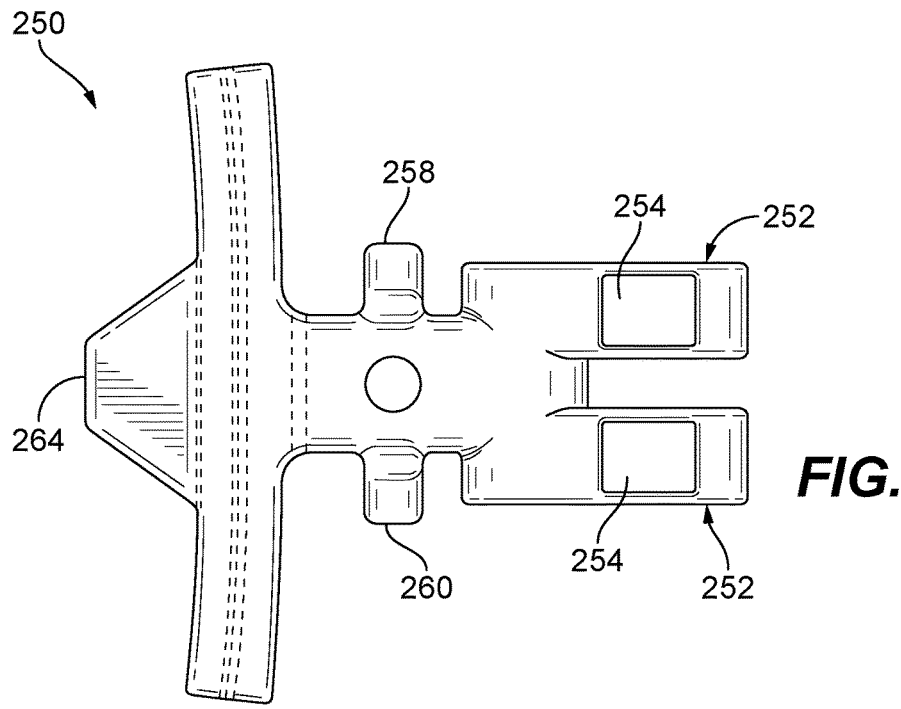
FIG. 16 is a top plan view of the upper body half of the cable clamp of FIG. 14.
Figure 17:
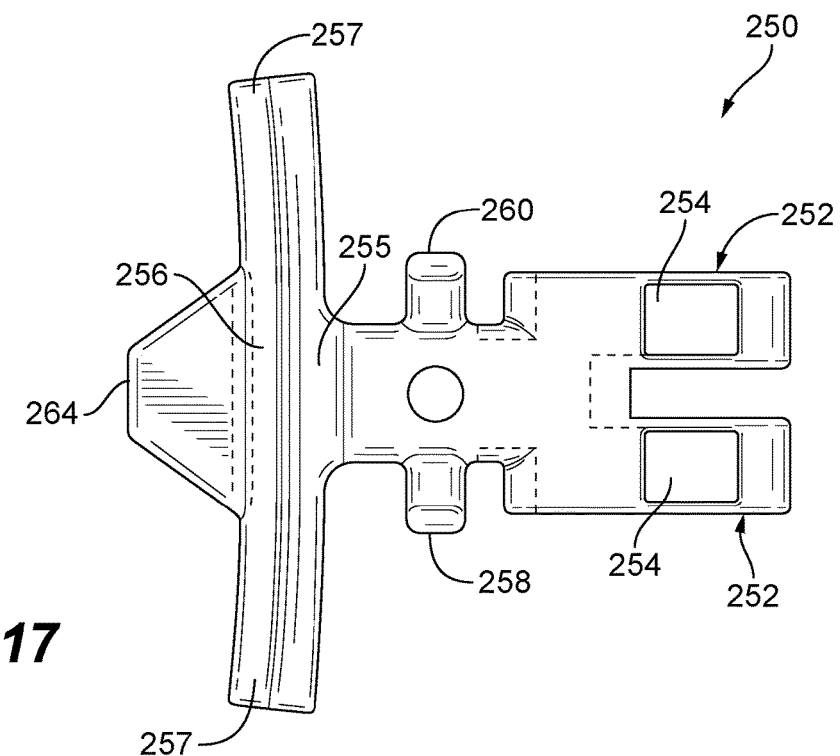
FIG. 17 is a bottom plan view of the upper body half of the cable clamp of FIG. 14.
Figure 18:
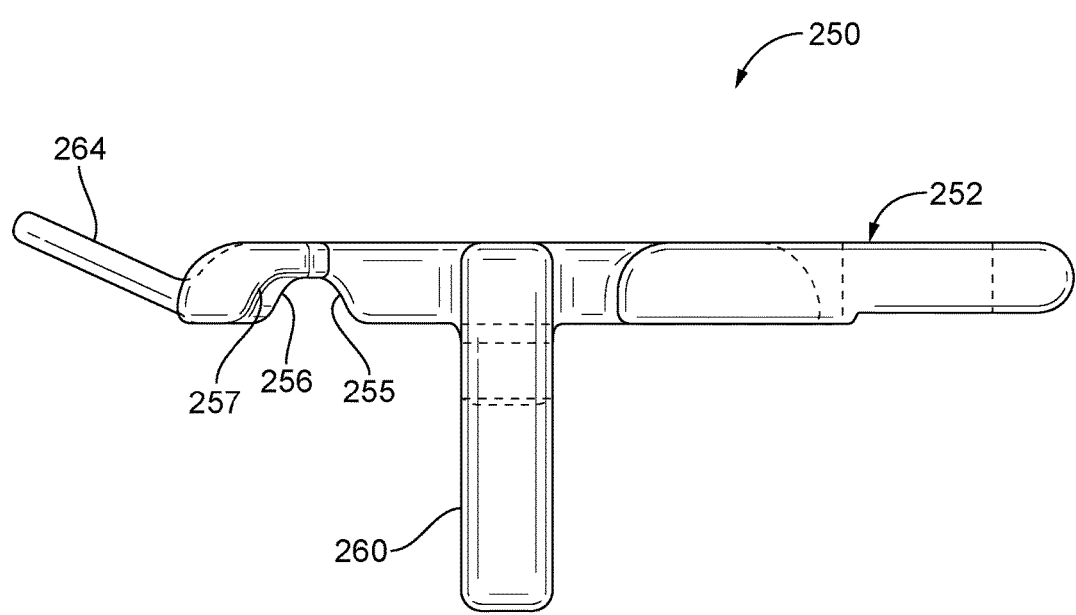
FIG. 18 is a side elevation view of the upper body half of the cable clamp of FIG. 14.
Figure 19:
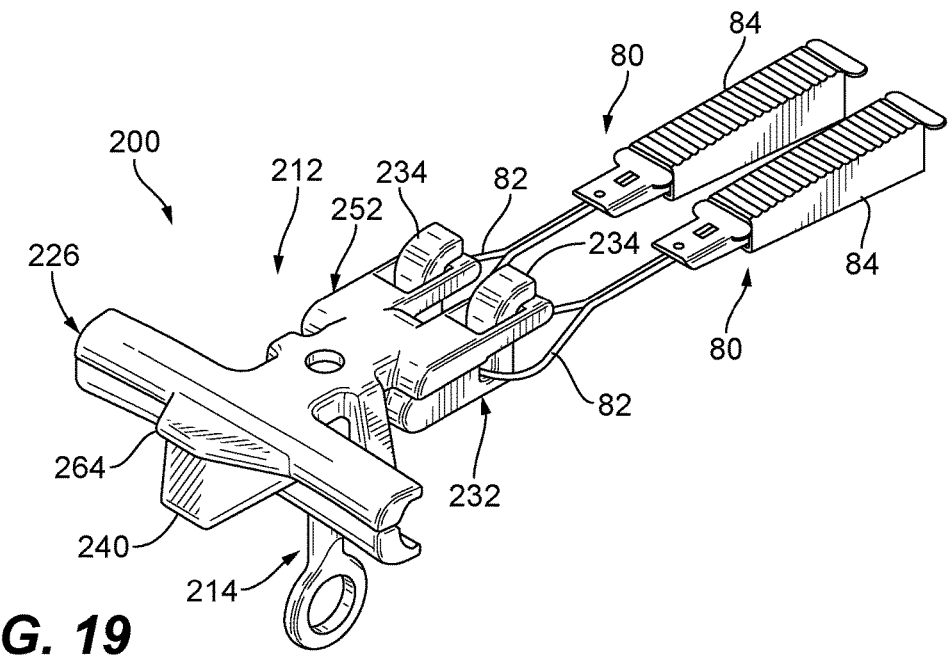
FIG. 19 is a top front perspective view of the cable clamp of FIG. 1, illustrating an exemplary embodiment of multiple drop cable clamp assemblies releasably attached to the cable clamp where bail wires of the drop cable clamp assemblies are within a drop cable section of the cable clamp.
Figure 20:
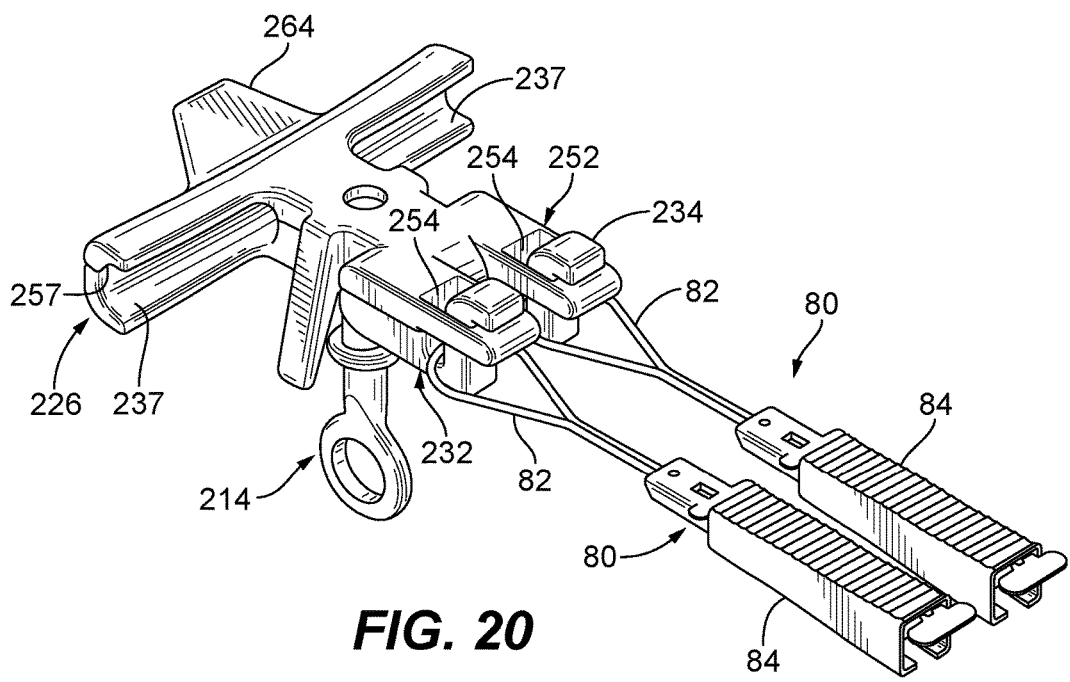
FIG. 20 is a top rear perspective view of the cable clamp and drop cable clamp assemblies of FIG. 19.

Continuing to refer to FIGS. 1-6, the main span cable section 224 of the body 212 is configured and dimensioned to form a cable guide 226 that is sufficient to support a main span cable. In the exemplary embodiment shown, the cable guide 226 has a length L, sufficient to support a main span cable. As a non-limiting example, a range for the length of the cable guide 226 may be from about 3 inches to about 8 inches. For reference purposes, the length of the cable guide 226 may be divided into three components, seen in FIG. 2, where a central section 226a has a length $L_1$, a first extension section 226b has a length $L_2$ and a second extension section 226c has a length $L_3$. As a non-limiting example, the length of the central section 226a may be in the range from about 1.0 inch to about 3 inches. The length of each extension section 226b and 226c may be the same or they may differ. As a non-limiting example, if the length L of the cable guide 226 is about 5.0 inches and the length $L_1$ of the central section 226a is about 1.5 inches, the length of the extension sections 226b and 226c may both be about 1.75 inches. As another non-limiting example, if the length L of the cable guide 226 is about 5.0 inches and the length $L_1$ of the central section 226a is about 1.5 inches, the length $L_2$ of the first extension section 226b may be about 2.5 inches and the length $L_3$ of the second extension section 226c may be about 1.0 inch. The cable guide 226 may be a straight structure, a flared structure, a curved structure or an irregular shaped structure. In the exemplary embodiment shown, the cable guide 226 is a flared structure where the central section 226a is substantially straight and each extension section 226b and 226c is flared such that a radius of curvature of the flare (represented by the dotted lines and angle "β" in FIG. 11) of each extension section is in the range from about 3.5 inches and about 20 inches. The flared extension sections 226b and 226c flare the main span cable away from the drop cable to decrease the bend strain on the main span cable.

Referring to FIGS. 7-13, an exemplary embodiment of the lower body half 230 of the clamp 200 will be described. The drop cable section 220 of the lower body half 230 has one or more arms 232 that extend away from the intermediate section 222 of the lower body half, as shown. Each arm 232 has a hook portion 234 that has a leg 234a extending substantially perpendicular from the arm 232, as shown, and a hook 234b extending from the leg 234a. Each arm 232 includes a channel 231 for receiving a wire bail of a drop cable clamp assembly as described below.

The intermediate section 222 of the lower body half 230 has an oblong or elongated opening 238 that permits the stem 214 to pass through the lower body half 230 and allows the lower body half 230 to pivot on the stem 214 relative to the upper body half 250. The main span cable section 224 of the lower body half 230 has cable grooves 235 and 236, seen in FIGS. 8 and 10, forming a cable cradle portion of the central section 226c of the cable guide 226. The extension sections 226b and 226c of the cable guide 226 have cable grooves 237. The lower body 230 has a lower lever arm 240 extending from the main span cable section 224 as shown. The lower lever arm 240 is preferably at an angle relative to the lower body half 230. The lower lever arm 240 is used when attaching main span cables to the clamp 200, as will be described below. A bottom surface of the lower lever arm 240 may include a reflective material that would be visible to a technician attaching the clamp 200 to a main span cable as described below. The reflective material may be applied to, incorporated into, impregnated into and/or attached to the bottom surface of the lower lever arm 240. Non-limiting examples of the reflective material include a reflective coating and reflective tape.

Referring to FIGS. 14-18, an exemplary embodiment of the upper body half 250 of the clamp 200 will be described. The drop cable section 220 of the upper body half 250 has one or more arms 252 that extend away from the intermediate section 222 of the upper body half, as shown. Each arm 252 has one or more openings 254 that are configured and dimensioned to receive the hook portion 234 of the drop cable section 220 of the lower body half 230. The intermediate section 222 of the upper body half 250 is configured so that the intermediate section 222 of the lower body half 230 sits between stabilizing legs 258 and 260 extending from the upper body half 250. More specifically, the stabilizing legs 258 and 260 extend from the intermediate section 222 of the upper body half 250 toward the lower body half 230, such that the stabilizing legs 258 and 260 along with the intermediate section 222 of the upper body half 250 form a cradle in which the intermediate section 222 of the lower body half 230 sits. The stabilizing legs 258 and 260 are also provided to engage a head portion of an extendable reach tool, e.g., a hot stick, as described below. In addition, the stabilizing legs 258 and 260 may also prevent rotational or lateral movement of the lower body half 230 relative to the upper body half 250 when installing the clamp 200 on a main span cable. The intermediate section 222 of the upper body 250 has a threaded opening 262 that is aligned with the oblong opening 238 in the intermediate section 222 of the lower body half 230. The threaded opening 262 is configured to receive the threaded portion 214a of the stem 214 to releasably couple the lower body half 230 to the upper body half 250. The main span cable section 224 of the upper body half 250 has cable grooves 255 and 256, seen in FIG. 17, forming a cable cradle portion of the central section 226c of the cable guide 226. The extension sections 226b and 226c of the cable guide 226 have cable grooves 257. Extending from the main span cable section 224 of the upper body 250 is an upper lever arm 264, as shown. The upper lever arm 264 is preferably at an angle relative to the upper body half 250. The upper lever arm 264 is used when attaching main span cables to the clamp 200, as will be described below.

Figure 27:
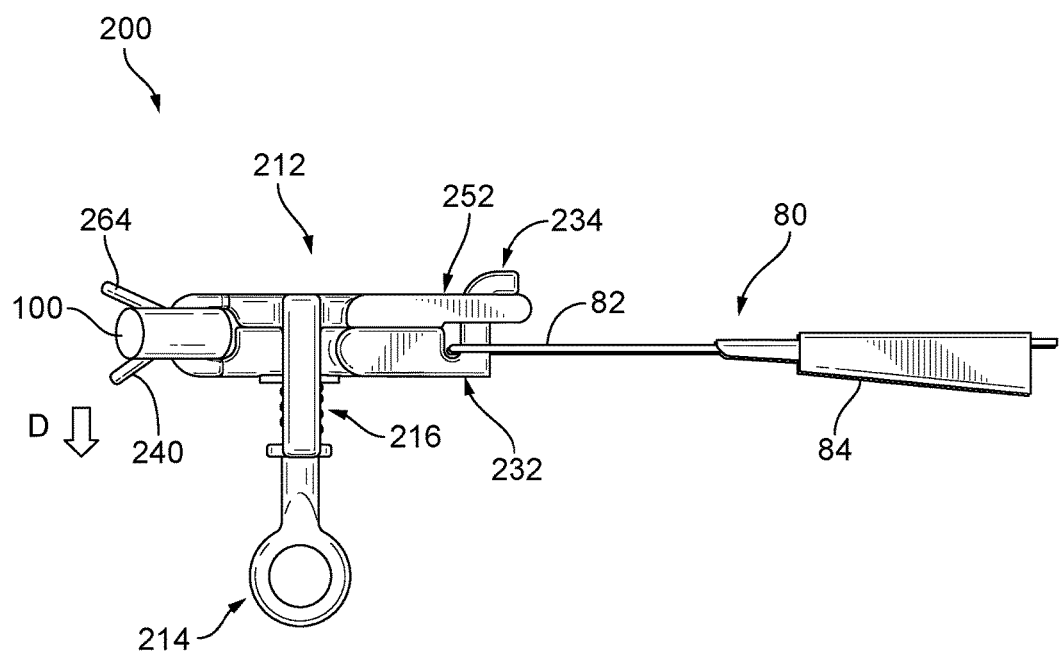
FIG. 27 is a side elevation view of the cable clamp and drop cable clamp assemblies of FIG. 23.
Figure 32:
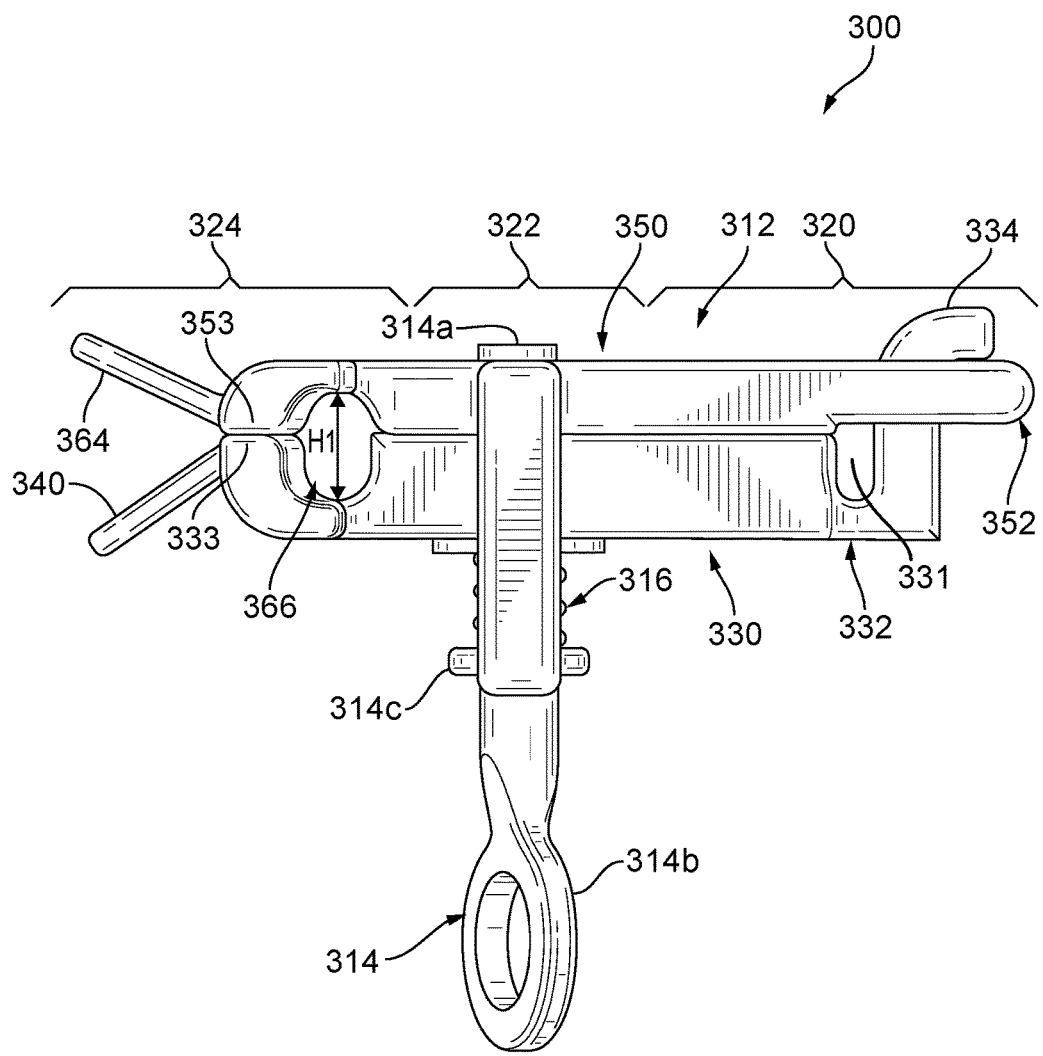
FIG. 32 is a side elevation view of the cable clamp of FIG. 28.
Figure 33:
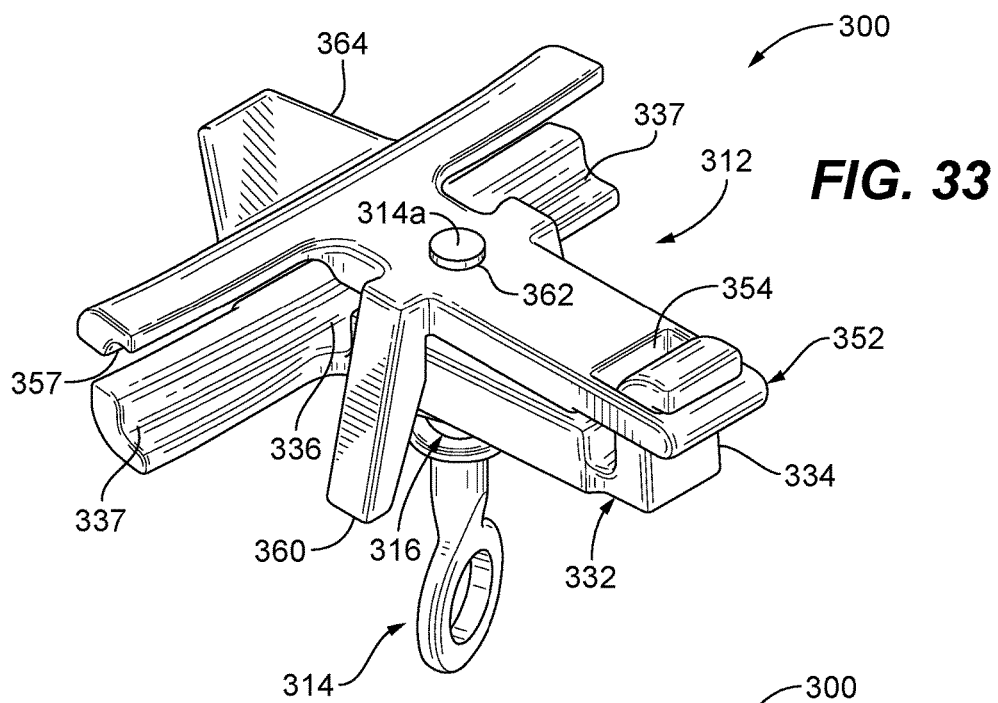
FIG. 33 is a top rear perspective view of the cable clamp of FIG. 28, illustrating the cable clamp in an open position.
Figure 34:
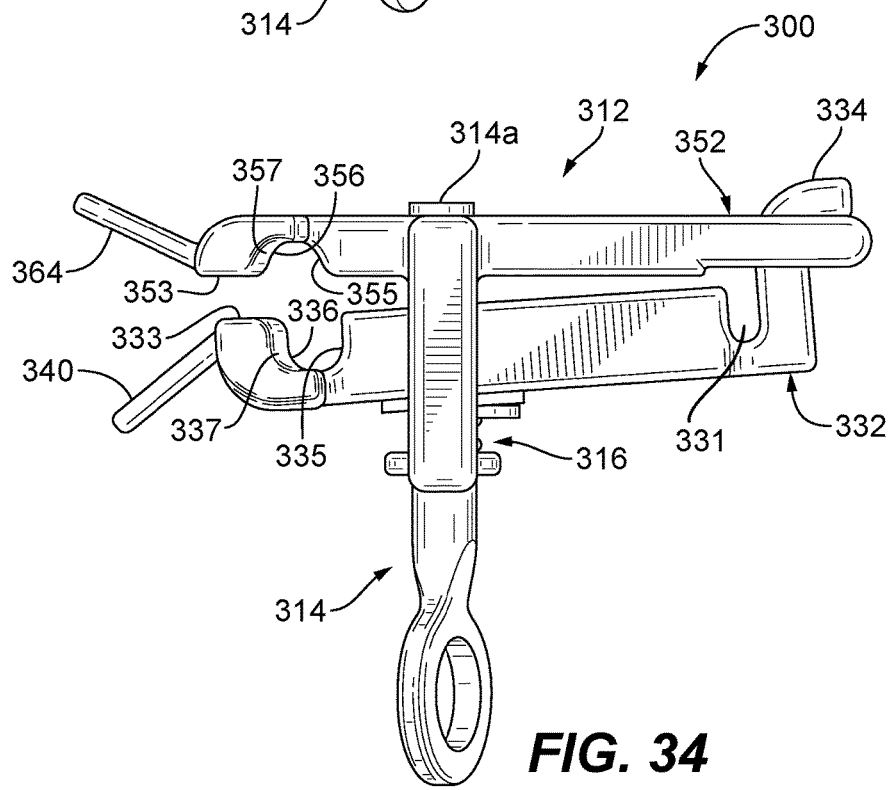
FIG. 34 is a side elevation view of the cable clamp of FIG. 33.
Figure 35:
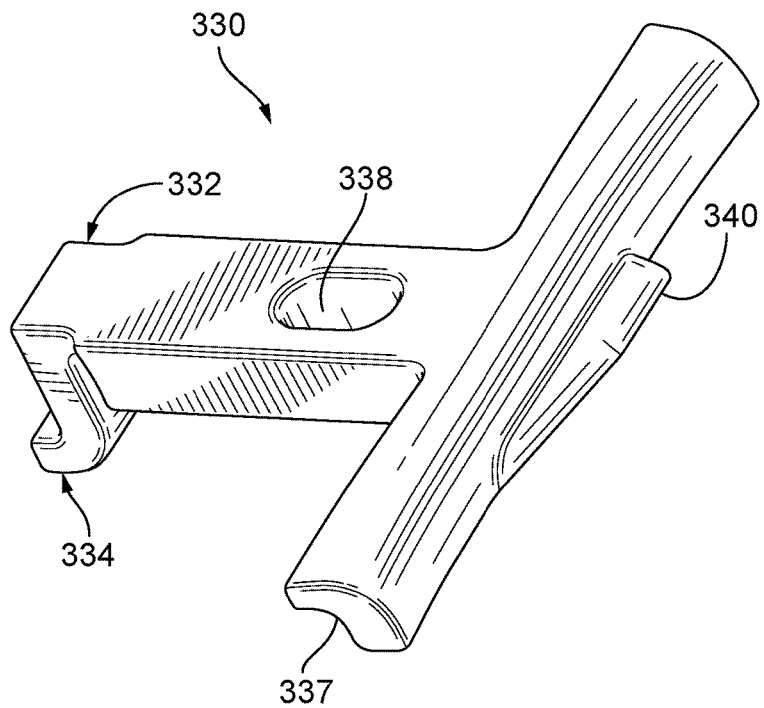
FIG. 35 is a top side perspective view of a lower body half of the cable clamp of FIG. 28.
Figure 36:
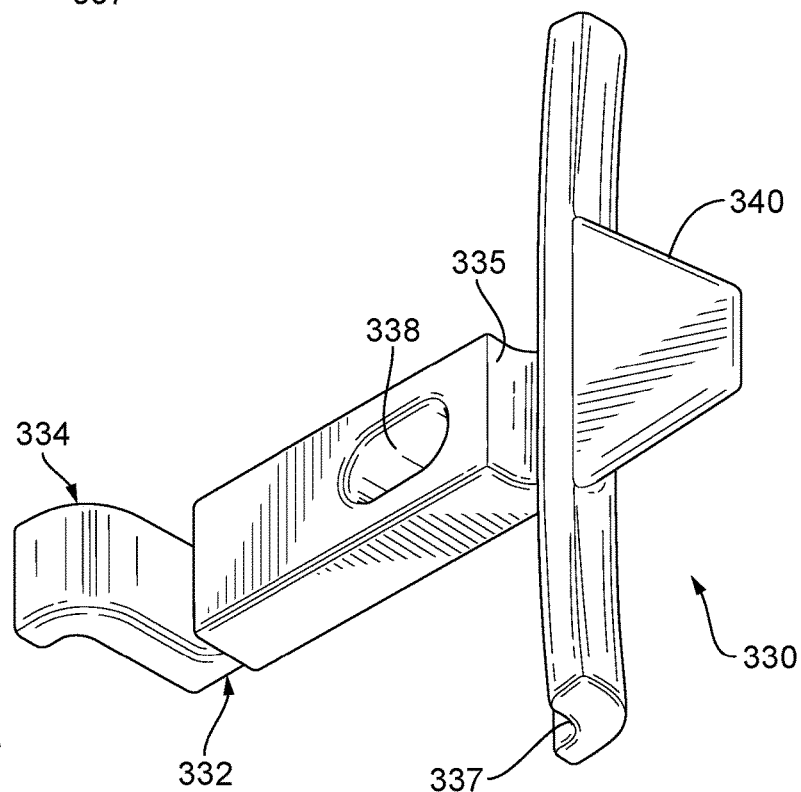
FIG. 36 is a bottom side perspective view of the lower body half of FIG. 35.

Thus, the clamp 200 has two body halves 230 and 250 that when coupled together by the stem 214 and spring 216 are configured to hold a main span cable and a drop cable assembly. More specifically, the spring 216 is held between the lower body half 230 and the collar 214c on the stem 214 and when the clamp 200 is in a clamping position, seen in FIG. 4, a clamping force generated by the spring 216 keeps the lower body half 230 and the upper body half 250 coupled together. When the two body halves 230 and 250 are in the clamping position, the hook portions 234 extending from the arms 232 of the drop section 220 of the lower body half 230 can fit within openings 254 of the arm 252 of the upper body half 250 to interlock the drop section 220 of the lower body half 230 with the drop section of the upper body half 250, and the channels 231 in the lower body section 230 provide openings in which to receive bail wires 82 of a drop cable clamp assembly 80, seen in FIGS. 19-27. It is noted that the bail wires 82 positioned within the channels 231 permit the bail wires and thus the drop cable clamp assemblies to rotate or otherwise move relative to the clamp 200. In addition, when the two body halves 230 and 250 are in the clamping position, the main span cable grooves 235 and 236 in the main span section 224 of the lower body half 230 and the main span cable grooves 255 and 256 in the main span section 224 of the upper body half 250 form a cable cradle 266, seen in FIG. 4. The cable cradle 266 is configured and dimensioned to receive and support a main span cable 100 installed in the clamp 200. It is noted that the cable cradle 266 is configured in this exemplary embodiment so that the main span cable 100 sits within the cable guide 226 in a vertical orientation, as shown in FIG. 27. By orienting the cables in a vertical orientation bend stresses on the main span cable can be minimized. However, the cable cradle 266 can be configured in so that the main span cable 100 sits within the cable guide 226 in any other desired orientation.

Turning to FIGS. 19-27, to attach a drop cable clamp assembly 80 to the clamp 200, a user, e.g., a technician, separates the lower body half 230 of the clamp 200 from the upper body half by removing the stem 214 from the upper body half 250 and removing the hook portions 234 of the lower body half from the opening 254 of the upper body half 250. With the body halves separated, the bail wires 82 of the drop cable clamp assemblies 80 are then inserted into respective channels 231 in the lower body half 230, as shown. The hooks 234b of the hook portions 234 of the lower body half 230 are then inserted into the openings 254 of the upper body half 250 such that the drop section 220 of the lower body half 230 interlocks with the drop section of the upper body half 250. The threaded end 214a of the stem 214 is then threaded into the threaded opening 262 in the upper body half 250 until the spring 216 biases the lower body half 230 toward the upper body half 250 so that the body 212 is in the clamping position, seen in FIG. 4. The spring 216 provides a clamping force to at least temporarily hold the bail wire 82 of the drop cable clamp assembly 80 within the channels 231.

Figure 21:
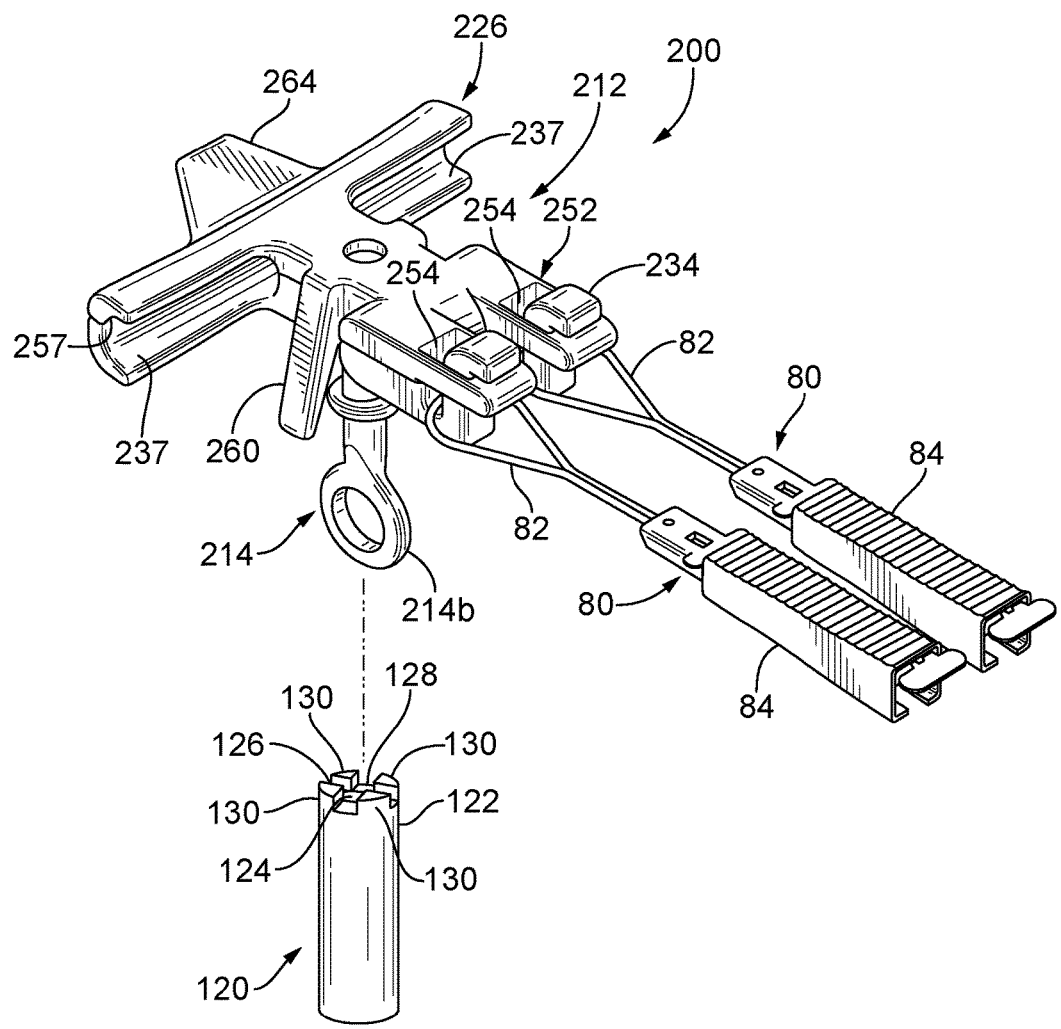
FIG. 21 is a top rear perspective view of the cable clamp and drop cable clamp assemblies of FIG. 19 and a head portion of an exemplary embodiment of an extendable reach tool, illustrating a stem of the cable clamp positioned for insertion into the head portion of the extendable reach tool.
Figure 22:
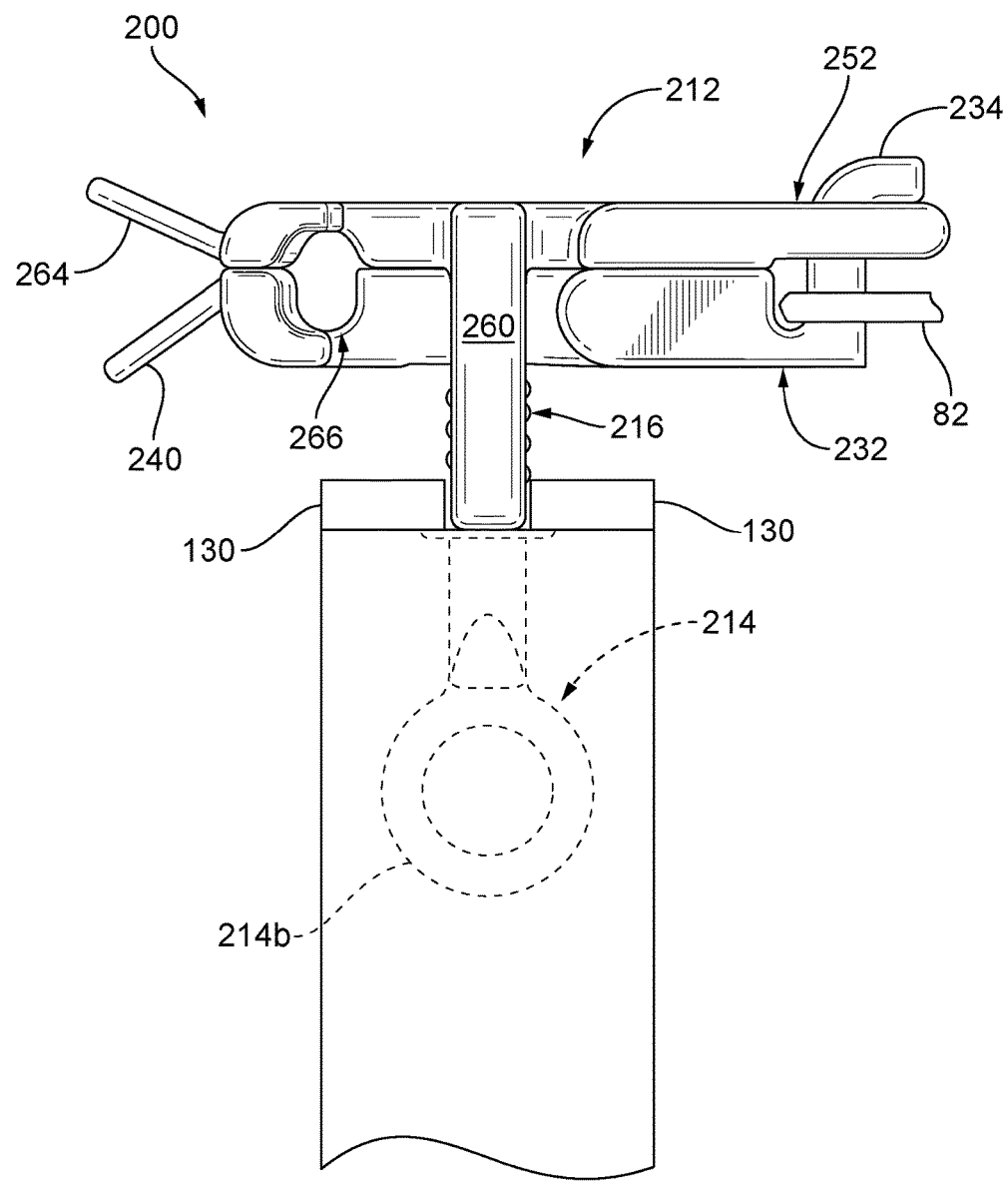
FIG. 22 is a side elevation view of the cable clamp, a portion of a drop cable clamp assembly and the head portion of the extendable reach tool of FIG. 21, illustrating the stem of the cable clamp within the head portion of the extendable reach tool.
Figure 23:
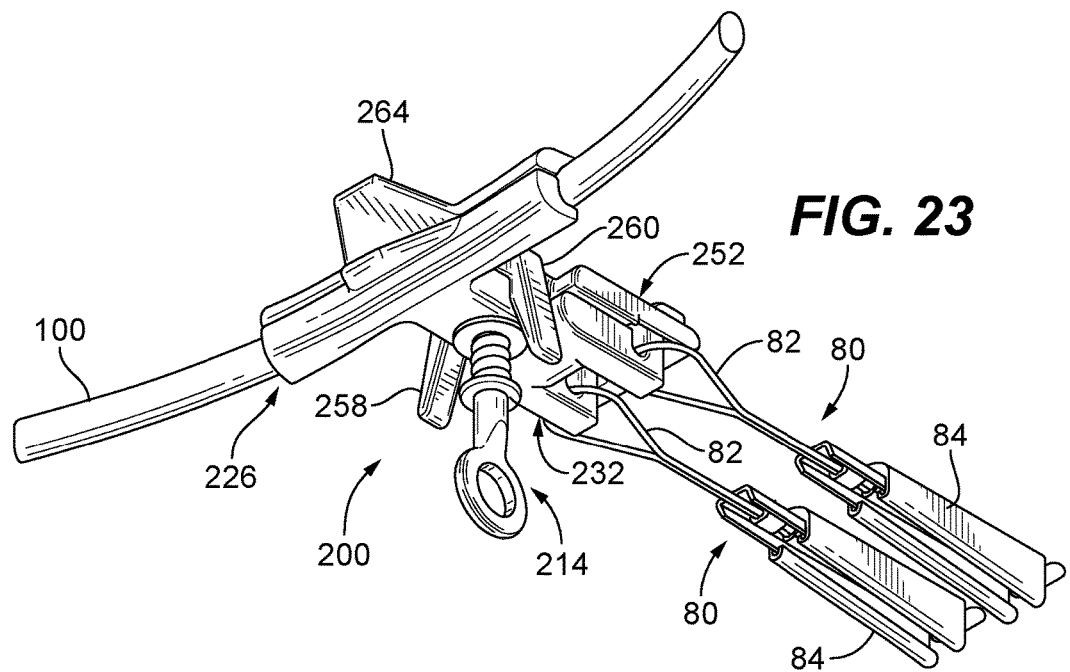
FIG. 23 is a bottom front perspective view of the cable clamp and drop cable clamp assemblies of FIG. 19 with a main cable positioned within a main cable section of the cable clamp.
Figure 24:
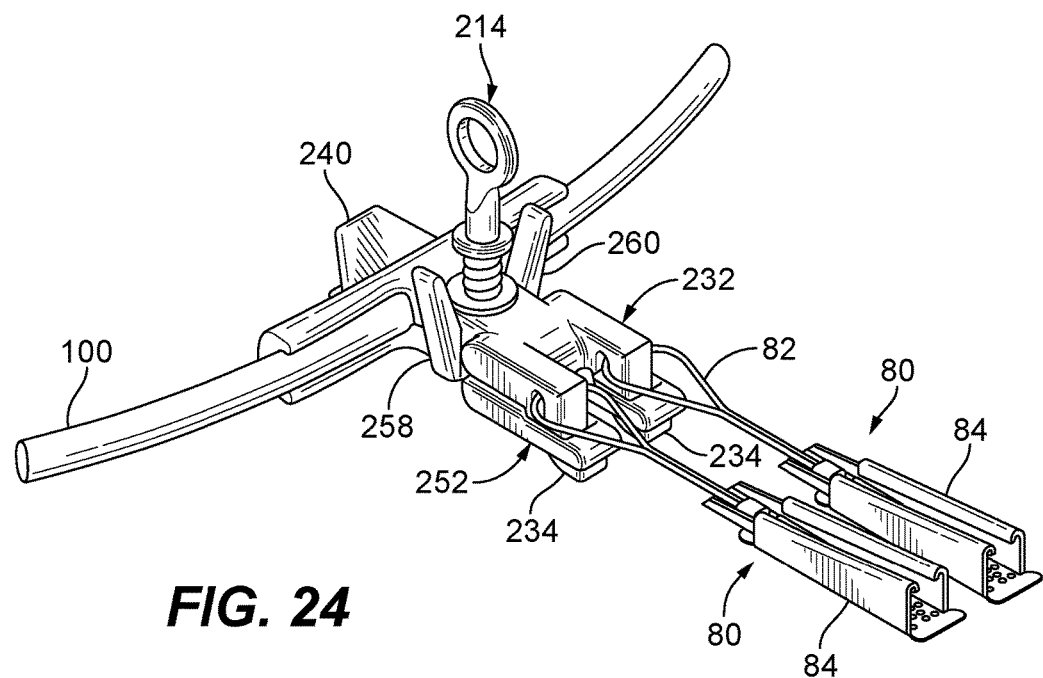
FIG. 24 is a bottom rear perspective view of the cable clamp and drop cable clamp assemblies of FIG. 23.
Figure 25:
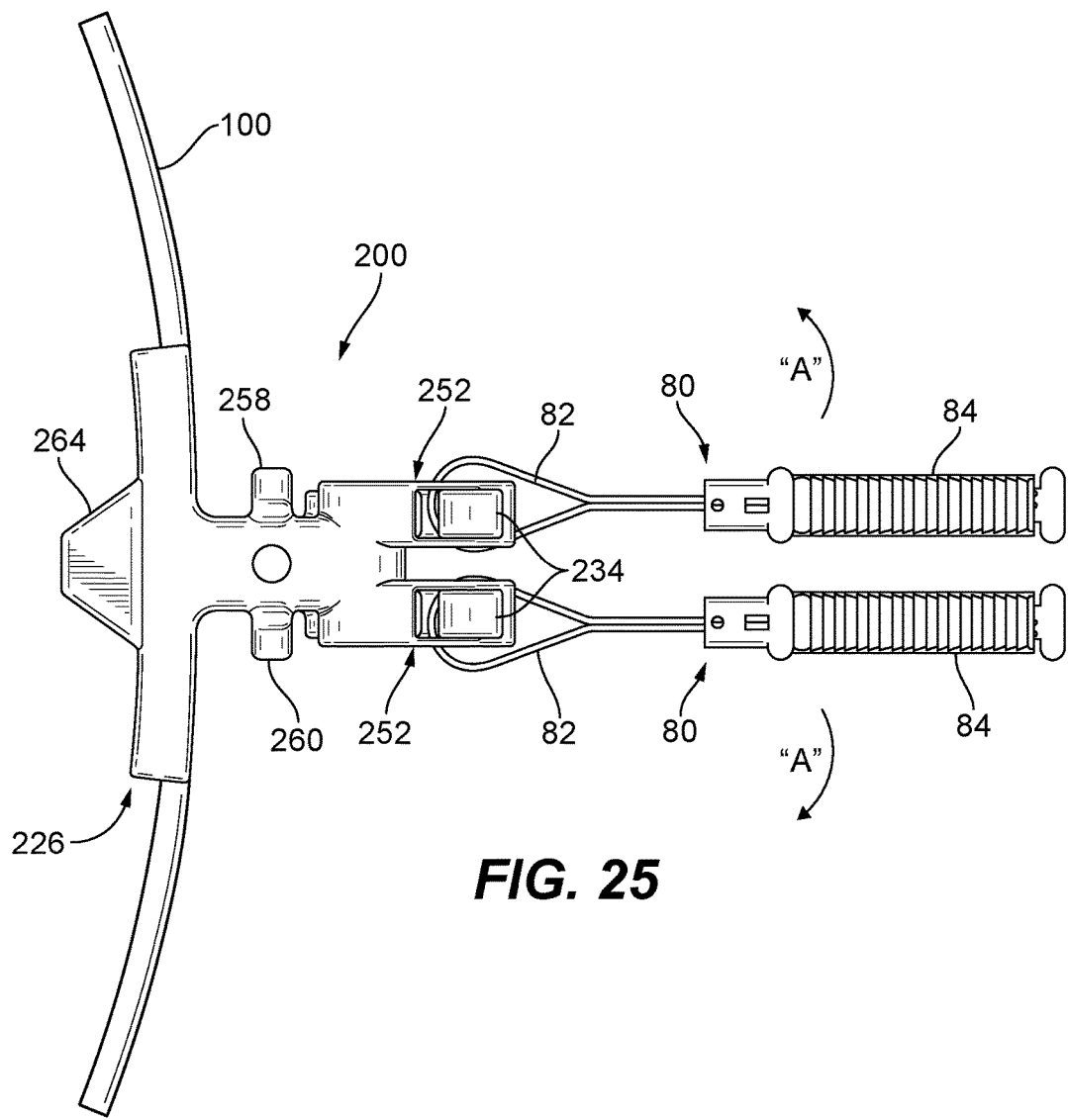
FIG. 25 is a top plan view of the cable clamp and drop cable clamp assemblies of FIG. 23.
Figure 26:
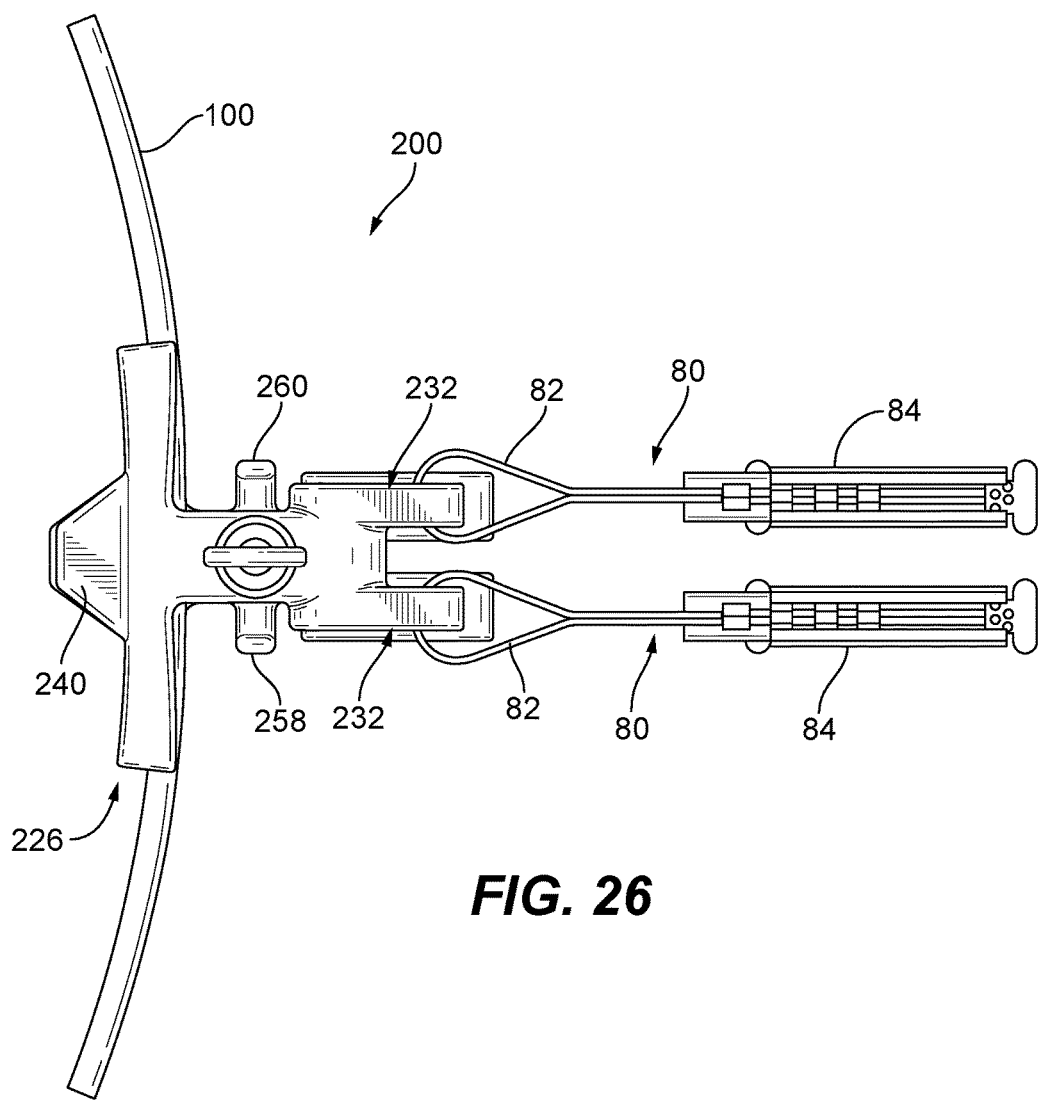
FIG. 26 is a bottom plan view of the cable clamp and drop cable clamp assemblies of FIG. 23.

Referring to FIGS. 21 and 22, the clamp 200 can then be releasably attached to a head portion 122 of an extendable reach tool 120, e.g., a hot stick, using the eye 214b in the stem 214. More specifically, the head portion 122 of the extendable reach tool 120 has a central opening 124 and intersecting channels 126 and 128 that form four tabs 130. A technician can insert the eye-stem 214b of the stem 214 into the central opening 124 in the head portion 122 of the extendable reach tool 120 until stabilizing legs 258 and 260 extending from the upper body half 250 of the body 212 are positioned with respective channels 126 or 128 as shown in FIG. 22. The central opening 124 may be configured so that when the eye-stem 214b is inserted into the central opening it is temporarily held in place by a friction fit.

Referring now to FIGS. 5, 6 and 23-27, with the clamp 200 releasably attached to the extendable reach tool 120, a user, e.g., a technician, can then attach the main span section 224 of the clamp 200 to a main span cable 100 by snapping the main span cable 100 into the cradle 266 in the cable guide 226 of the main span section 224 of the body 212. More specifically, the main span cable 100 is first positioned between the lower lever arm 240 and the upper lever arm 264. The clamp 200 is then forced against the main span cable 100, using the extendible reach tool 120, so that the lower body half 230 pivots in the direction of arrow D, seen in FIG. 27, separating the main span section 224 of the lower body half 230 from the main span section 224 of the upper body half 250 until the main span section 224 of the body 212 is in an open position, seen in FIGS. 5 and 6, allowing the main span cable 100 to pass into the cradle 266 in the cable guide 226 of the body 212. Separating the lower body half 230 from the upper body half 250 also compresses the spring 216. Once the main span cable 100 passes into the cradle 266 the force compressing the spring 216 is released so that the spring biases the lower body half 230 toward the upper body half 250 such that the body 212 returns to the clamping position, seen in FIG. 27, providing a clamping force to at least temporarily hold the main span cable 100 within the cable guide 226.

It is noted that a drop cable (not shown) is usually attached to a drop cable clamp 84, seen in FIGS. 23-27, of the drop cable clamp assembly 80 when the cable clamp assembly is attached to the clamp 200 and before the clamp is releasably attached to the extendible reach tool 120. As such, the drop cable applies tension to the main span cable when the clamp 200 is attached to a main span cable. This tension can cause the main span cable 100 to deflect or bend. However, the first and second extension sections 226b and 226c of the cable guide 226 are provided to minimize the deflection or bending of the main span cable 100. It is also noted that drop cable clamp assemblies are known. Non-limiting examples of a drop cable clamp assemblies are the models C2PRAS and C2PRSS 1-2 pair drop cable clamp assemblies sold by Hubbell Incorporated and the models C6PRAD and C6PRSD 6 pair drop cable clamp assemblies also sold by Hubbell Incorporated.

Once the clamp 200 and drop cable clamp assemblies 80 are properly secured to a main span cable 100, the stem 214 can be tightened by rotating the stem clockwise which is translated to movement of the lower body half 230 relative to the upper body half 250 to lock the main span cable 100 and drop cable clamp assembly 80 in place within the clamp 200, as shown in FIGS. 21-27. It is noted that the cable cradle halves in the main body section 224 are configured so that when the two body halves 230 and 250 are in the clamping position the cable cradles halves bottom out preventing the exertion of excessive force to the main span cable 100 crushing and possibly damaging the cable no matter how much torque is applied to the stem 214. More specifically, and referring to FIGS. 4 and 27, when the two body halves 230 and 250 come together the height H1 of the central section 226a of the cable guide 226 is defined by the flat surface 233 on the lower body half 230 and the flat surface 253 on the upper body half 250. The height H1 can be set so that there is suitable clamping of a cable inserted in the central section 226a of the cable guide 226, and possibly permitting a certain amount of jacket deflection in the cable, without crushing the cable within the opening to a point causing, for example, an attenuation increase resulting in a signal loss, and/or mechanical damage to the fiber within the cable 100.

Referring now to FIGS. 28-34, another exemplary embodiment of the clamp according to the present disclosure is shown. The clamp 300 includes a body 312, a stem 314 and a spring 316. The body 312 has a lower body half 330 and an upper body half 350. For general reference purposes the body 312 is split into three sections: a drop cable section 320, an intermediate section 322 and a main span cable section 324, seen in FIG. 32. The stem 314 is preferably an eyestem that has a threaded end 314a, an eye 314b for coupling with an extendable reach tool, for example, a hot stick, and a collar 314c for supporting the spring 316. The body 312, stem 314 and spring 316 may be made of a metallic material, such as aluminum, cast aluminum, galvanized steel or stainless steel, or a combination of metallic materials. In another exemplary embodiment, the body 312, stem 314 and spring 316 may be made of a non-metallic material, such as a rigid plastic or composite materials e.g., carbon fiber.

Continuing to refer to FIGS. 28-34, the main span cable section 324 of the body 312 is configured and dimensioned to form a cable guide 326 that is sufficient to support a main span cable. In the exemplary embodiment shown, the cable guide 326 has a length L, sufficient to support a main span cable. As a non-limiting example, a range for the length of the cable guide 326 may be from about 3 inches to about 8 inches. For reference purposes, the length of the cable guide 326 may be divided into three components where a central section 326a has a length $L_1$, a first extension section 326b has a length $L_2$ and a second extension section 326c has a length $L_3$. As a non-limiting example, the length of the central section 326a may be in the range from about 1.0 inch to about 3 inches. The length of each extension section 326b and 326c may be the same or they may differ. As a non-limiting example, if the length L of the cable guide 326 is about 5.0 inches and the length $L_1$ of the central section 326a is about 1.5 inches, the length of the extension sections 326b and 326c may both be about 1.75 inches. As another non-limiting example, if the length L of the cable guide 326 is about 5.0 inches and the length $L_1$ of the central section 326a is about 1.5 inches, the length $L_2$ of the first extension section 326b may be about 2.5 inches and the length $L_3$ of the second extension section 326c may be about 1.0 inch.

Figure 37:
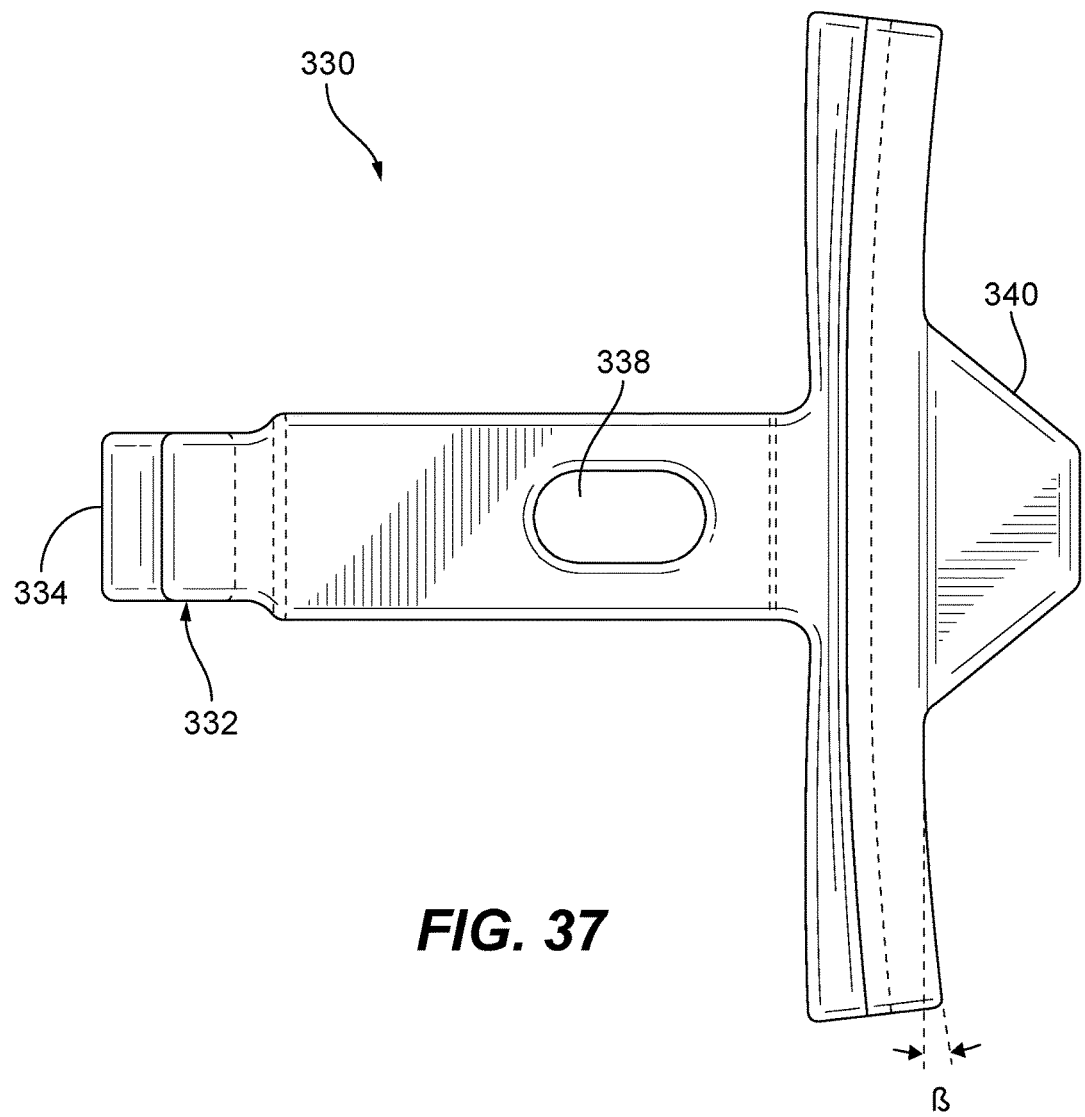
FIG. 37 is a top plan view of the lower body half of FIG. 35.
Figure 38:
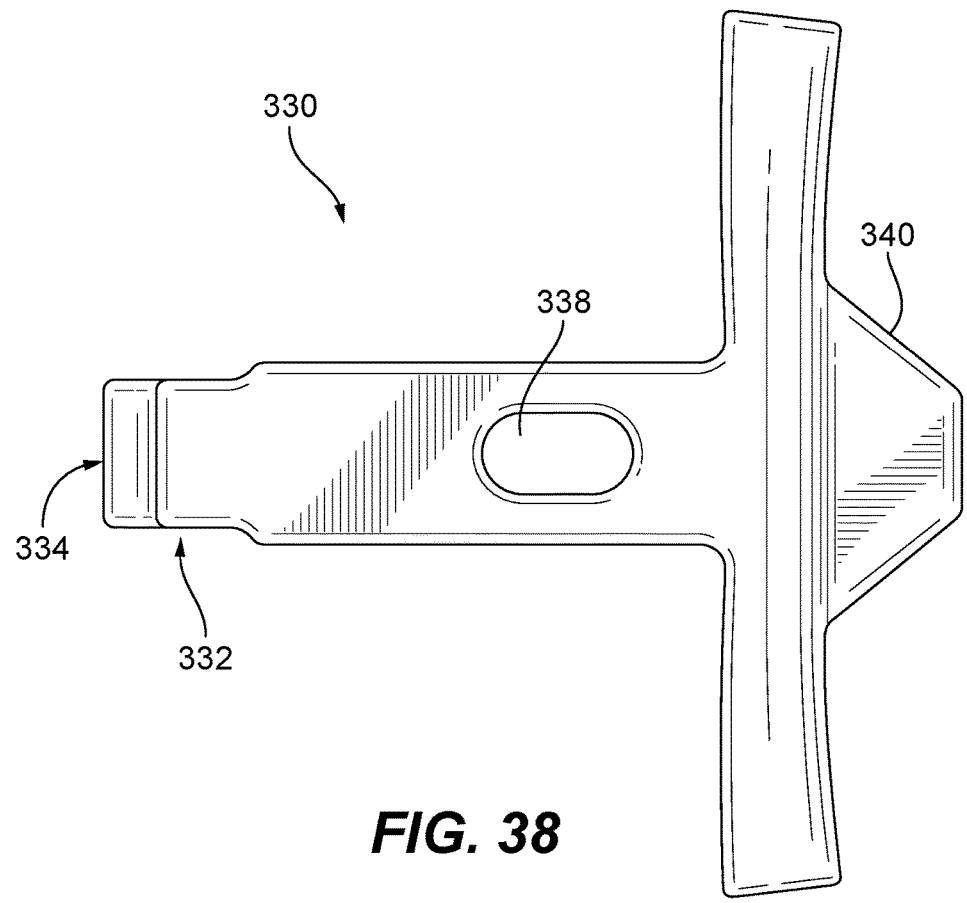
FIG. 38 is a bottom plan view of the lower body half of FIG. 35.
Figure 39:
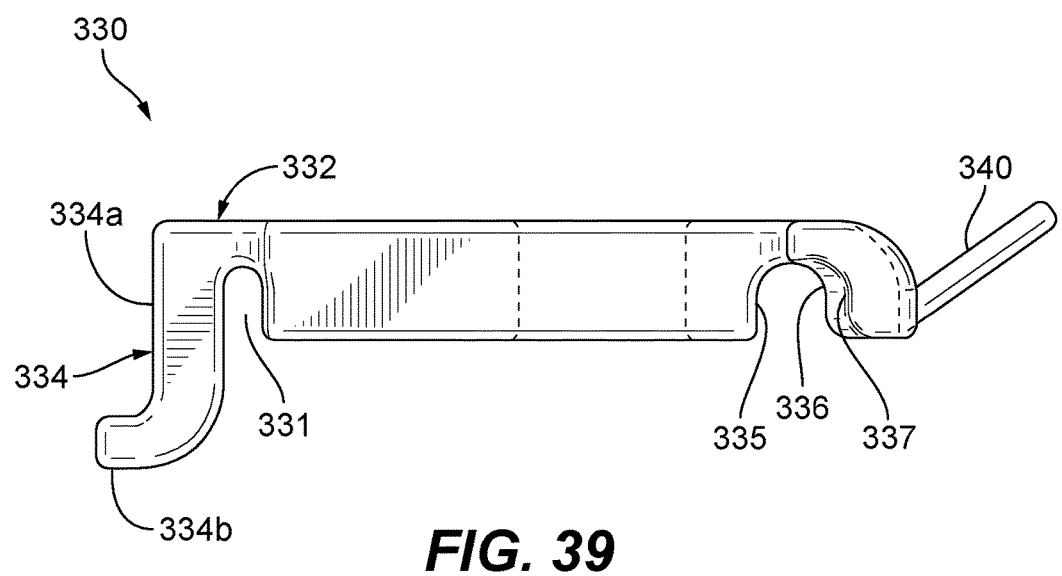
FIG. 39 is a side elevation view of the lower body half of FIG. 35.
Figure 40:
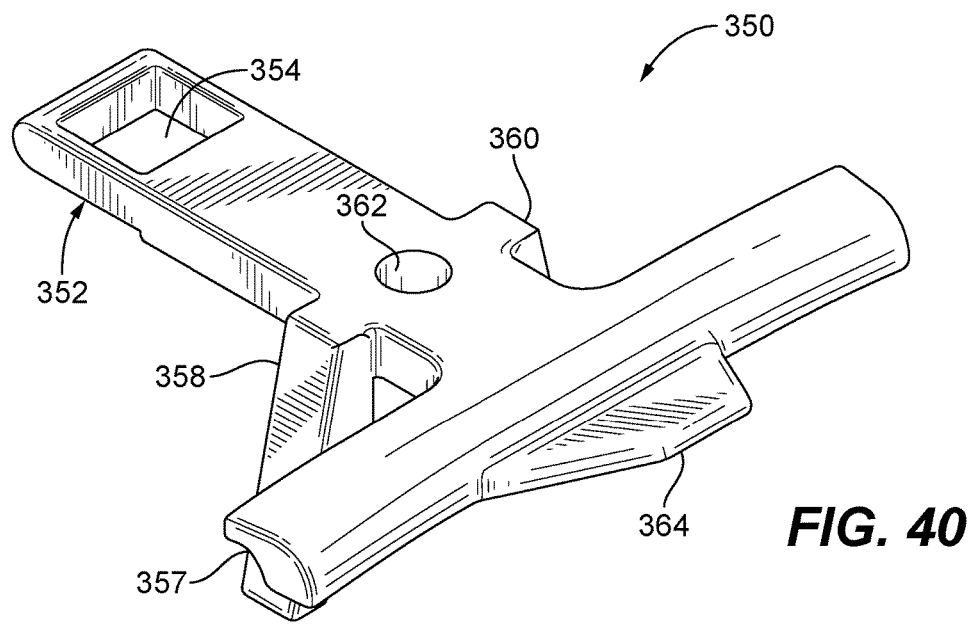
FIG. 40 is a top front perspective view of an upper body half of the cable clamp of FIG. 28.
Figure 41:
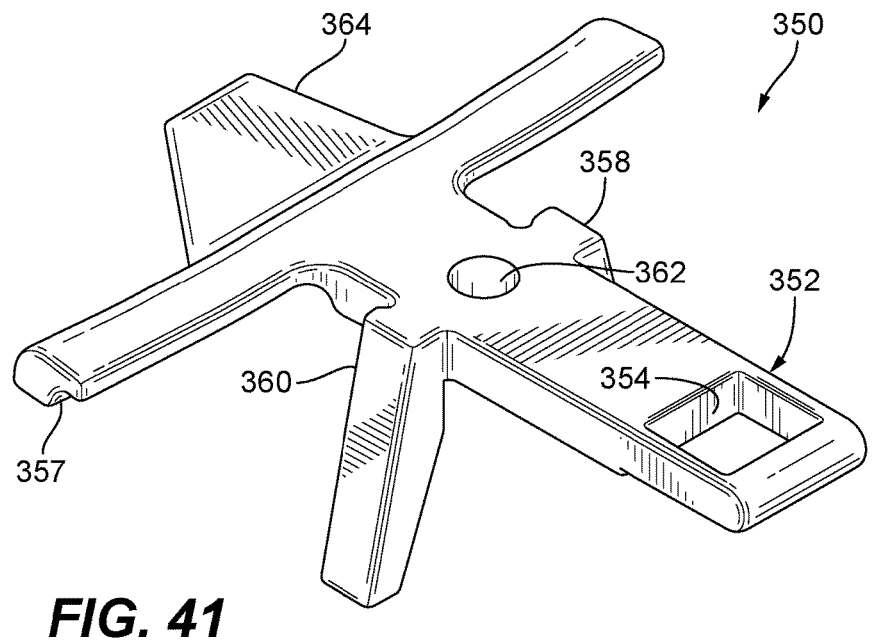
FIG. 41 is top rear perspective view of the upper body half of the cable clamp of FIG. 40.
Figure 42:
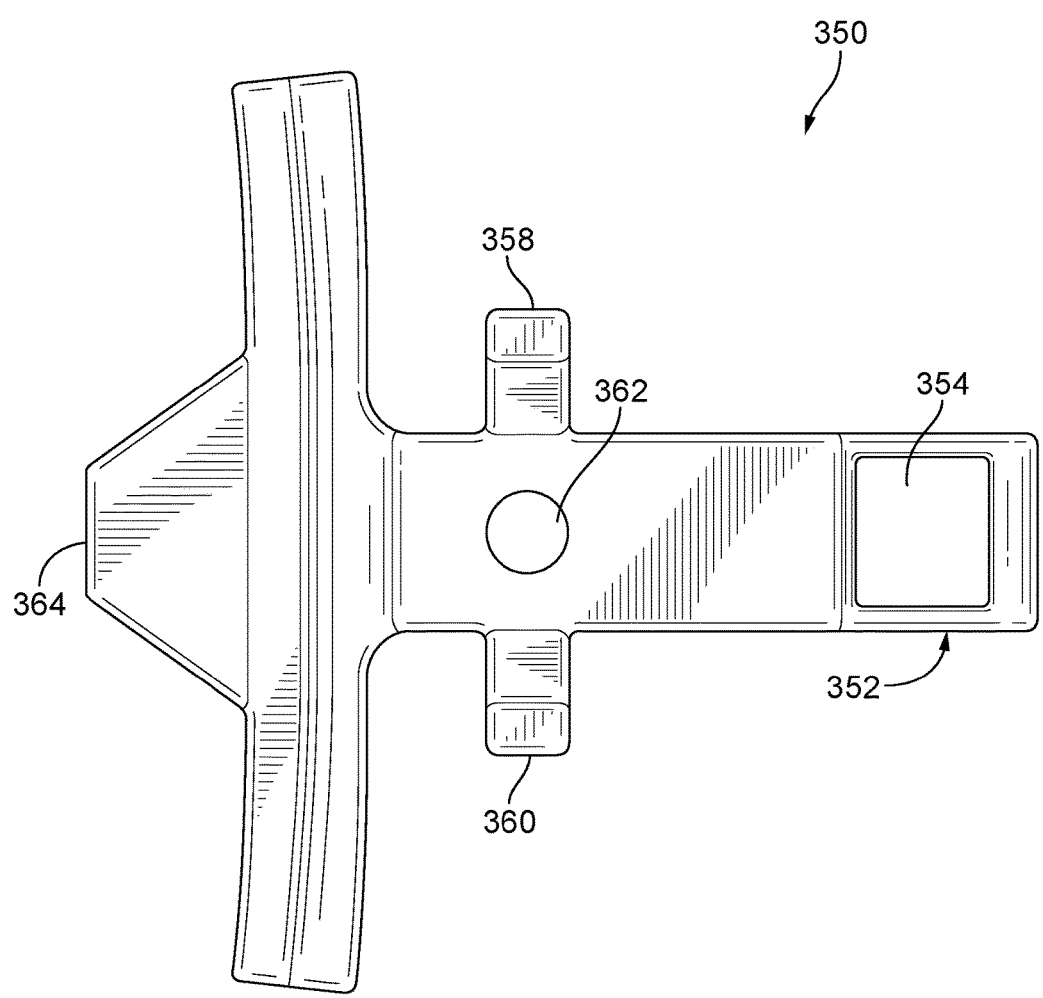
FIG. 42 is a top plan view of the upper body half of the cable clamp of FIG. 40.
Figure 43:
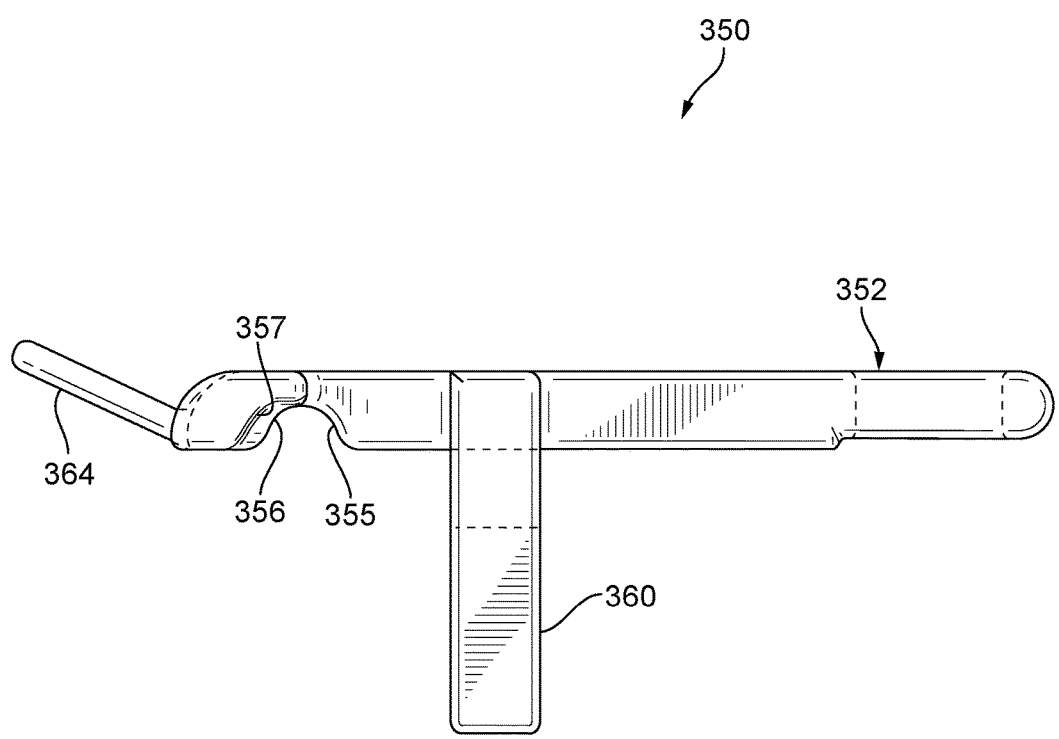
FIG. 43 is a side elevation view of the upper body half of the cable clamp of FIG. 40.
Figure 44:
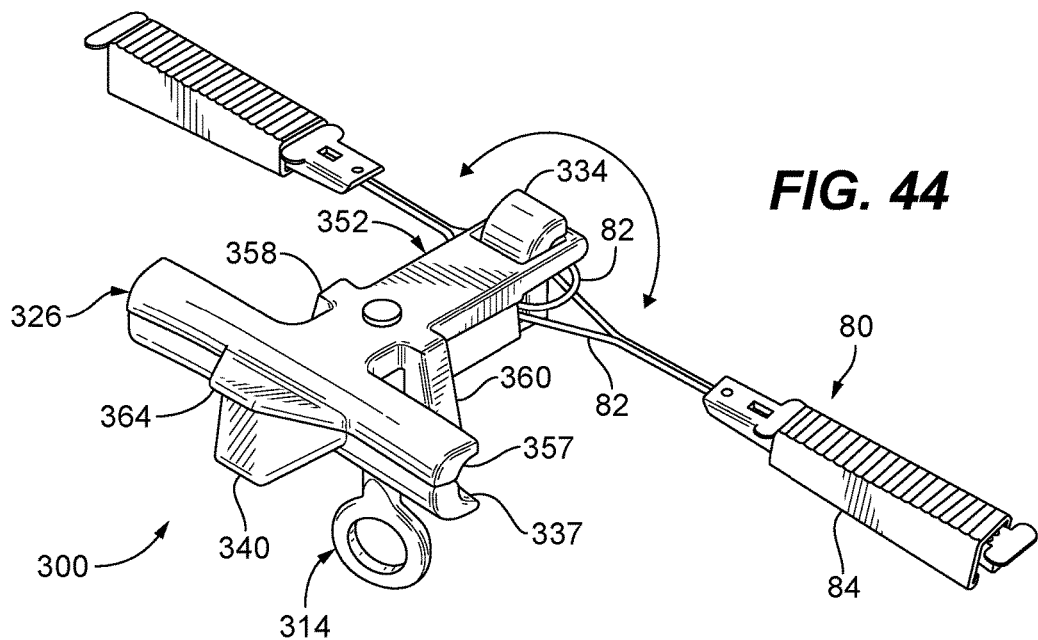
FIG. 44 is a top front perspective view of the cable clamp of FIG. 28, illustrating an exemplary embodiment of multiple drop cable clamp assemblies releasably attached to the cable clamp where bail wires of the drop cable clamp assemblies are within a drop cable section of the cable clamp.
Figure 45:
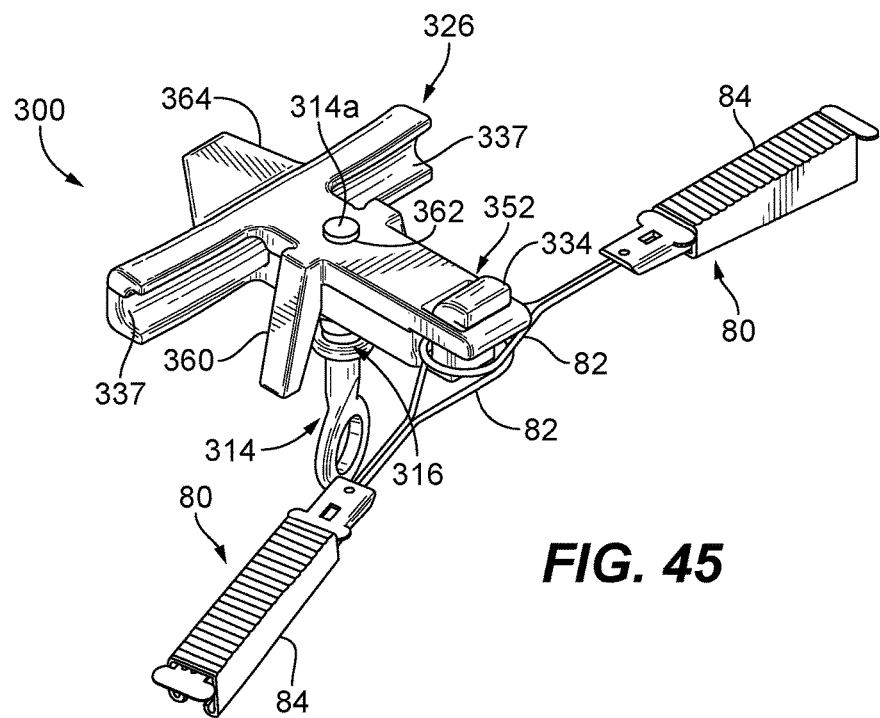
FIG. 45 is a top rear perspective view of the cable clamp and drop cable clamp assemblies of FIG. 44.

The cable guide 326 may be a straight structure, a flared structure, a curved structure or an irregular shaped structure. In the exemplary embodiment shown, the cable guide 326 is a flared structure where the central section 326a is substantially straight and each extension section 326b and 326c is flared such that a radius of curvature of the flare (represented by the dotted lines and angle "β" in FIG. 37) of each extension section is in the range from about 3.5 inches and about 20 inches. The flared extension sections 326b and 326c flare the main span cable away from the drop cable to decrease the bend strain on the main span cable.

Referring to FIGS. 35-39, an exemplary embodiment of the lower body half 330 of the clamp 300 will be described. The drop cable section 320 of the lower body half 330 has an arm 332 that extend away from the intermediate section 322 of the lower body half, as shown. The arm 332 has a hook portion 334 that has a leg 334a extending substantially perpendicular from the arm 332, as shown, and a hook 334b extending from the leg 334a. The arm 332 includes a channel 331, seen in FIG. 39, for receiving a wire bail of a drop cable clamp assembly as described below.

The intermediate section 322 of the lower body half 330 has an oblong or elongated opening 338 that permits the stem 314 to pass through the lower body half 330 and allows the lower body half 330 to pivot on the stem 314 relative to the upper body half 350. The main span cable section 324 of the lower body half 330 has cable grooves 335 and 336, seen in FIG. 39, forming a cable cradle portion of the central section 326c of the cable guide 326. The extension sections 326b and 326c of the cable guide 326 have cable grooves 337. The lower body 330 has a lower lever arm 340 extending from the main span cable section 324 as shown. The lower lever arm 340 is preferably at an angle relative to the lower body half 330. The lower lever arm 340 is used when attaching main span cables to the clamp 300, as will be described below. A bottom surface of the lower lever arm 340 may include a reflective material that would be visible to a technician attaching the clamp 300 to a main span cable as described below. The reflective material may be applied to, incorporated into, impregnated into and/or attached to the bottom surface of the lower lever arm 340. Non-limiting examples of the reflective material include a reflective coating and reflective tape.

Referring to FIGS. 40-43, an exemplary embodiment of the upper body half 350 of the clamp 300 will be described. The drop cable section 320 of the upper body half 350 has an arm 352 that extend away from the intermediate section 322 of the upper body half, as shown. The arm 352 has and opening 354 that is configured and dimensioned to receive the hook portion 334 of the drop cable section 320 of the lower body half 330. The intermediate section 322 of the upper body half 350 is configured so that the intermediate section 322 of the lower body half 330 sits between stabilizing legs 358 and 360 extending from the upper body half 350. More specifically, the stabilizing legs 358 and 360 extend from the intermediate section 322 of the upper body half 350 toward the lower body half 330, such that the stabilizing legs 358 and 360 along with the intermediate section 322 of the upper body half 350 form a cradle in which the intermediate section 322 of the lower body half 330 sits. The stabilizing legs 358 and 360 are also provided to engage a head portion of an extendable reach tool, e.g., a hot stick, as described below. In addition, the stabilizing legs 358 and 360 may also prevent rotational or lateral movement of the lower body half 330 relative to the upper body half 350 when installing the clamp 300 on a main span cable. The intermediate section 322 of the upper body 350 has a threaded opening 362 that is aligned with the oblong opening 338 in the intermediate section 322 of the lower body half 330. The threaded opening 362 is configured to receive the threaded portion 314a of the stem 314 to releasably couple the lower body half 330 to the upper body half 350. The main span cable section 324 of the upper body half 350 has cable grooves 355 and 356, seen in FIG. 43, forming a portion of the central section 326c of the cable guide 326. The extension sections 326b and 326c of the cable guide 326 have cable grooves 357. Extending from the main span cable section 324 of the upper body 350 is an upper lever arm 364, as shown. The upper lever arm 364 is preferably at an angle relative to the upper body half 350. The upper lever arm 364 is used when attaching main span cables to the clamp 300, as will be described below.

Figure 53:
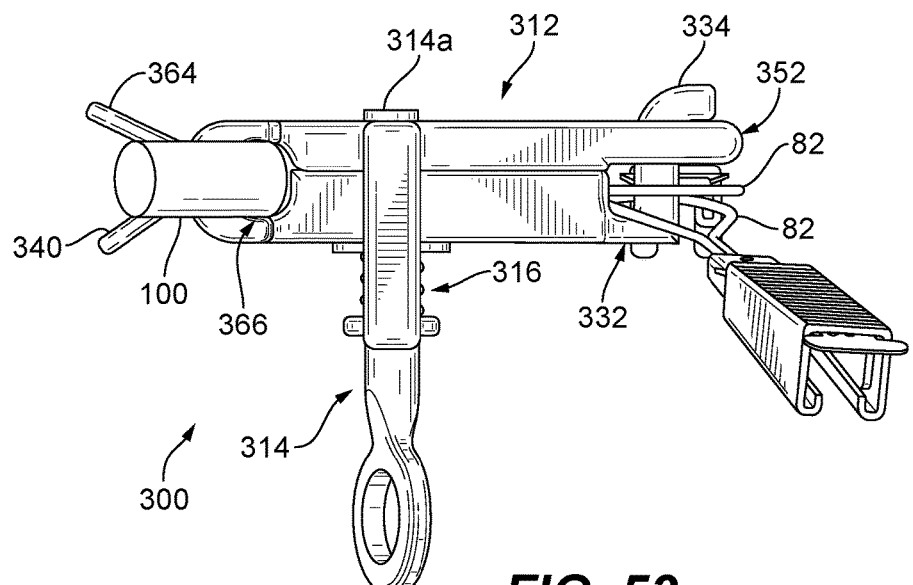
FIG. 53 is a side elevation view of the cable clamp and drop cable clamp assemblies of FIG. 48.
Figure 54:
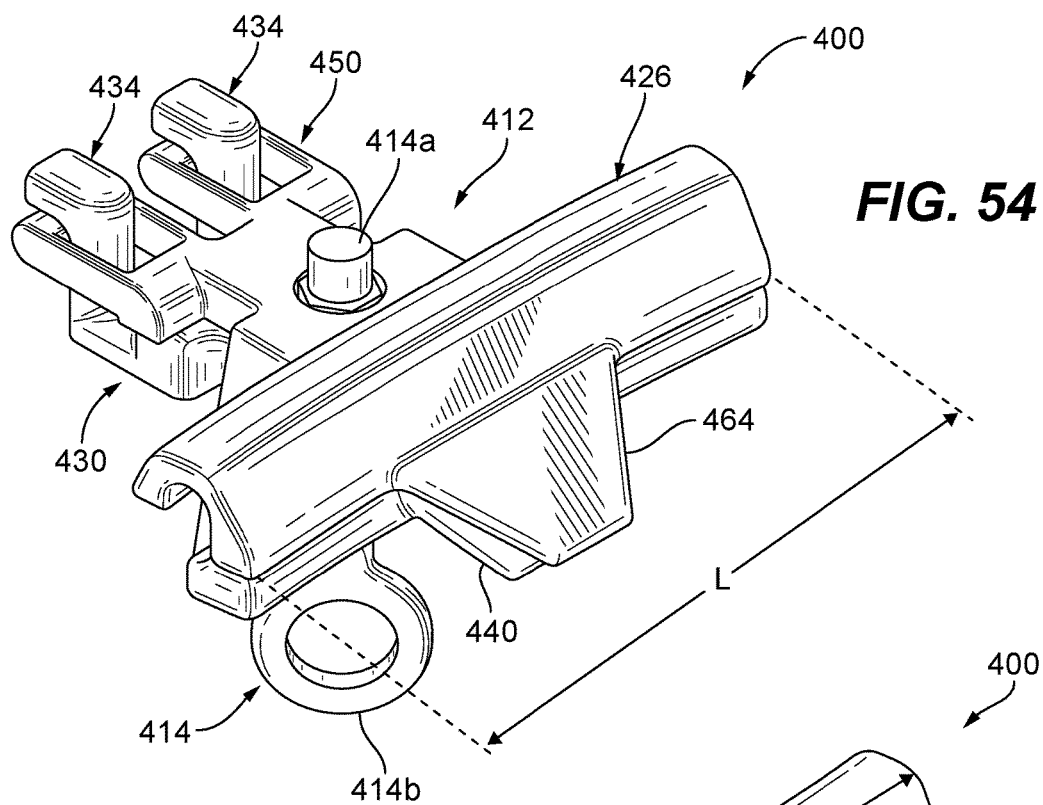
FIG. 54 is a top front perspective view of another exemplary embodiment of a cable clamp according to the present disclosure illustrating the cable clamp in a clamping position.
Figure 55:
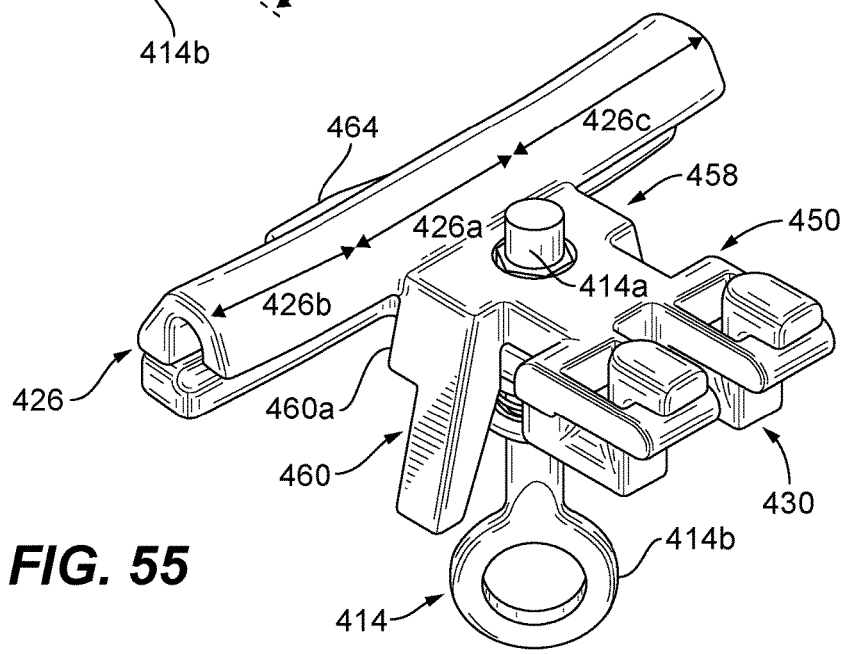
FIG. 55 is a top rear perspective view of the cable clamp of FIG. 54.
Figure 56:
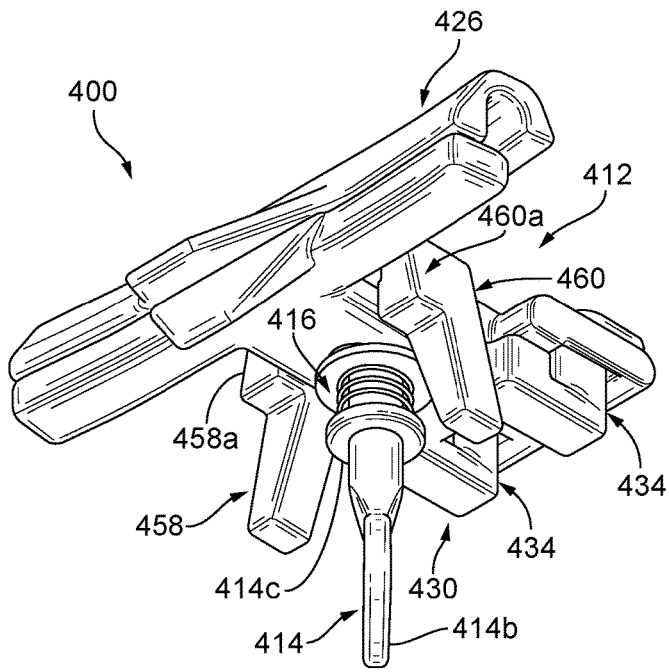
FIG. 56 is a bottom front perspective view of the cable clamp of FIG. 54.
Figure 57:
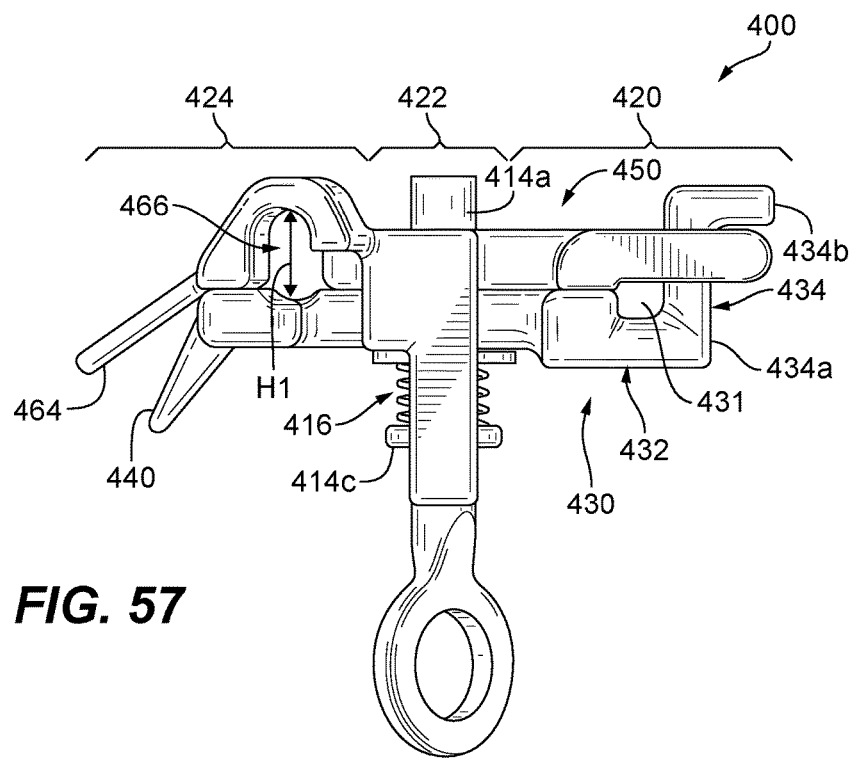
FIG. 57 is a side elevation view of the cable clamp of FIG. 54.
Figure 58:
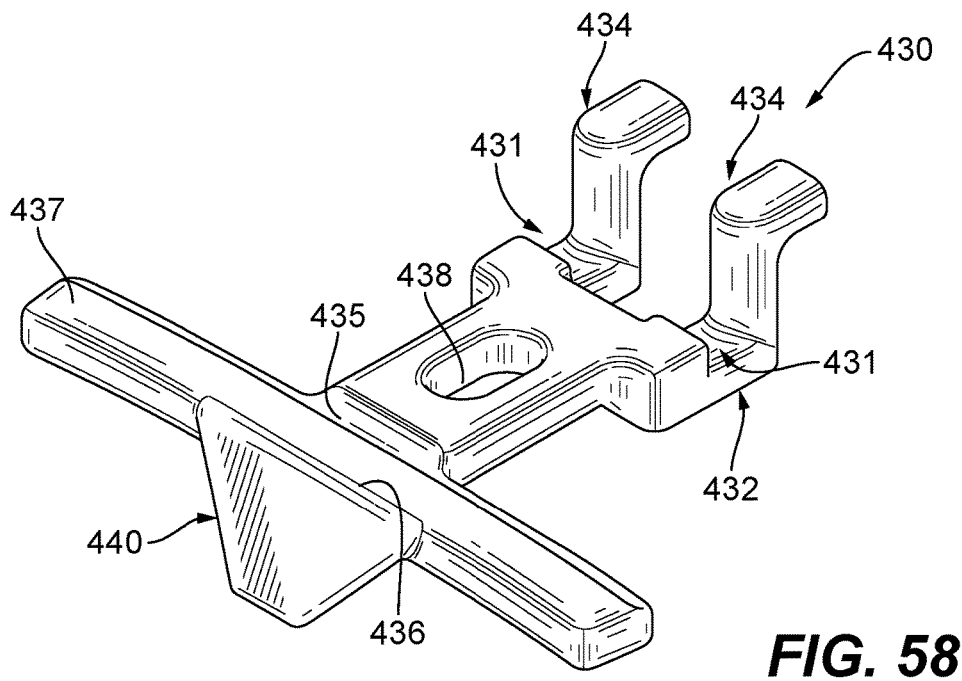
FIG. 58 is a top front perspective view of a lower body half of the cable clamp of FIG. 54.
Figure 59:
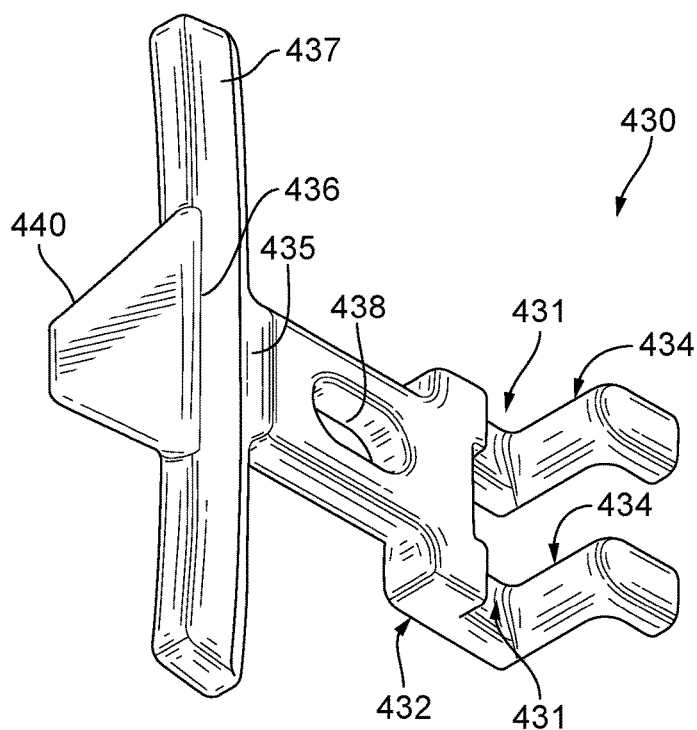
FIG. 59 is a top side perspective view of the lower body half of FIG. 58.

Thus, the clamp 300 has two body halves 330 and 350 that when coupled together by the stem 314 and spring 316 are configured to hold a main span cable and a drop cable assembly. More specifically, the spring 316 is held between the lower body half 330 and the collar 314c on the stem 314 and when the clamp 300 is in a clamping position, seen in FIG. 32, a clamping force keeps the lower body half 330 and the upper body half 350 coupled together. When the two body halves 330 and 350 are in the clamping position, the hook portion 334 extending from the arm 332 of the drop section 320 of the lower body half 330 can fit within the opening 354 of the arm 252 of the upper body half 350 to interlock the drop section 320 of the lower body half 330 with the drop section of the upper body half 350, and the channels 331 in the lower body section 330 provide openings in which to receive bail wires 82 of a drop cable clamp assembly 80, seen in FIGS. 44-47. It is noted that the bail wires 82 positioned within the channel 331 permits the bail wires and thus the drop cable clamp assemblies to rotate or otherwise move relative to the clamp 300. In addition, when the two body halves 330 and 350 are in the clamping position, the main span cable grooves 335 and 336 in the main span section 324 of the lower body half 330 and the main span cable grooves 355 and 356 in the main span section 324 of the upper body half 350 form a cable cradle 366, seen in FIG. 32. The cable cradle 366 is configured and dimensioned to receive and support a main span cable 100 installed in the clamp 300. It is noted that the cable cradle 366 is configured in this exemplary embodiment so that the main span cable 100 sits within the cable guide 326 in a vertical orientation, as shown in FIG. 53. By orienting the cables in a vertical orientation bend stresses on the main span cable can be minimized. However, the cable cradle 366 can be configured in so that the main span cable 100 sits within the cable guide 326 in any other desired orientation.

Turning to FIGS. 44-53, to attach a drop cable clamp assembly 80 to the clamp 300, a user, e.g., a technician, separates the lower body half 330 of the clamp 300 from the upper body half 350 by removing the stem 314 from the upper body half 350 and removing the hook portion 334 of the lower body half from the opening 354 of the upper body half. With the body halves separated, the bail wires 82 of the drop cable clamp assemblies 80 are then inserted into respective channels 331 in the lower body half 330, as shown. The hook 334b of the hook portion 334 of the lower body half 330 is then inserted into the opening 354 of the upper body half 350 such that the drop section 320 of the lower body half 330 interlocks with the drop section of the upper body half 350. The threaded end 314a of the stem 314 is then threaded into the threaded opening 362 in the upper body half 350 until the spring 316 biases the lower body half 330 toward the upper body half 350 so that the body 312 is in the clamping position, seen in FIG. 32. The spring 316 provides a clamping force to at least temporarily hold the bail wire 82 of the drop cable clamp assembly 80 within the channels 331.

Figure 46:
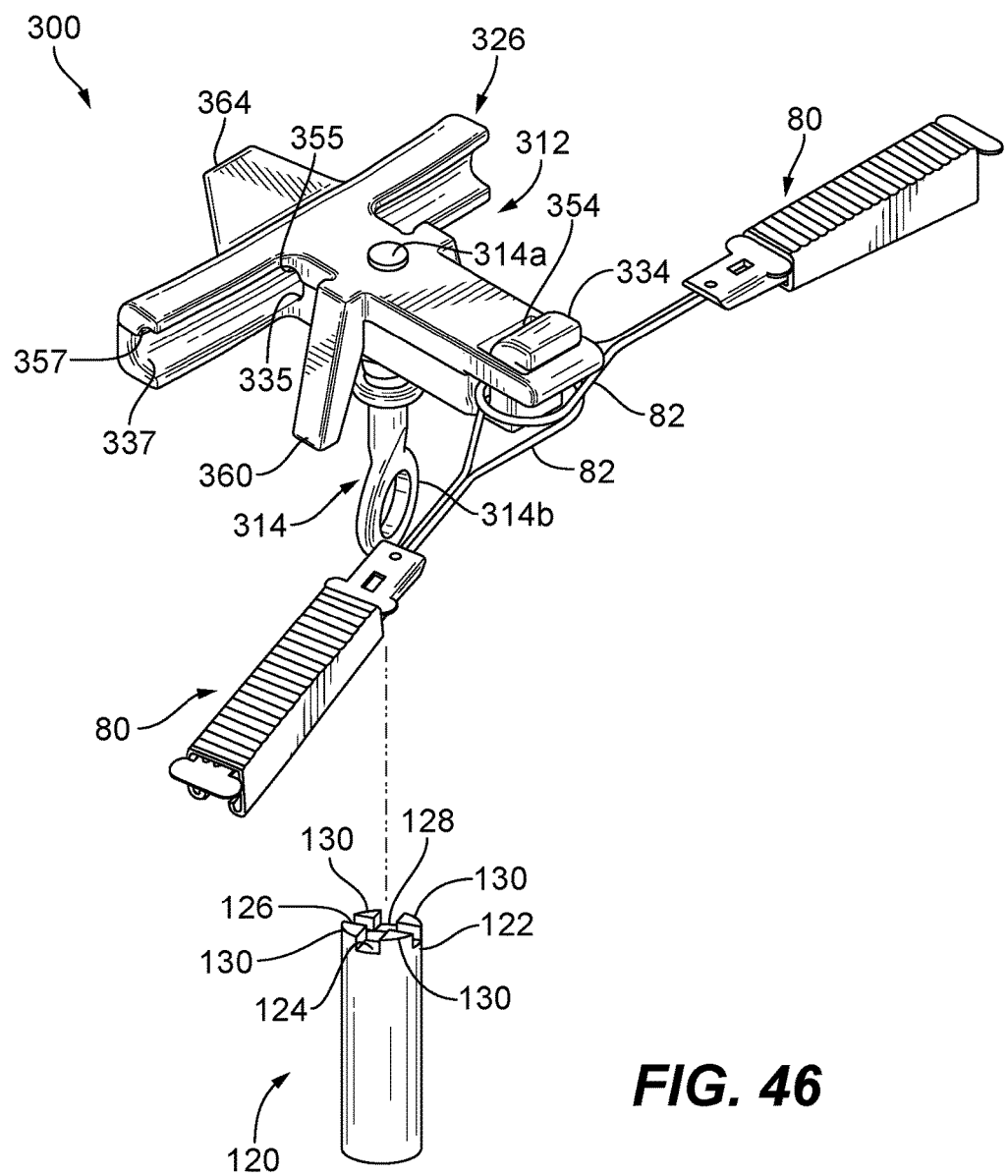
FIG. 46 is a top rear perspective view of the cable clamp and drop cable clamp assemblies of FIG. 44 and a head portion of an exemplary embodiment of an extendable reach tool, illustrating a stem of the cable clamp positioned for insertion into the head portion of the extendable reach tool.
Figure 47:
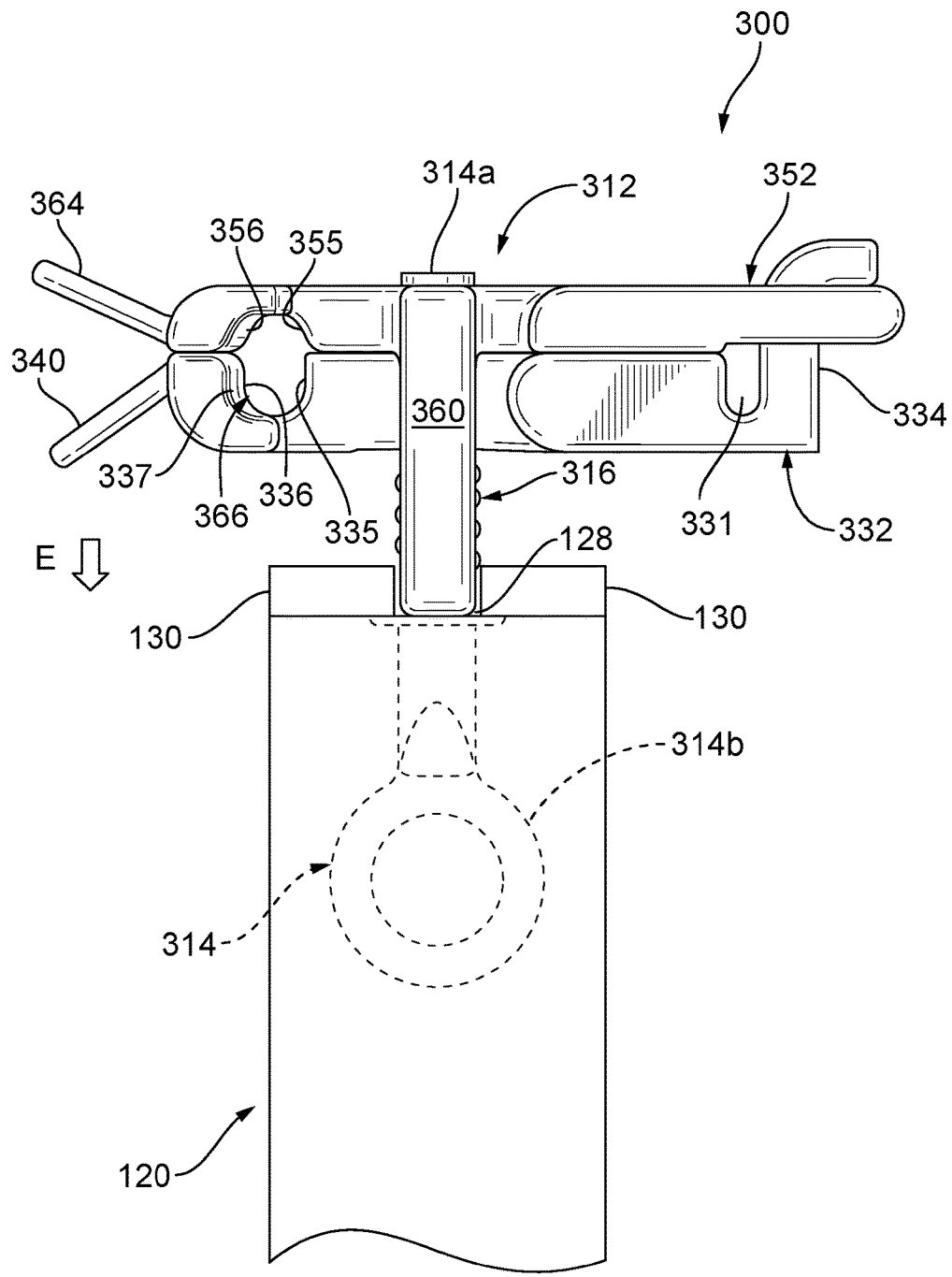
FIG. 47 is a side elevation view of the cable clamp and the head portion of the extendable reach tool of FIG. 46, illustrating the stem of the cable clamp within the head portion of the extendable reach tool.
Figure 48:
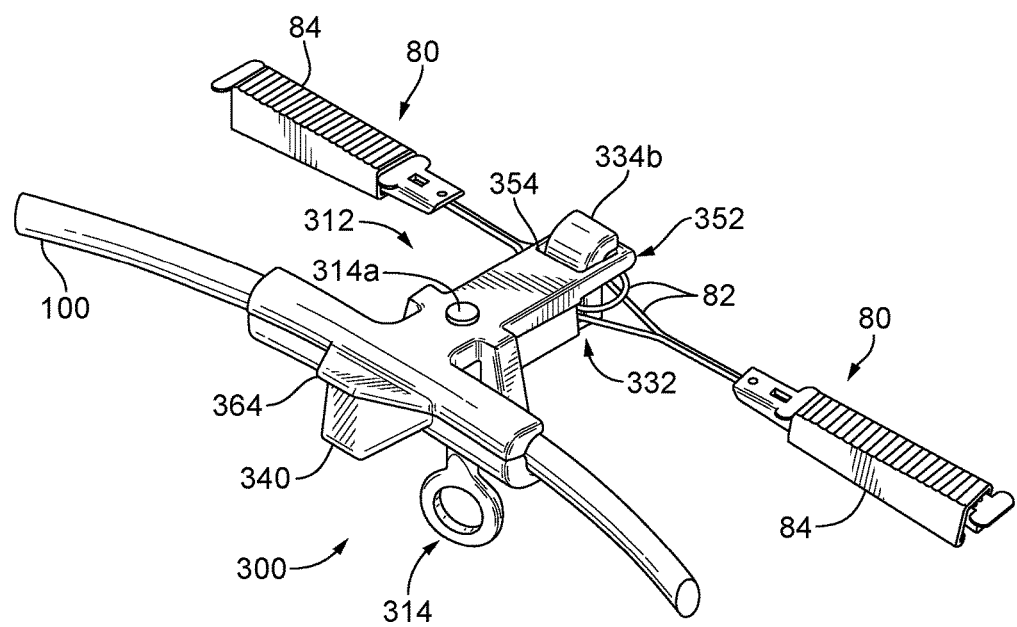
FIG. 48 is a top front perspective view of the cable clamp and drop cable clamp assemblies of FIG. 46 with a main cable positioned within a main cable section of the cable clamp.
Figure 49:
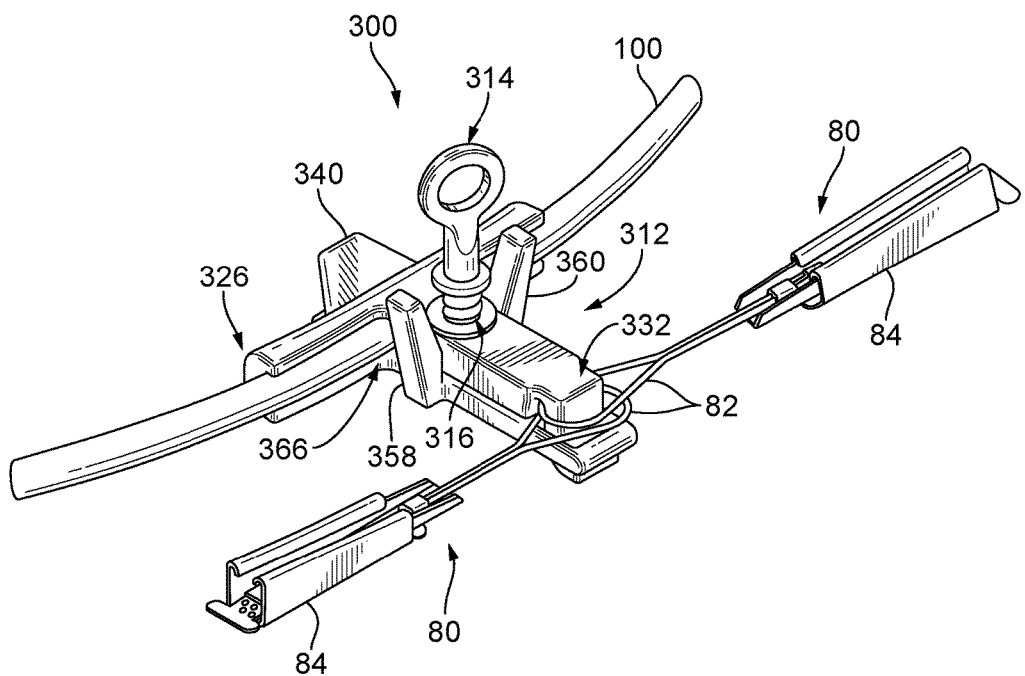
FIG. 49 is a bottom rear perspective view of the cable clamp and drop cable clamp assemblies of FIG. 48.
Figure 50:
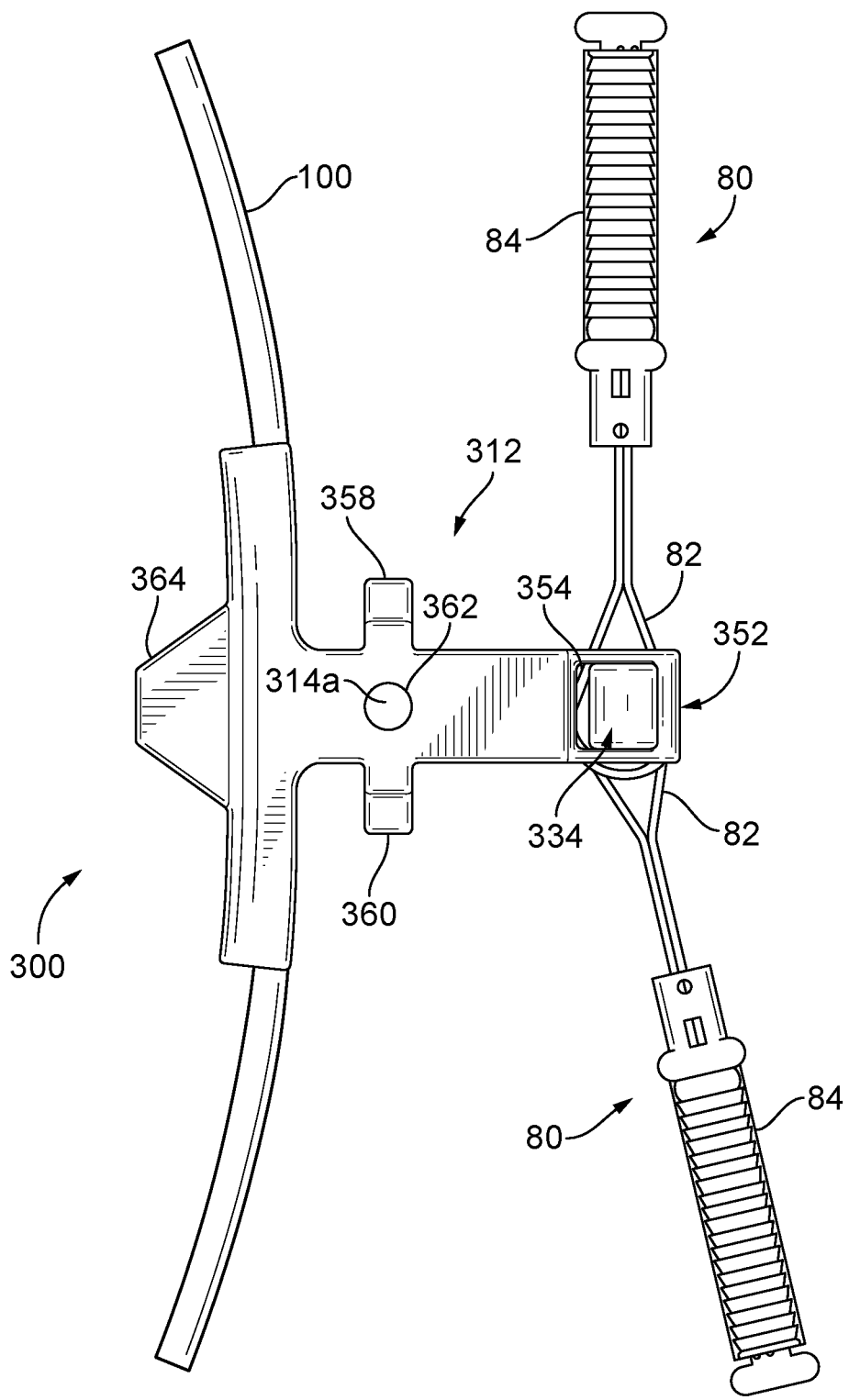
FIG. 50 is a top plan view of the cable clamp and drop cable clamp assemblies of FIG. 48.
Figure 51:
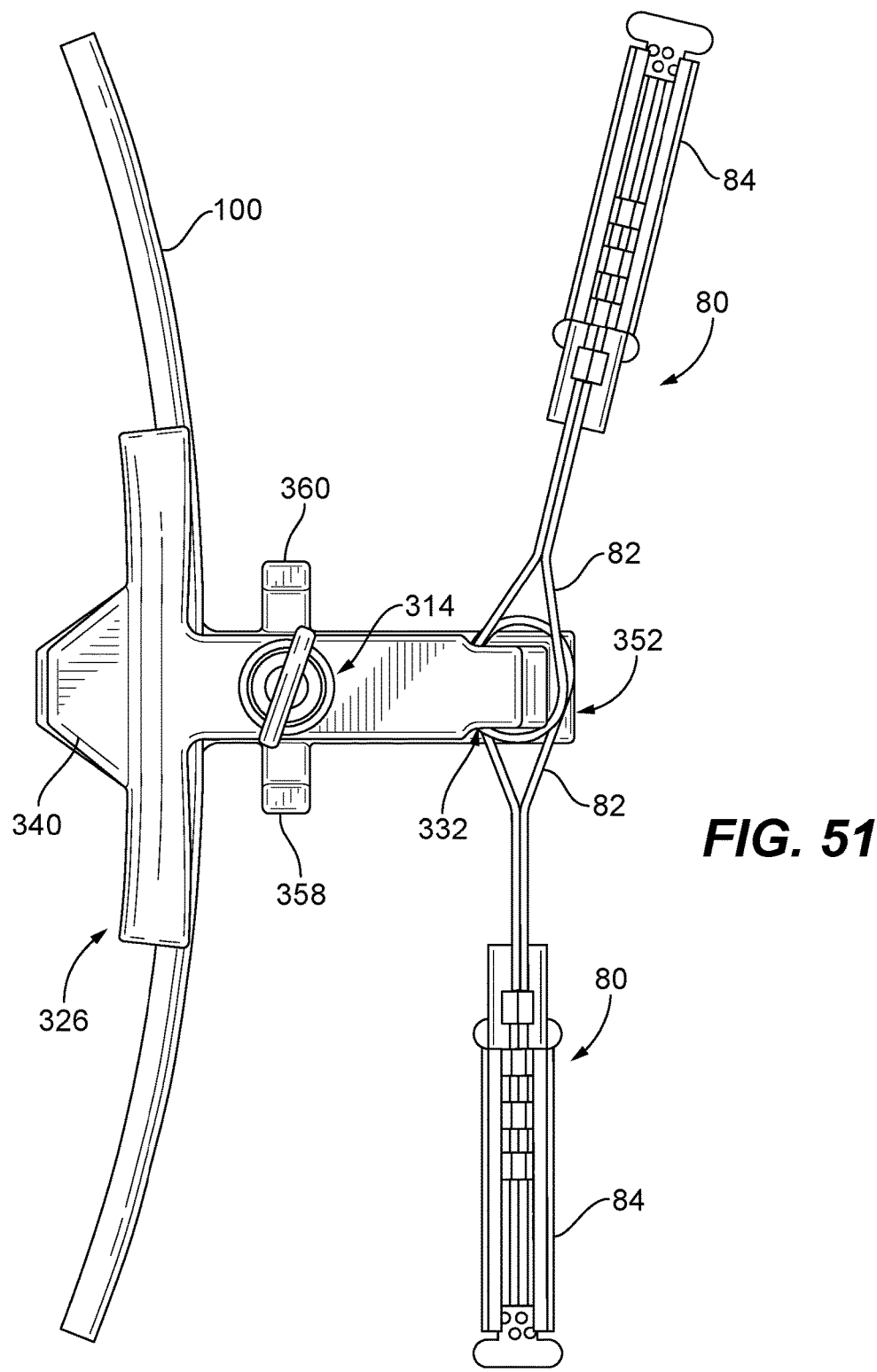
FIG. 51 is a bottom plan view of the cable clamp and drop cable clamp assemblies of FIG. 48.
Figure 52:
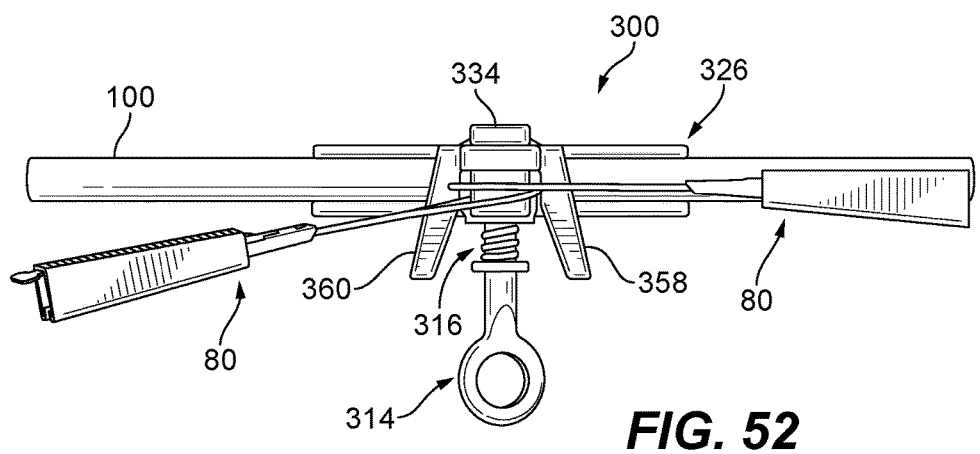
FIG. 52 is a rear elevation view of the cable clamp and drop cable clamp assemblies of FIG. 48.

Referring to FIGS. 46 and 47, the clamp 300 can then be releasably attached to a head portion 122 of an extendable reach tool 120, e.g., a hot stick, using the eye 214b in the stem 214. More specifically, the head portion 122 of the extendable reach tool 120 has a central opening 124 and intersecting channels 126 and 128 that form four tabs 130. A technician can insert the eye-stem 314b of the stem 214 into the central opening 124 in the head portion 122 of the extendable reach tool 120 until stabilizing legs 358 and 360 extending from the upper body half 350 of the body 312 are positioned with respective channels 126 or 128 as shown in FIG. 47. The central opening 124 may be configured so that when the eye-stem 314b is inserted into the central opening it is temporarily held in place by a friction fit.

Referring now to FIGS. 33, 34 and 48-53, with the clamp 300 releasably attached to the extendable reach tool 120, a user, e.g., a technician, can then attach the main span section 324 of the clamp 300 to a main span cable 100 by snapping the main span cable 100 into the cradle 366, seen in FIG. 47, in the cable guide 326 of the main span section 324 of the body 312. More specifically, the main span cable 100 is first positioned between the lower lever arm 340 and the upper lever arm 364. The clamp 300 is then forced against the main span cable 100, using the extendible reach tool 120, so that the lower body half 330 pivots in the direction of arrow E, seen in FIG. 47, separating the main span section 324 of the lower body half 330 from the main span section 324 of the upper body half 350 until the main span section 324 of the body 312 is in an open position, seen in FIGS. 33 and 34, allowing the main span cable 100 to pass into the cradle 366 in the cable guide 326 of the body 312. Separating the lower body half 330 from the upper body half 350 also compresses the spring 316. Once the main span cable 100 passes into the cradle 366 the force compressing the spring 316 is released so that the spring biases the lower body half 330 toward the upper body half 350 such that the body 312 returns to the clamping position, seen in FIG. 53, providing a clamping force to at least temporarily hold the main span cable 100 within the cable guide 326.

It is noted that a drop cable (not shown) is usually attached to a drop cable clamp 84, seen in FIGS. 48-53, of the drop cable clamp assembly 80 when the cable clamp assembly is attached to the clamp 300 and before the clamp is releasably attached to the extendible reach tool 120. As such, the drop cable applies tension to the main span cable when the clamp 300 is attached to a main span cable. This tension can cause the main span cable 100 to deflect or bend. However, the first and second extension sections 326b and 326c of the cable guide 326 are provided to minimize the deflection or bending of the main span cable 100. It is also noted that drop cable clamp assemblies are known. Non-limiting examples of a drop cable clamp assemblies are the models C2PRAS and C2PRSS 1-2 pair drop cable clamp assemblies sold by Hubbell Incorporated and the models C6PRAD and C6PRSD 6 pair drop cable clamp assemblies also sold by Hubbell Incorporated.

Once the clamp 300 and drop cable clamp assemblies 80 are properly secured to a main span cable 100, the stem 314 can be tightened by rotating the stem clockwise which is translated to movement of the lower body half 330 relative to the upper body half 350 to lock the main span cable 100 and drop cable clamp assembly 80 in place within the clamp 300, as shown in FIGS. 48-53. It is noted that the cable cradle halves in the main body section 324 are configured so that when the two body halves 330 and 350 are in the clamping position the cable cradles halves bottom out preventing the exertion of excessive force to the main span cable 100 crushing and possibly damaging the cable no matter how much torque is applied to the stem 314. More specifically, and referring to FIGS. 32 and 53, when the two body halves 330 and 350 come together the height H1 of the central section 326a of the cable guide 326 is defined by the flat surface 333 on the lower body half 330 and the flat surface 353 on the upper body half 350. The height H1 can be set so that there is suitable clamping of a cable inserted in the central section 326a of the cable guide 326, and possibly permitting a certain amount of jacket deflection in the cable, without crushing the cable within the opening to a point causing, for example, an attenuation increase resulting in a signal loss, and/or mechanical damage to the fiber within the cable 100.

Referring now to the figures, in particular FIGS. 54-57, another exemplary embodiment of the clamp according to the present disclosure is shown. The clamp 400 includes a body 412, a stem 414 and a spring 416. The body 412 has a lower body half 430 and an upper body half 450, seen in FIG. 57. For general reference purposes the body 412 is split into three sections: a drop cable section 420, an intermediate section 422 and a main span cable section 424. The stem 414 is preferably an eye-stem that has a threaded end 414a, an eye 414b for coupling with an extendable reach tool, for example, a hot stick, and a collar 414c for supporting the spring 416. The body 412, stem 414 and spring 416 may be made of a metallic material, such as aluminum, cast aluminum, galvanized steel or stainless steel, or a combination of metallic materials. In another exemplary embodiment, the body 412, stem 414 and spring 416 may be made of a non-metallic material, such as a rigid plastic or composite materials e.g., carbon fiber.

Figure 60:
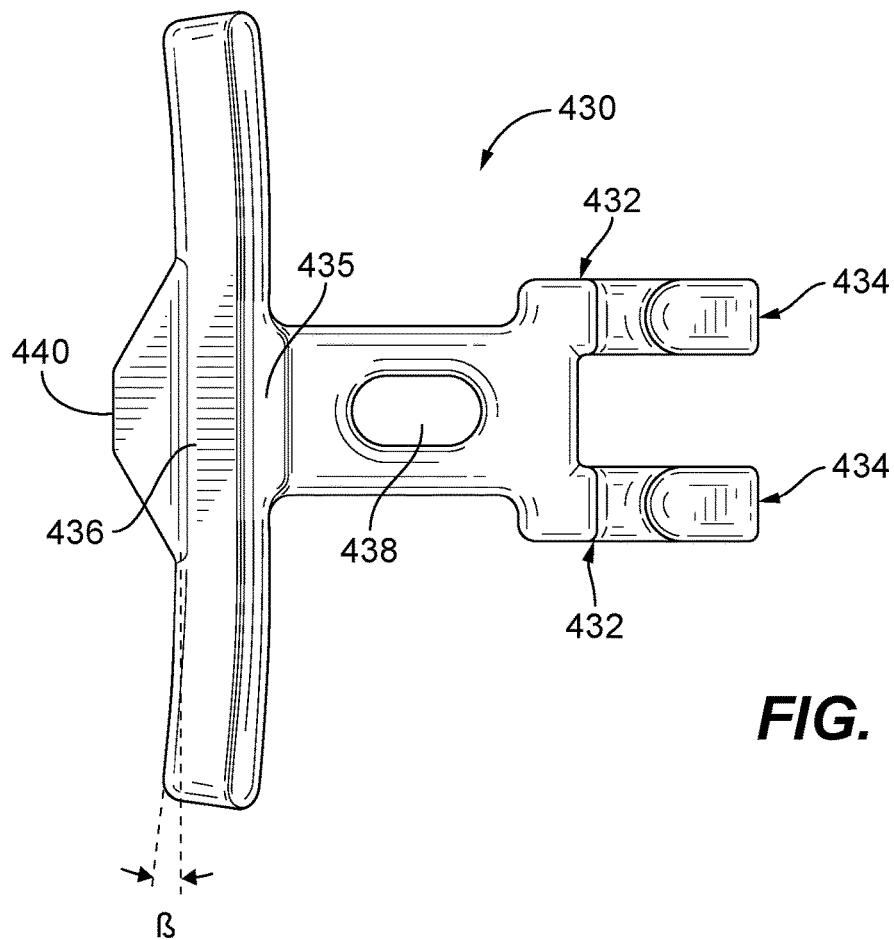
FIG. 60 is a top plan view of the lower body half of FIG. 58.
Figure 61:
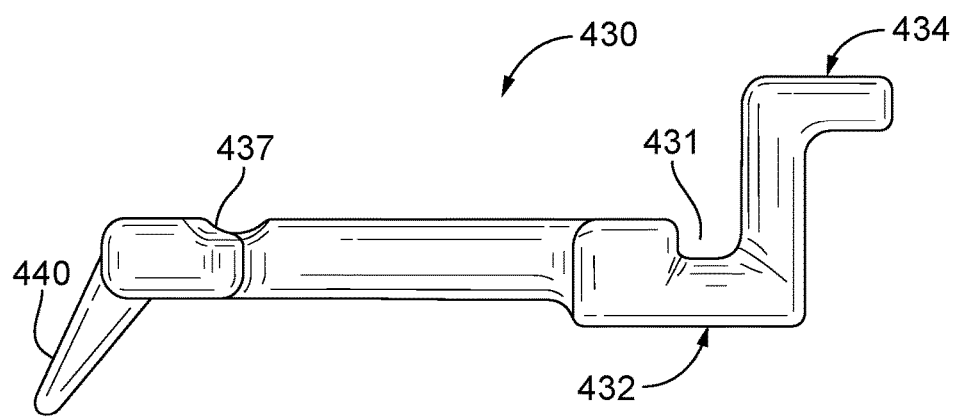
FIG. 61 is a side elevation view of the lower body half of FIG. 58.
Figure 62:
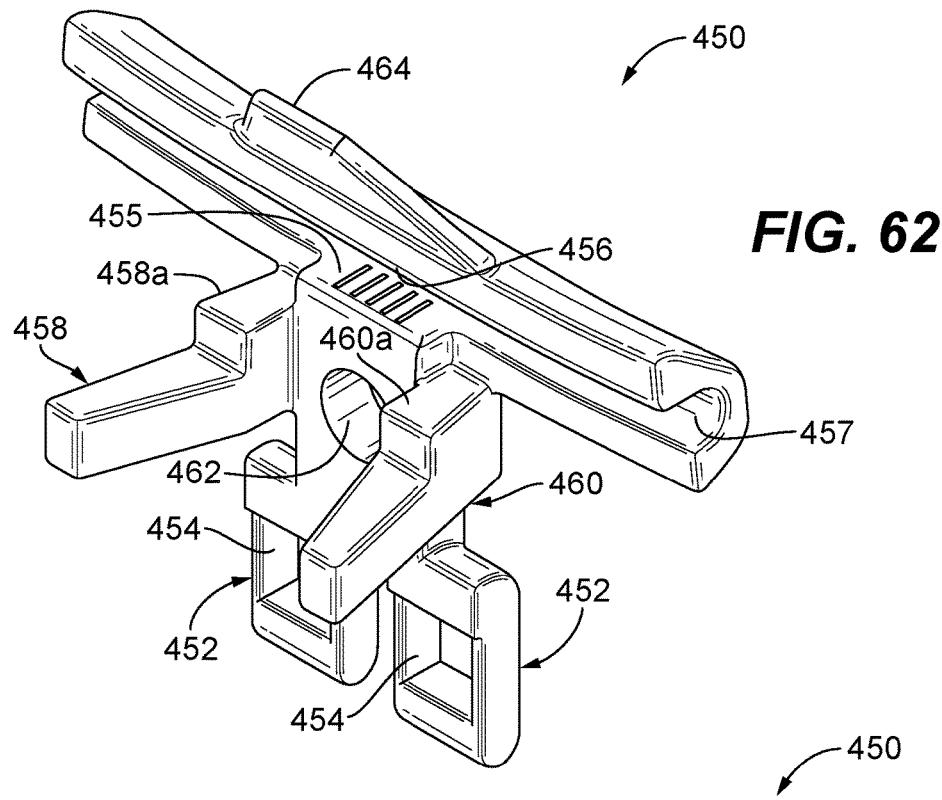
FIG. 62 is a bottom perspective view of an upper body half of the cable clamp of FIG. 54.
Figure 63:
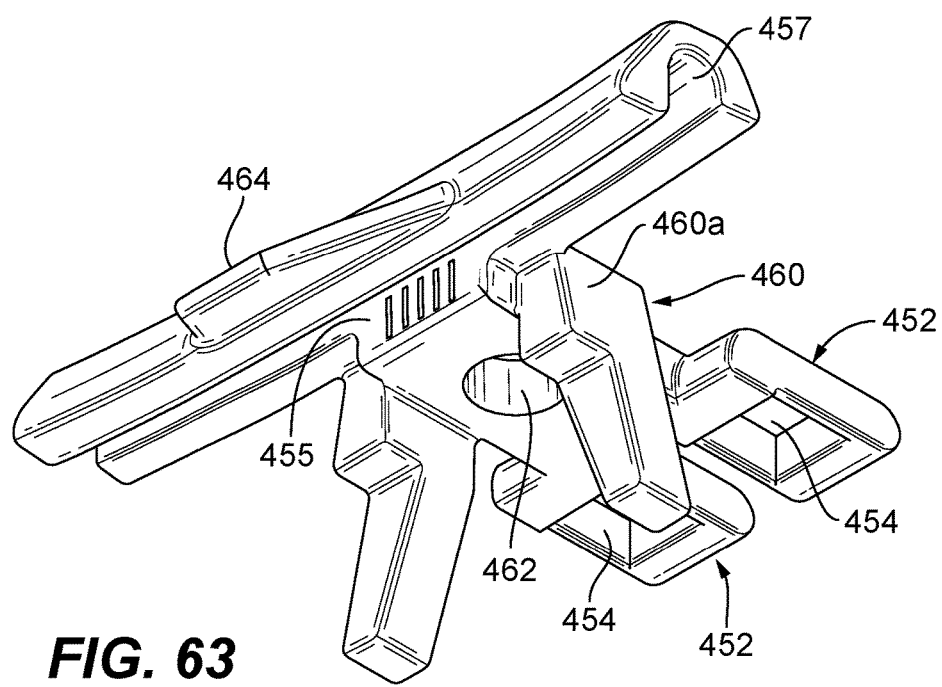
FIG. 63 is another bottom perspective view of the upper body half of the cable clamp of FIG. 62.
Figure 64:
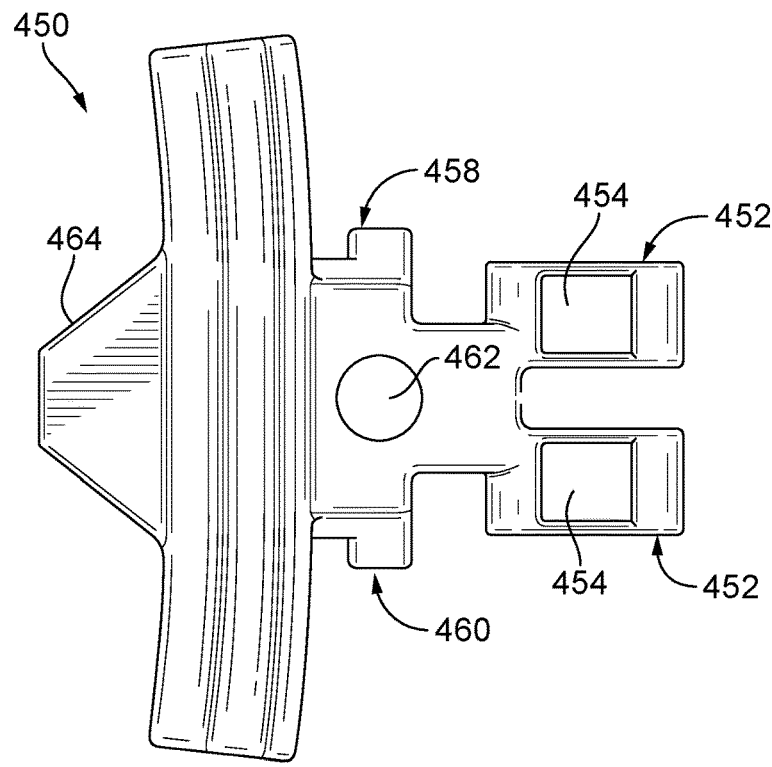
FIG. 64 is a top plan view of the upper body half of the cable clamp of FIG. 62.
Figure 65:
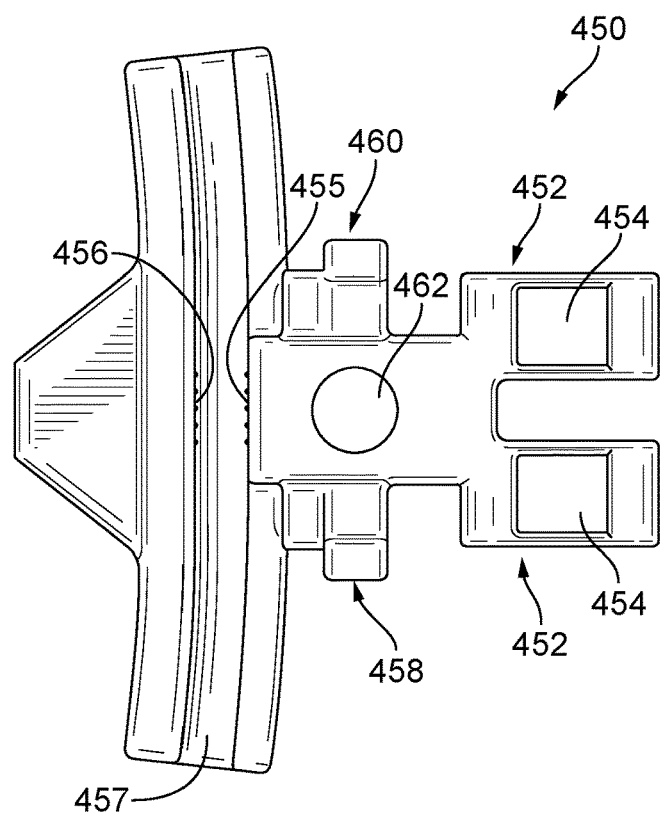
FIG. 65 is a bottom plan view of the upper body half of the cable clamp of FIG. 62.
Figure 66:
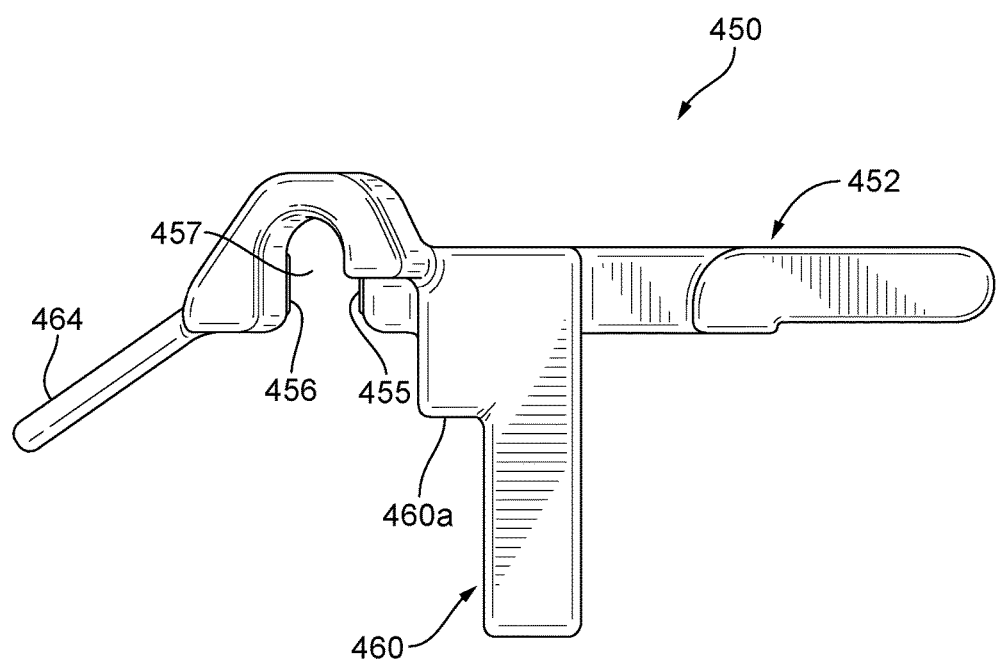
FIG. 66 is a side elevation view of the upper body half of the cable clamp of FIG. 62.
Figure 67:
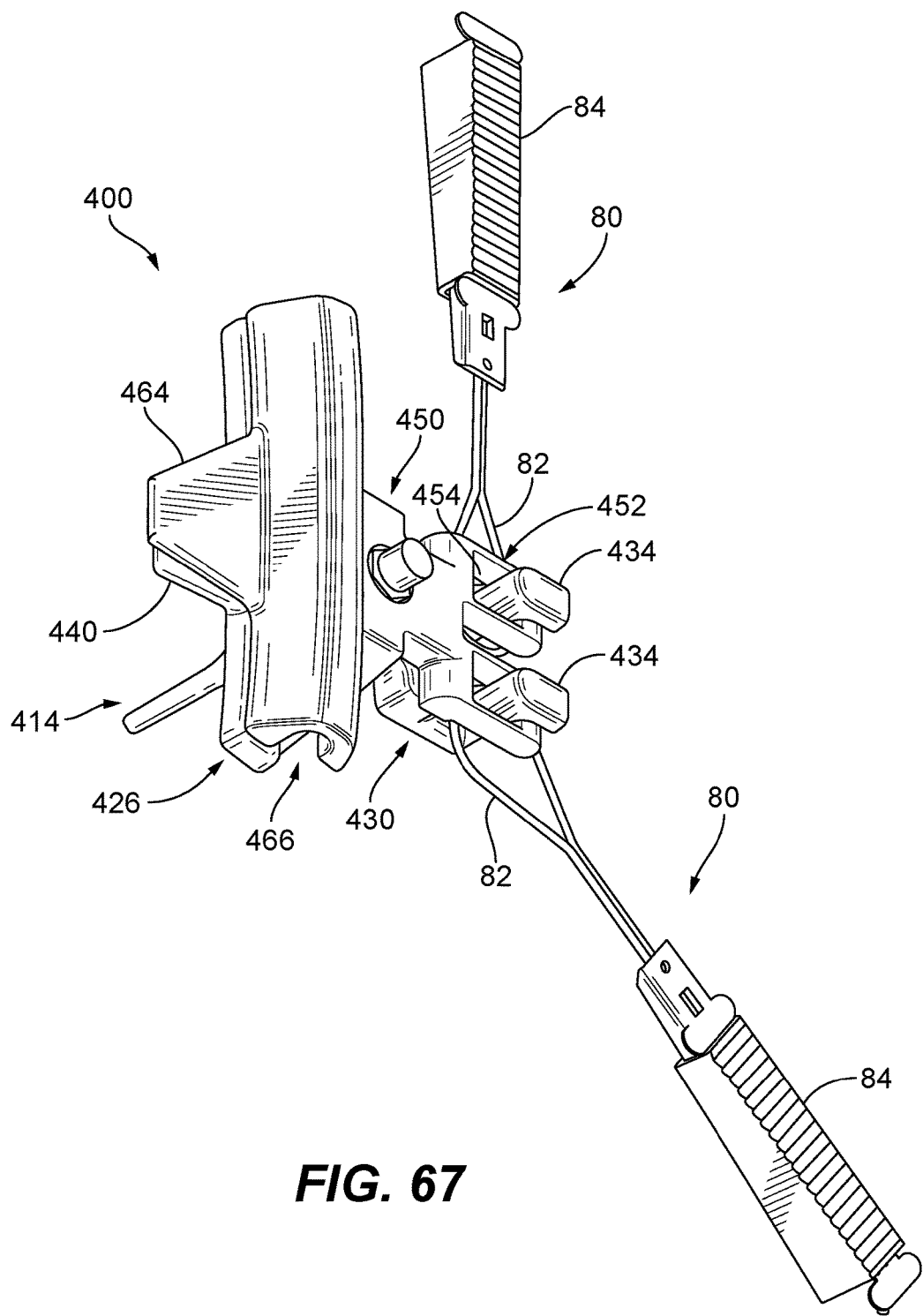
FIG. 67 is a top front perspective view of the cable clamp of FIG. 54, illustrating an exemplary embodiment of multiple drop cable clamp assemblies releasably attached to the cable clamp where bail wires of the drop cable clamp assemblies are within a drop cable section of the cable clamp.

Continuing to refer to FIGS. 54-57, the main span cable section 424 of the body 412 is configured and dimensioned to form a cable guide 426 that is sufficient to support a main span cable. In the exemplary embodiment shown, the cable guide 426 has a length L, sufficient to support a main span cable. As a non-limiting example, a range for the length of the cable guide 426 may be from about 3 inches to about 8 inches. For reference purposes, the length of the cable guide 426 may be divided into three components, seen in FIG. 55, where a central section 426a has a length $L_1$, a first extension section 426b has a length $L_2$ and a second extension section 426c has a length $L_3$. As a non-limiting example, the length of the central section 426a may be in the range from about 1.0 inch to about 3 inches. The length of each extension section 426b and 426c may be the same or they may differ. As a non-limiting example, if the length L of the cable guide 426 is about 5.0 inches and the length $L_1$ of the central section 426a is about 1.5 inches, the length of the extension sections 426b and 426c may both be about 1.75 inches. As another non-limiting example, if the length L of the cable guide 426 is about 5.0 inches and the length $L_1$ of the central section 426a is about 1.5 inches, the length $L_2$ of the first extension section 426b may be about 2.5 inches and the length $L_3$ of the second extension section 426c may be about 1.0 inch. The cable guide 426 may be a straight structure, a flared structure, a curved structure or an irregular shaped structure. In the exemplary embodiment shown, the cable guide 426 is a flared structure where the central section 426a is substantially straight and each extension section 426b and 426c is flared such that a radius of curvature of the flare (represented by the dotted lines and angle "β" in FIG. 60) of each extension section is in the range from about 3.5 inches and about 20 inches. The flared extension sections 426*b* and 426*c* flare the main span cable away from the drop cable to decrease the bend strain on the main span cable.

Referring to FIGS. 58-61, an exemplary embodiment of the lower body half 430 of the clamp 400 will be described. The drop cable section 420 of the lower body half 430 has one or more arms 432 that extend away from the intermediate section 422 of the lower body half, as shown. Each arm 432 has a hook portion 434 that has a leg 434*a* extending substantially perpendicular from the arm 432, as shown, and a hook 434*b* extending from the leg 434*a*. Each arm 432 includes a rounded channel 431 for receiving a wire bail of a drop cable clamp assembly as described below.

The intermediate section 422 of the lower body half 430 has an oblong or elongated opening 438 that permits the stem 414 to pass through the lower body half 430 and allows the lower body half 430 to pivot on the stem 414 relative to the upper body half 450. The main span cable section 424 of the lower body half 430 has cable grooves 435 and 436, seen in FIG. 60, forming a cable cradle portion of the central section 426*c* of the cable guide 426. The extension sections 426*b* and 426*c* of the cable guide 426 have cable grooves 437. The lower body 430 has a lower lever arm 440 extending from the main span cable section 424 as shown. The lower lever arm 440 is preferably at an angle relative to the lower body half 430. The angle is in the range from about 110 degrees to about 120 degrees relative to a longitudinal axis of the lower body 430. The lower lever arm 440 is used when attaching main span cables to the clamp 400, as will be described below. A bottom surface of the lower lever arm 440 may include a reflective material that would be visible to a technician attaching the clamp 400 to a main span cable as described below. The reflective material may be applied to, incorporated into, impregnated into and/or attached to the bottom surface of the lower lever arm 440. Non-limiting examples of the reflective material include a reflective coating and reflective tape.

Referring to FIGS. 62-67, an exemplary embodiment of the upper body half 450 of the clamp 400 will be described. The drop cable section 420 of the upper body half 450 has one or more arms 452 that extend away from the intermediate section 422 of the upper body half, as shown. Each arm 452 has one or more openings 454 that are configured and dimensioned to receive the hook portion 434 of the drop cable section 420 of the lower body half 430. The intermediate section 422 of the upper body half 450 is configured so that the intermediate section 422 of the lower body half 430 sits between stabilizing legs 458 and 460 extending from the upper body half 450. More specifically, the stabilizing legs 458 and 460 extend from the intermediate section 422 of the upper body half 450 toward the lower body half 430, such that the stabilizing legs 458 and 460 along with the intermediate section 422 of the upper body half 450 form a cradle in which the intermediate section 422 of the lower body half 430 sits. The stabilizing legs 258 and 260 are also provided to engage a head portion of an extendable reach tool, e.g., a hot stick, as described below. In addition, the stabilizing legs 458 and 460 may also prevent rotational or lateral movement of the lower body half 430 relative to the upper body half 450 when installing the clamp 400 on a main span cable. Each stabilizing leg 458 and 460 includes a stop portion 458*a* and 460*a*, respectively, that extends toward the main span cable section 424 of the upper body half 450. The stops 458*a* and 460*a* are provided to prevent a main span cable from sliding toward the intermediate section 422 of the body 412 when attaching the clamp 400 to a main span cable.

The intermediate section 422 of the upper body 450 has a threaded opening 462 that is aligned with the oblong opening 438 in the intermediate section 422 of the lower body half 430. The threaded opening 462 is configured to receive the threaded portion 414*a* of the stem 414 to releasably couple the lower body half 430 to the upper body half 450. The main span cable section 424 of the upper body half 450 has cable grooves 455 and 456, seen in FIG. 65, forming a cable cradle portion of the central section 426*c* of the cable guide 426. The cable grooves 455 and 456 are configured to receive a main span cable and to limit or prevent the main span cable from sliding toward the intermediate section 422 of the body 412 when attaching the clamp 400 to the main span cable. The extension sections 426*b* and 426*c* of the cable guide 426 have cable grooves 457. Extending from the main span cable section 424 of the upper body 450 is an upper lever arm 464, as shown. In this exemplary embodiment, the upper lever arm 464 is preferably at an angle toward the lower body half 430. The angle is in the range from about 140 degrees to about 150 degrees relative to a longitudinal axis of the lower body 450. Having the upper lever arm 464 angled toward the lower body half 430 helps guide a main span cable into the cable grooves 455 and 456 and to limit the main span cable from backing out of the cable grooves 455 and 456 when attaching the clamp 400 to the main span cable, as will be described below.

Figure 68:
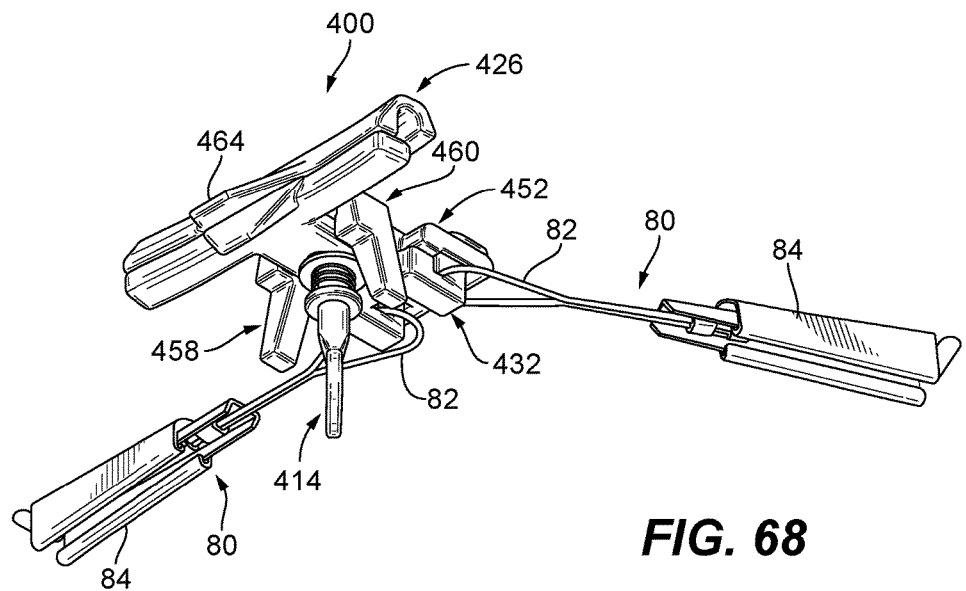
FIG. 68 is a bottom perspective view of the cable clamp and drop cable clamp assemblies of FIG. 67.
Figure 69:
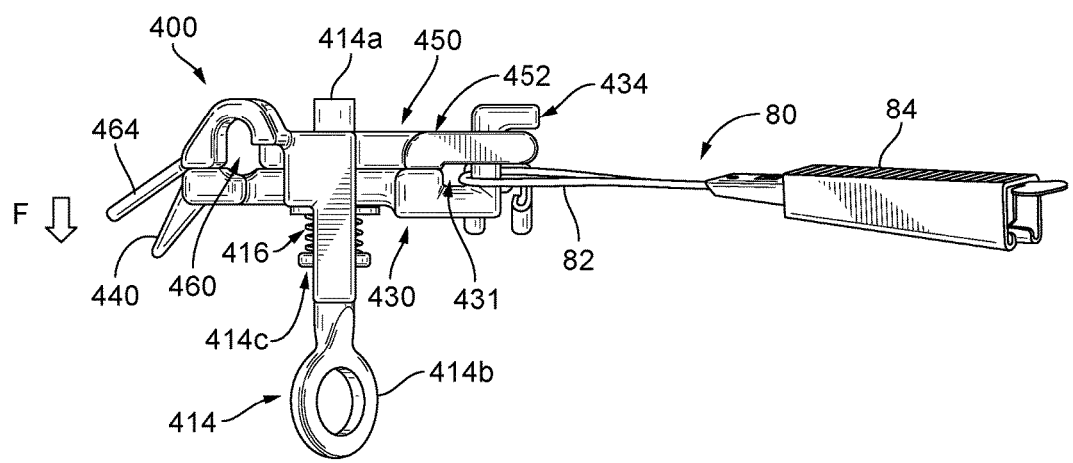
FIG. 69 is a side elevation view of the cable clamp and drop cable clamp assemblies of FIG. 67.
Figure 70:
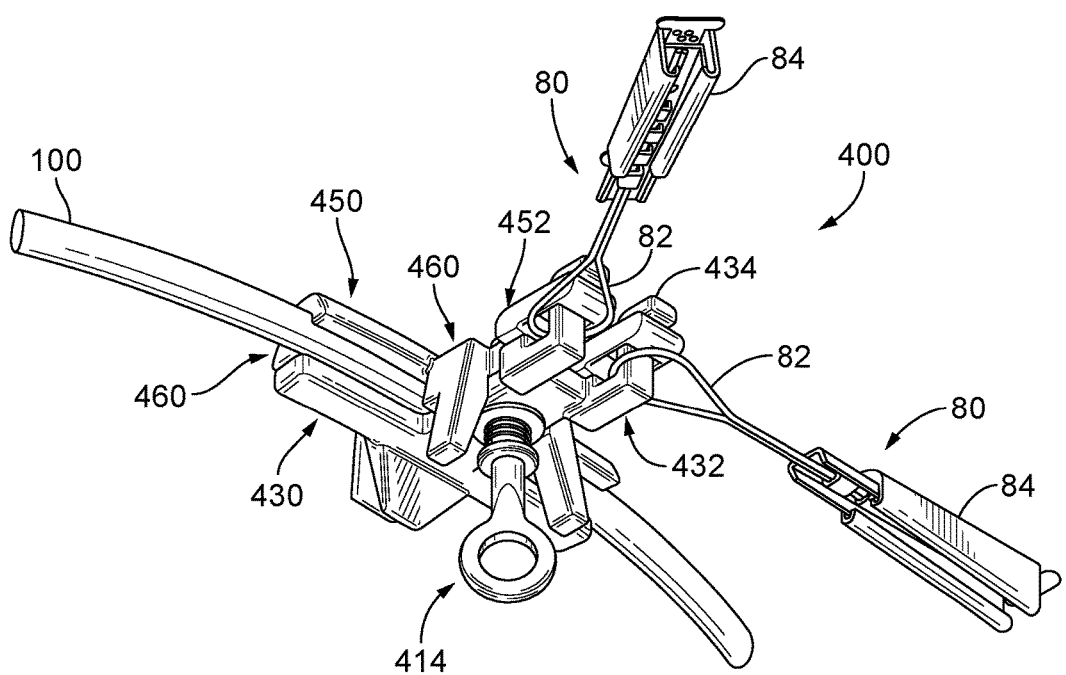
FIG. 70 is a bottom rear perspective view of the cable clamp and drop cable clamp assemblies of FIG. 67 with a main cable positioned within a main cable section of the cable clamp.
Figure 72:
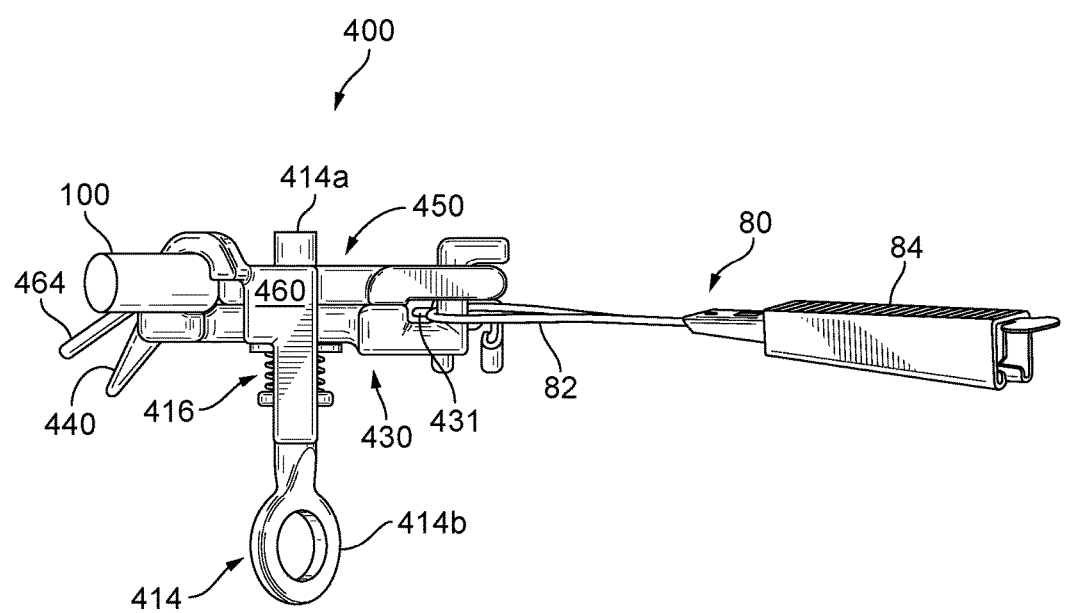
FIG. 72 is a side elevation view of the cable clamp and drop cable clamp assemblies of FIG. 67.

Thus, the clamp 400 has two body halves 430 and 450 that when coupled together by the stem 414 and spring 416 are configured to hold a main span cable and a drop cable assembly. More specifically, the spring 416 is held between the lower body half 430 and the collar 414*c* on the stem 414 and when the clamp 400 is in a clamping position, seen in FIG. 54, a clamping force generated by the spring 416 keeps the lower body half 430 and the upper body half 450 coupled together. When the two body halves 430 and 450 are in the clamping position, the hook portions 434 extending from the arms 432 of the drop section 420 of the lower body half 430 can fit within openings 454 of the arm 452 of the upper body half 450 to interlock the drop section 420 of the lower body half 430 with the drop section 420 of the upper body half 450, and the channels 431 in the lower body section 430 provide openings in which to receive bail wires 82 of a drop cable clamp assembly 80, seen in FIGS. 67-69. It is noted that the bail wires 82 positioned within the channels 431 permit the bail wires and thus the drop cable clamp assemblies to rotate or otherwise move relative to the clamp 400. In addition, when the two body halves 430 and 450 are in the clamping position, the main span cable grooves 435 and 436 in the main span section 424 of the lower body half 430 and the main span cable grooves 455 and 456 in the main span section 424 of the upper body half 450 form a cable cradle 466, seen in FIGS. 57 and 69. The cable cradle 466 is configured and dimensioned to receive and support a main span cable 100 installed in the clamp 400. It is noted that the cable cradle 466 is configured in this exemplary embodiment so that the main span cable 100 sits within the cable guide 426 in a vertical orientation, as shown in FIGS. 70 and 72. By orienting the cables in a vertical orientation bend stresses on the main span cable can be minimized. However, the cable cradle 466 can be configured in so that the main span cable 100 sits within the cable guide 426 in any other desired orientation.

Turning to FIGS. 67-72, to attach a drop cable clamp assembly 80 to the clamp 400, a user, e.g., a technician, separates the lower body half 430 of the clamp 400 from the upper body half by removing the stem 414 from the upper body half 450 and removing the hook portions 434 of the lower body half from the opening 454 of the upper body half 450. With the body halves separated, the bail wires 82 of the drop cable clamp assemblies 80 are then inserted into respective channels 431 in the lower body half 430, as shown. The hooks 434b of the hook portions 434 of the lower body half 430 are then inserted into the openings 454 of the upper body half 450 such that the drop section 420 of the lower body half 430 interlocks with the drop section of the upper body half 450. The threaded end 414a of the stem 414 is then threaded into the threaded opening 462 in the upper body half 450 until the spring 416 biases the lower body half 430 toward the upper body half 450 so that the body 412 is in the clamping position, seen in FIG. 54. The spring 416 provides a clamping force to at least temporarily hold the bail wire 82 of the drop cable clamp assembly 80 within the channels 431.

The clamp 200 can then be releasably attached to a head portion 122 of an extendable reach tool 120, e.g., a hot stick, using the eye 214b in the stem 214 similar to the description of FIGS. 21 and 22 above. More specifically, the head portion 122 of the extendable reach tool 120 has a central opening 124 and intersecting channels 126 and 128 that form four tabs 130. A technician can insert the eye-stem 414b of the stem 414 into the central opening 124 in the head portion 122 of the extendable reach tool 120 until stabilizing legs 458 and 460 extending from the upper body half 450 of the body 412 are positioned with respective channels 126 or 128 as shown in FIG. 22. The central opening 124 may be configured so that when the eye-stem 414b is inserted into the central opening it is temporarily held in place by a friction fit.

Figure 71:
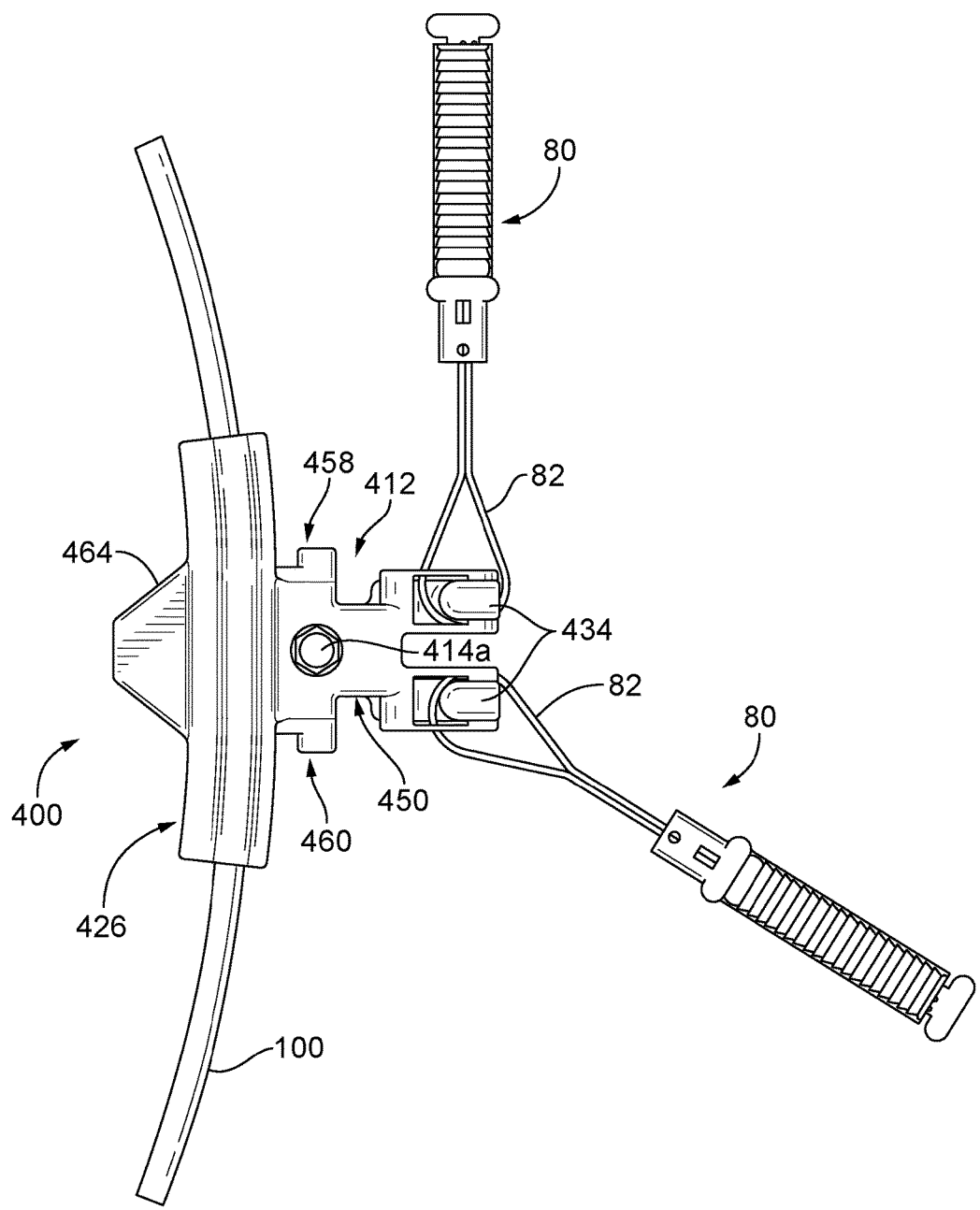
FIG. 71 is a top plan view of the cable clamp and drop cable clamp assemblies of FIG. 67.

Continuing to refer to FIGS. 70-72, with the clamp 400 releasably attached to the extendable reach tool 120, a user, e.g., a technician, can then attach the main span section 424 of the clamp 400 to a main span cable 100 by snapping the main span cable 100 into the cradle 466 in the cable guide 426 of the main span section 424 of the body 412. More specifically, the main span cable 100 is first positioned between the lower lever arm 440 and the upper lever arm 464. The clamp 400 is then forced against the main span cable 100, using the extendible reach tool 120, so that the lower body half 430 pivots in the direction of arrow F, seen in FIG. 69, separating the main span section 424 of the lower body half 430 from the main span section 424 of the upper body half 450 until the main span section 424 of the body 412 is in an open position, similar to the open position seen in FIGS. 5 and 6, allowing the main span cable 100 to pass into the cradle 466 in the cable guide 426 of the body 412. Separating the lower body half 430 from the upper body half 450 also compresses the spring 416. Once the main span cable 100 passes into the cradle 466 the force compressing the spring 416 is released so that the spring biases the lower body half 430 toward the upper body half 450 such that the body 412 returns to the clamping position, seen in FIG. 54, providing a clamping force to at least temporarily hold the main span cable 100 within the cable guide 426.

It is noted that a drop cable (not shown) is usually attached to a drop cable clamp 84, seen in FIGS. 70-72, of the drop cable clamp assembly 80 when the cable clamp assembly is attached to the clamp 400 and before the clamp is releasably attached to the extendible reach tool 120. As such, the drop cable applies tension to the main span cable when the clamp 400 is attached to a main span cable. This tension can cause the main span cable 100 to deflect or bend. However, the first and second extension sections 426b and 426c of the cable guide 426 are provided to minimize the deflection or bending of the main span cable 100. It is also noted that drop cable clamp assemblies are known. Non-limiting examples of a drop cable clamp assemblies are the models C2PRAS and C2PRSS 1-2 pair drop cable clamp assemblies sold by Hubbell Incorporated and the models C6PRAD and C6PRSD 6 pair drop cable clamp assemblies also sold by Hubbell Incorporated.

Once the clamp 400 and drop cable clamp assemblies 80 are properly secured to a main span cable 100, the stem 414 can be tightened by rotating the stem clockwise which is translated to movement of the lower body half 430 relative to the upper body half 450 to lock the main span cable 100 and drop cable clamp assembly 80 in place within the clamp 400, as shown in FIGS. 70-72. It is noted that the cable cradle halves in the main body section 424 are configured so that when the two body halves 430 and 450 are in the clamping position the cable cradles halves bottom out preventing the exertion of excessive force to the main span cable 100 crushing and possibly damaging the cable no matter how much torque is applied to the stem 414. More specifically, and referring to FIG. 69, when the two body halves 430 and 450 come together the height H1 of the central section 426a of the cable guide 426 is defined by the flat surface 433 on the lower body half 430 and the flat surface 453 on the upper body half 450. The height H1 can be set so that there is suitable clamping of a cable inserted in the central section 426a of the cable guide 426, and possibly permitting a certain amount of jacket deflection in the cable, without crushing the cable within the opening to a point causing, for example, an attenuation increase resulting in a signal loss, and/or mechanical damage to the fiber within the cable 100.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:
1. A cable clamp comprising:
 a body defining a drop cable section, a main span cable section and an intermediate section between the drop cable section and the main span cable section, the body comprising:
  a lower body half comprising:
   at least one lower arm in the drop cable section, the at least one lower arm having at least one channel;
   at least one hook portion extending from the at least one lower arm;
   an elongated aperture in the intermediate section; and
   a lower cable guide portion in the main span cable section; and
  an upper body half comprising:
   at least one upper arm in the drop cable section, the at least one upper arm having an opening capable of receiving the at least one hook portion;
   an aperture in the intermediate section; and
   an upper cable guide portion in the main span cable section;
  wherein the lower body half is movable relative to the upper body half, and wherein when the lower body half and the upper body are in a closed position the lower cable guide portion and the upper cable guide portion form a cable guide;

a stem extending through the elongated aperture in the intermediate section of the lower body half and releasably secured to the aperture in the intermediate section of the upper body half such that rotational movement of the stem is translated to movement of the upper body half relative to the lower body half, the stem having a collar; and a spring positioned on the stem between the collar and the intermediate section of the lower body half to normally bias the lower body half toward the upper body half.

2. The cable clamp according to claim 1, wherein the stem comprises an eyestem having an eye for releasably connecting the stem to an extendable reach tool.

3. The cable clamp according to claim 1, wherein the lower cable guide portion of the lower body half has a lower lever arm extending therefrom, and the upper cable guide portion of the upper body half has a upper lever arm extending therefrom.

4. The cable clamp according to claim 3, wherein when the lower lever arm and the upper lever arm are spread apart the lower body half pivots relative to the upper body half moving the body to an open position providing access to the main span cable guide and compressing the spring.

5. The cable clamp according to claim 4, wherein when the lower lever arm and the upper lever arm are returned to an un-spread position the spring biases the lower body half toward the upper body half so that the body is in the clamping position.

6. The cable clamp according to claim 1, wherein the main span cable opening has a predefined height that limits the compression force that can be applied to a drop cable within the drop cable opening.

7. The cable clamp according to claim 1, wherein the upper body half further comprises at least one stabilizing leg extending from the intermediate section in a direction toward the lower body half.

8. The cable clamp according to claim 7, wherein the at least one stabilizing leg comprises a pair of stabilizing legs, and wherein the stabilizing legs and the intermediate section of the upper body half form a cradle that receives the intermediate section of the lower body half at least when the upper body half and the lower body half are in the closed position.

9. A cable clamp comprising:
a body defining a drop cable section, a main span cable section and an intermediate section between the drop cable section and the main span cable section, the body comprising:
a lower body half comprising:
at least one lower arm in the drop cable section, the at least one lower arm having at least one channel;
at least one hook portion extending from the at least one lower arm;
an elongated aperture in the intermediate section; and
a lower cable guide portion in the main span cable section; and
an upper body half comprising:
at least one upper arm in the drop cable section, the at least one upper arm having an opening capable of receiving the at least one hook portion;
an aperture in the intermediate section;
at least a pair of stabilizing legs extending from the intermediate section in a direction toward the lower body half such that the stabilizing legs and the intermediate section of the upper body half form a cradle that receives the intermediate section of the lower body half when the upper body half and the lower body half are in a closed position; and
an upper cable guide portion in the main span cable section;
wherein the lower body half is movable relative to the upper body half, and wherein when the lower body half and the upper body are in the closed position the lower cable guide portion and the upper cable guide portion form a cable guide;
a stem extending through the elongated aperture in the intermediate section of the lower body half and releasably secured to the aperture in the intermediate section of the upper body half such that rotational movement of the stem is translated to movement of the upper body half relative to the lower body half, the stem having a collar; and
a spring positioned on the stem between the collar and the intermediate section of the lower body half to normally bias the lower body half toward the upper body half.

10. The cable clamp according to claim 9, wherein the stem comprises an eyestem having an eye for releasably connecting the stem to an extendable reach tool.

11. The cable clamp according to claim 9, wherein the lower cable guide portion of the lower body half has a lower lever arm extending therefrom, and the upper cable guide portion of the upper body half has a upper lever arm extending therefrom.

12. The cable clamp according to claim 11, wherein when the lower lever arm and the upper lever arm are spread apart the lower body half pivots relative to the upper body half moving the body to an open position providing access to the main span cable guide and compressing the spring.

13. The cable clamp according to claim 12, wherein when the lower lever arm and the upper lever arm are returned to an un-spread position the spring biases the lower body half toward the upper body half so that the body is in the clamping position.

14. The cable clamp according to claim 9, wherein the main span cable opening has a predefined height that limits the compression force that can be applied to a drop cable within the drop cable opening.

15. A cable clamp kit comprising a cable clamp and at least one drop cable clamp assembly, the cable clamp including:
a body defining a drop cable section, a main span cable section and an intermediate section between the drop cable section and the main span cable section, the body comprising:
a lower body half comprising:
at least one lower arm in the drop cable section, the at least one lower arm having at least one channel;
at least one hook portion extending from the at least one lower arm;
an elongated aperture in the intermediate section; and
a lower cable guide portion in the main span cable section; and
an upper body half comprising:
at least one upper arm in the drop cable section, the at least one upper arm having an opening capable of receiving the at least one hook portion;
an aperture in the intermediate section; and
an upper cable guide portion in the main span cable section;
wherein the lower body half is movable relative to the upper body half, and wherein when the lower body half and the upper body are in a closed position the lower cable guide portion and the upper cable guide portion form a cable guide;

a stem extending through the elongated aperture in the intermediate section of the lower body half and releasably secured to the aperture in the intermediate section of the upper body half such that rotational movement of the stem is translated to movement of the upper body half relative to the lower body half, the stem having a collar; and a spring positioned on the stem between the collar and the intermediate section of the lower body half to normally bias the lower body half toward the upper body half.

16. The cable clamp according to claim 15, wherein the stem comprises an eyestem having an eye for releasably connecting the stem to an extendable reach tool.

17. The cable clamp according to claim 15, wherein the lower cable guide portion of the lower body half has a lower lever arm extending therefrom, and the upper cable guide portion of the upper body half has a upper lever arm extending therefrom.

18. The cable clamp according to claim 17, wherein when the lower lever arm and the upper lever arm are spread apart the lower body half pivots relative to the upper body half moving the body to an open position providing access to the main span cable guide and compressing the spring.

19. The cable clamp according to claim 18, wherein when the lower lever arm and the upper lever arm are returned to an un-spread position the spring biases the lower body half toward the upper body half so that the body is in the clamping position.

20. The cable clamp according to claim 15, wherein the main span cable opening has a predefined height that limits the compression force that can be applied to a drop cable within the drop cable opening.

21. The cable clamp according to claim 15, wherein the upper body half further comprises at least one stabilizing leg extending from the intermediate section in a direction toward the lower body half.

22. The cable clamp according to claim 21, wherein the at least one stabilizing leg comprises a pair of stabilizing legs, and wherein the stabilizing legs and the intermediate section of the upper body half form a cradle that receives the intermediate section of the lower body half at least when the upper body half and the lower body half are in the closed position.

* * * * *